(12) United States Patent
Randall

(10) Patent No.: US 8,842,970 B2
(45) Date of Patent: *Sep. 23, 2014

(54) METHODS AND SYSTEMS FOR USE IN CONTROLLING PLAYBACK OF CONTENT IN RELATION TO RECORDED CONTENT

(71) Applicant: Deluxe Media Inc., Burbank, CA (US)

(72) Inventor: Bruce Randall, Painswick (GB)

(73) Assignee: Deluxe Media Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,325

(22) Filed: Aug. 16, 2013

(65) Prior Publication Data

US 2013/0336635 A1 Dec. 19, 2013

Related U.S. Application Data

(63) Continuation of application No. 13/291,891, filed on Nov. 8, 2011, now Pat. No. 8,532,464.

(60) Provisional application No. 61/411,096, filed on Nov. 8, 2010, provisional application No. 61/424,028, filed on Dec. 16, 2010.

(51) Int. Cl.
| | |
|---|---|
| *H04N 5/92* | (2006.01) |
| *H04N 5/783* | (2006.01) |
| *H04N 9/79* | (2006.01) |
| *H04N 9/82* | (2006.01) |
| *H04N 5/85* | (2006.01) |
| *G11B 27/10* | (2006.01) |

(52) U.S. Cl.
CPC .............. *H04N 9/8205* (2013.01); *H04N 5/85* (2013.01); *H04N 9/8227* (2013.01); *G11B 27/105* (2013.01); *G11B 2220/2541* (2013.01); *G11B 2220/2562* (2013.01)
USPC .......................................... 386/248; 386/353

(58) Field of Classification Search
CPC ..... H04N 9/8205; H04N 5/85; H04N 9/8227; G11B 27/105; G11B 2220/2541; G11B 2220/5262
USPC .................................................. 386/248, 343
See application file for complete search history.

(56) References Cited

U.S. PATENT DOCUMENTS

| 6,463,468 B1 | 10/2002 | Buch et al. |
| 7,466,904 B2 | 12/2008 | Yoo et al. |

(Continued)

OTHER PUBLICATIONS

EPO; Extended European Search Report Issued in European Patent Application No. 11188322.9; Mailed Mar. 8, 2012; 8 Pages.

(Continued)

*Primary Examiner* — Gelek W Topgyal
(74) *Attorney, Agent, or Firm* — Fitch, Even, Tabin & Flannery LLP

(57) ABSTRACT

Some embodiments provide methods of playing back multimedia content relative to a portable storage medium to detect, at a playback device, an initial access to a portable storage medium; request pre-roll content corresponding to content recorded on the portable storage medium; and disguise the requesting of the pre-roll content and receiving of the pre-roll content such that a user of the playback device does not experience a delay in playback of content while the pre-roll content is being received, wherein the disguising comprises: playing back disguise content, locally accessible by the playback device, while requesting and receiving the pre-roll content at the playback device; and halting playback of the disguise content and initiating playback of the pre-roll content received from the remote source such that the user of the playback device does not perceive a delay associated with obtaining the pre-roll content from the remote source.

20 Claims, 39 Drawing Sheets

(56) References Cited

U.S. PATENT DOCUMENTS

| | | |
|---|---|---|
| 7,596,303 B2 | 9/2009 | Chung et al. |
| 7,653,288 B2 | 1/2010 | Jung et al. |
| 7,878,907 B2 | 2/2011 | Davis et al. |
| 8,532,464 B2 | 9/2013 | Randall |
| 2004/0264934 A1 | 12/2004 | Ishikawa |
| 2005/0165942 A1 | 7/2005 | McDowall et al. |
| 2007/0174476 A1 | 7/2007 | McEnroe et al. |
| 2009/0006213 A1 | 1/2009 | Lerman et al. |
| 2009/0006214 A1 | 1/2009 | Lerman et al. |
| 2010/0021134 A1 | 1/2010 | Baek |
| 2010/0114853 A1 | 5/2010 | Fisher et al. |
| 2010/0153994 A1 | 6/2010 | Alexander |
| 2011/0125594 A1 | 5/2011 | Brown et al. |
| 2013/0073402 A1 | 3/2013 | Lerman et al. |

OTHER PUBLICATIONS

USPTO; Non-Final Office Action Issued in U.S. Appl. No. 13/291,891; Mailed Jan. 31, 2013; 8 Pages.

USPTO; Notice of Allowance Issued in U.S. Appl. No. 13/291,891; Mailed May 13, 2013; 10 Pages.

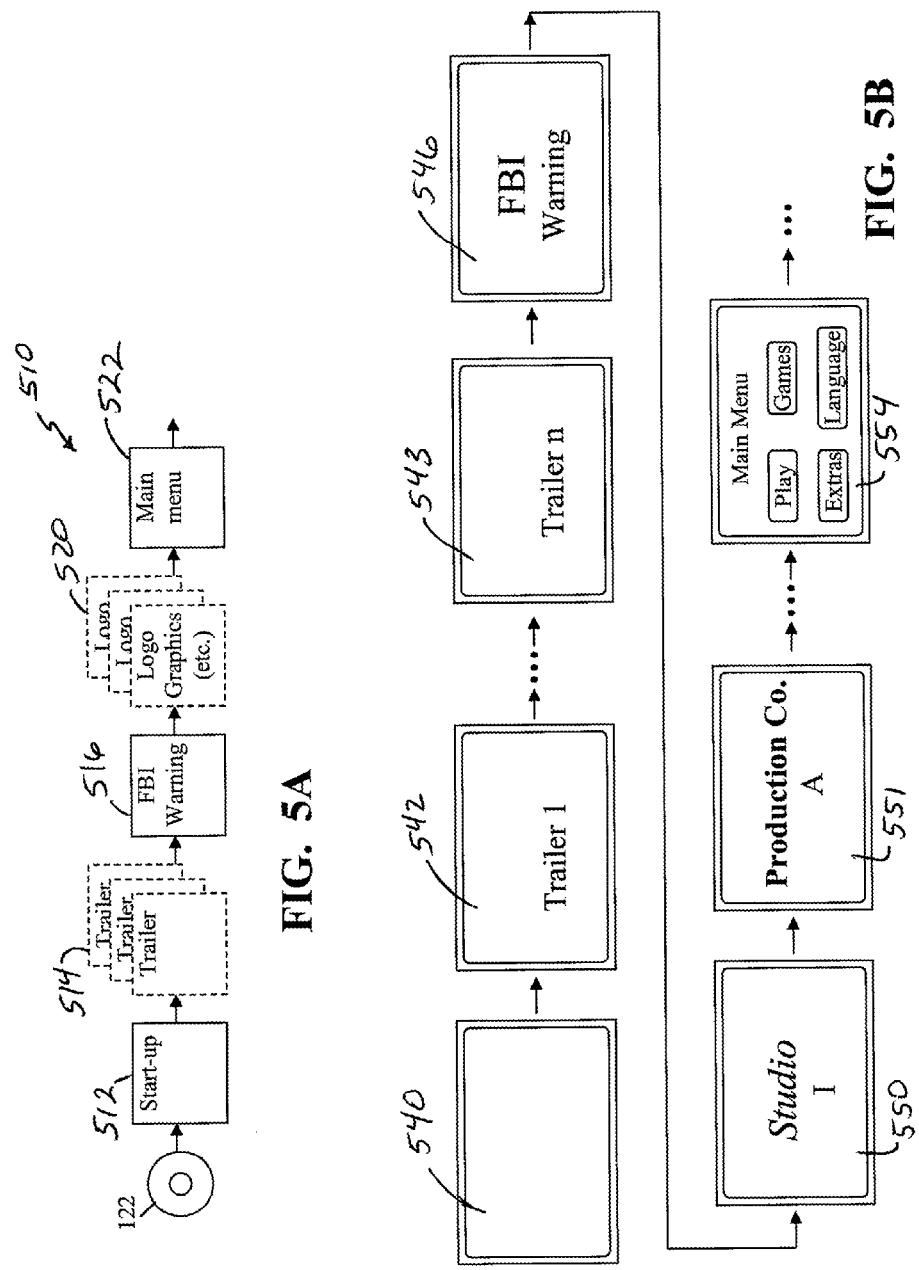

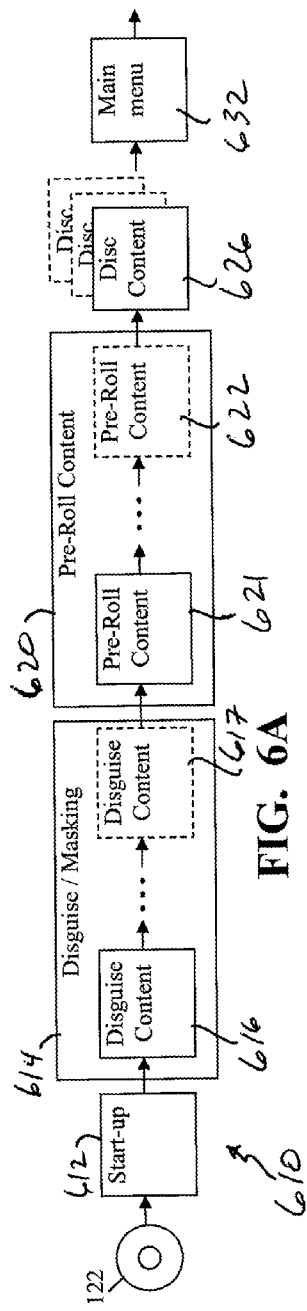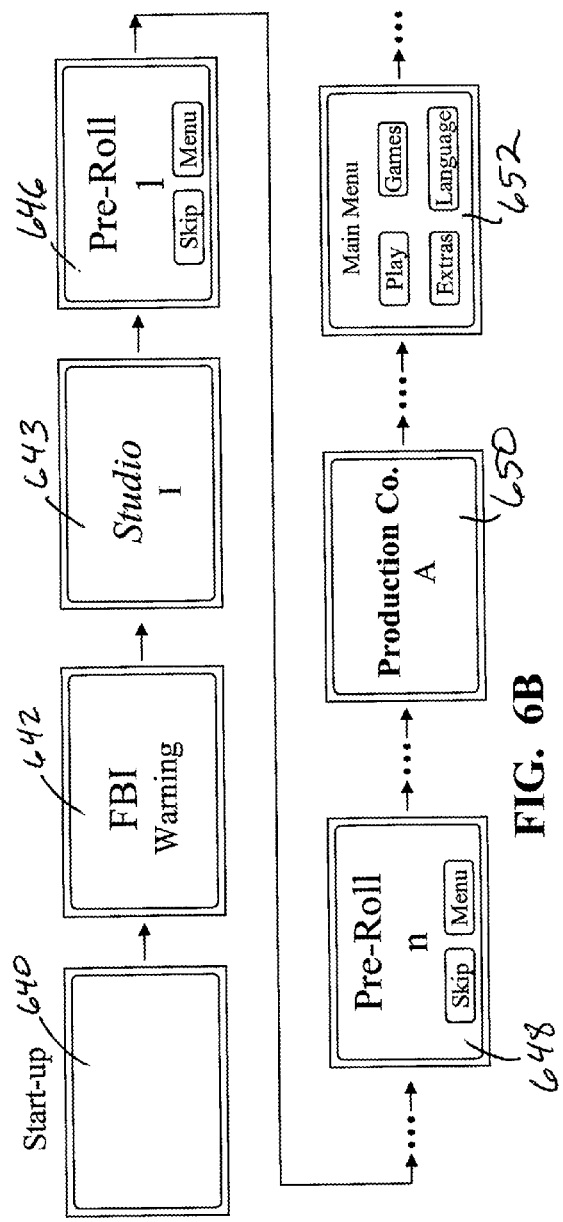
FIG. 6A
FIG. 6B

|  |  | 1312 | 1313 | 1314 | 1315 | 1310 |
|---|---|---|---|---|---|---|
|  |  | Sub_Script_A | Sub_Script_D | Sub_Script_C | ... | Sub_Script_N |
| 1318 | Bandwidth Range | SSS - TTT | UUU - VVV | WWW-XXX |  | YYY - ZZZ |
|  | Plaback device Stats |  |  |  |  |  |
| 1320 | Buffer | aaa | ccc | eee |  | ggg |
| 1322 | resolution | bbb | ddd | fff |  | hhh |
| 1336 | Time stamp | 00.00.00 | 00.00.00 | 00.00.00 |  | 00.00.00 |
| 1324 | 1st Pre_roll | Pre-roll_file_1.1 | Pre-roll_file_1.2 | Pre-roll_file_1.1 |  | Pre-roll_file_1.2 |
| 1340 | Source | URI_1 | URI_1 | URI_1 |  | URI_1 |
|  | Time stamp | 00.00.00 | 00.00.00 | 00.00.00 |  |  |
| 1325 | 2nd Pre_roll | Pre-roll_file_2.1 | Pre-roll_file_2.2 | Pre-roll_file_2.2 |  |  |
|  | Source | URI_1 | URI_1 | URI_1 |  |  |
|  | Time stamp | 00.00.00 | 00.00.00 | 00.00.00 |  |  |
| 1326 | 3rd Pre_roll | Pre-roll_file_3.1 | Pre-roll_file_3.2 | Pre-roll_file_5.3 |  |  |
|  | Source | URI_2 | URI_2 | URI_3 |  |  |
|  | Time stamp | 00.00.00 | 00.00.00 | 00.00.00 |  |  |
| 1327 | 4th Pre_roll | Pre-roll_file_4.1 | Pre-roll_file_4.2 | Pre-roll_file_N.3 |  |  |
|  | Source | URI_4 | URI_4 | URI_5 |  |  |
|  | Time stamp | 00.00.00 | 00.00.00 |  |  |  |
| 1328 | 5th Pre_roll | Pre-roll_file_5.1 | Pre-roll_file_5.2 |  |  |  |
|  | Source | URI_6 | URI_7 |  |  |  |
|  | Time stamp | 00.00.00 | 00.00.00 |  |  |  |
| 1329 | Nth Pre_roll | Pre-roll_file_N.1 | Pre-roll_file_N.2 |  |  |  |
|  | Source | URI_5 | URI_5 |  |  |  |
|  | Time stamp | 00.32.08 | 00.32.08 | 00.32.08 |  | 00.32.08 |
| 1330 | Mth Pre_roll | Pre-roll_file_M.1 | Pre-roll_file_M.1 | Pre-roll_file_M.2 |  | Pre-roll_file_M.2 |
|  | Source | URI_1 | URI_1 | URI_1 |  | URI_1 |
|  | Time stamp | 01.11.42 | 01.11.42 | 01.11.42 |  | 01.11.42 |
| 1331 | M+1 Pre_roll | Pre-roll_file_M+1.1 | Pre-roll_file_M+1.1 | Pre-roll_file_M+1.1 |  | Pre-roll_file_M+1.1 |
|  | Source | URI_8 | URI_8 | URI_8 |  | URI_8 |

FIG. 13

METHODS AND SYSTEMS FOR USE IN CONTROLLING PLAYBACK OF CONTENT IN RELATION TO RECORDED CONTENT

This application is a continuation of U.S. application Ser. No. 13/291,891, filed Nov. 8, 2011, for Bruce Randall, entitled METHODS AND SYSTEMS FOR USE IN CONTROLLING PLAYBACK OF CONTENT IN RELATION TO RECORDED CONTENT, which claims the benefit of both U.S. Provisional Application No. 61/411,096, filed Nov. 8, 2010, entitled METHODS AND SYSTEMS FOR USE IN CONTROLLING PLAYBACK OF CONTENT IN RELATION TO RECORDED CONTENT, for Bruce Randall; and U.S. Provisional Application No. 61/424,028, filed Dec. 16, 2010, entitled METHODS AND SYSTEMS FOR USE IN CONTROLLING PLAYBACK OF CONTENT IN RELATION TO RECORDED CONTENT, for Bruce Randall, which are incorporated in their entirety herein by reference.

FIELD OF THE INVENTION

The present invention relates generally to the playback of content in association with a portable storage medium, and in some embodiments to obtaining content to be played back at an early stage in playback.

BACKGROUND

Over the last couple of decades the distribution of content, such as multimedia content, images, video, music and other such content, has increased tremendously. There are a number of different formats for distributing content as well as a number of different mediums upon which content can be stored. Digital recordings of content have become the preferred mode of storing content according to some applications.

Access to and distribution of content has additionally become relatively easy and quick. As such, users are capable of accessing large amounts of data from locally stored content or remotely stored content. Further, the ease of distribution of content can often result in content recorded to a portable storage medium becoming quickly out dated.

SUMMARY OF THE EMBODIMENTS

The present embodiments provide methods, systems, apparatuses that provide for the acquisition of pre-roll content in response to and in association with access to a portable storage medium storing content, such as multimedia intended to be played back. Still other embodiments provide computer readable and/or processor readable mediums storing code that when implemented by a computer and/or processor disguise the acquisition of pre-roll content from a remote source. Additionally, some embodiments provide computers or processors programmed with executable instructions to playing back multimedia content relative to a portable storage medium, and further to acquire pre-roll content from a remote source in association with a portable storage medium.

Some embodiments provide methods of playing back multimedia content relative to a portable storage medium. These methods detect, at a playback device, an initial access to a portable storage medium; request, from a remote source, pre-roll content corresponding to content recorded on the portable storage medium; and disguise the requesting of the pre-roll content and receiving of the pre-roll content such that a user of the playback device does not experience a delay in playback of content while the pre-roll content is being received from the remote source, wherein the disguising comprises: playing back disguise content, locally accessible by the playback device, while requesting and receiving the pre-roll content at the playback device; and transitioning playback from the disguise content to playing back the pre-roll content received from the remote source such that the user of the playback device does not perceive a delay associated with obtaining the pre-roll content from the remote source.

Other embodiments provide methods of presenting multimedia content in association with a portable storage medium by detecting, at a playback device, an initial access by the playback device to a portable storage medium; prior to providing the playback device with access to multimedia content recorded on the portable storage medium: accessing a remote source over a distributed network; and requesting, from the remote source, pre-roll content associated with the portable storage medium; receiving, from the remote source, at least a portion of a pre-roll content associated with the portable storage medium, where the portion of the pre-roll content is sufficient to initiate playback at the playback device of the pre-roll content; disguising the retrieving of the pre-roll content while accessing the remote source, requesting the pre-roll content and receiving the at least the portion of the pre-roll content, where the disguising comprises: identifying one or more disguise contents; initiating playback of one of the one or more disguise contents; and continuing the playback of the one or more disguise contents until the at least the portion of the pre-roll content associated with the portable storage medium is received; Transitioning to playing back the pre-roll content. In some instances the transitioning comprises halting the playback of the one or more disguise contents; and initiating playback of the pre-roll content prior to playing back a main menu recorded on the portable storage medium, where the main menu is not disguise content.

Still other embodiments include methods that provide access to pre-roll content. These embodiments play back, through a playback device directly accessing a first portable storage medium, content recorded on and retrieved by the playback device from the portable storage medium; detect a request to remove access to the first portable storage medium from the playback device; initiate access, over a distributed network, to a remote source to request pre-roll content from the remote source; terminate access to the first portable storage medium; and continue to access the remote source, while access to the first portable storage medium is removed, and acquiring pre-roll content associated with the first portable storage medium.

Some embodiments provide methods of playing back multimedia content. These embodiments receive, at a playback device and from over a distributed network, a first stream of a first pre-roll content associated with a portable storage medium being directly accessed by the playback device at the time of requesting the first pre-roll content from a remote source and while playing back disguise content that disguises the acquisition of the first pre-roll content; determine whether a bandwidth of a communication link over the distributed network provides for a change to a second stream of the first pre-roll content; request the second stream of the first pre-roll content when the communication link over the distributed network provides for the change to the second stream of the first pre-roll content; and play back the first pre-roll content comprises switching from playing back the first stream of the first pre-roll content to playing back the second stream of the first pre-roll content.

Additionally some embodiments include methods of providing pre-roll content to be played back in association with content recorded on a portable storage medium. These embodiments receive, from a remote playback device, a request for pre-roll content; identify a portable storage medium being directly accessed by the playback device and associated with the request for the pre-roll content; identify one or more pre-roll content associated with the identified portable storage medium; identify initial conditions; selecting a first stream of a first pre-roll content from the identified one or more pre-roll contents; initiate communication of the first stream of the first pre-roll content; determine a connection bandwidth over a communication link with the remote playback device; determine whether the bandwidth provides for the selection of a second stream of the first pre-roll content; select, in response to determining that the bandwidth provides for the selection of the second stream of the first pre-roll content, the second stream of the first pre-roll; and transitioning to communicating the second stream of the first pre-roll content.

Some additional embodiments include methods of providing pre-roll content to be played back in association with content recorded on a portable storage medium by: receiving, from a remote playback device, a request for pre-roll content; identifying a portable storage medium being directly accessed by the playback device and associated with the request for the pre-roll content; identifying a sequence specifying an order of playback of a first set of two or more pre-roll contents associated with the identified portable storage medium; initiating a communication of a first pre-roll content in accordance with the sequence; determining a connection bandwidth over a communication link with the remote playback device; determining whether the bandwidth provides for the altering of the sequence; altering the sequence, when the bandwidth provides for the altering of the sequence, to produce an altered sequence where the altered sequence specifies an alternate order of playback of a second set of two ore more pre-roll content where the second set is different than the first set; and altering the communication of the first pre-roll content in accordance with the altered sequence.

Still further, some embodiments include methods of providing pre-roll content to be played back in association with content recorded on a portable storage medium. These embodiments receive, over a distributed network from a playback device, a request for pre-roll content associated with a portable storage medium being directly accessed by the playback device; identify a first pre-roll content that is associated with the portable storage medium; select a first stream of the first pre-roll content, where the first stream is communicated at a first data rate to achieve a first playback quality at the playback device; identify a connection bandwidth over the distributed network to the playback device; determine whether the connection bandwidth supports the communication of the first version of the first pre-roll content at the first data rate; and select a second version of the first pre-roll content when it is determined that the connection bandwidth cannot support the communication of the first version of the first pre-roll content at the first data rate, where the second version of the first pre-roll content is communicated at a second data rate that is less than the first data rate and to that achieves a second playback quality at the playback device that is less than the first playback quality.

Additionally, some embodiments include methods of playing back content in association with a portable storage medium. These methods comprises detecting direct access, by a playback device, to a portable storage medium; reading content from the portable storage medium; identifying instructions to initiate access to a remote source to request pre-roll content not recorded on the portable storage medium; initiating communication with the remote source requesting the pre-roll content; initiating playback, while requesting the pre-roll content and while waiting to receive the pre-roll content, of one or more disguise content such that a delay of retrieving the pre-roll content is disguised to a viewer; determining whether a sufficient amount of the pre-roll content has been received to initiate playback of the pre-roll content; halting the playback of the one or more disguise content when it is determined that the sufficient amount of the pre-roll content has been received to initiate playback of the pre-roll content; and initiating playback of the pre-roll content when it is determined that the sufficient amount of the pre-roll content has been received to initiate playback of the pre-roll content.

Further, some embodiments provide non-transitory, tangible computer readable storage mediums that store code. Some of these embodiments comprising code to detect, at a playback device, an initial access to a portable storage medium; code to request, from a remote source, pre-roll content corresponding to content recorded on the portable storage medium; and code to disguise the requesting of the pre-roll content and receiving of the pre-roll content such that a user of the playback device does not experience a delay in playback of content while the pre-roll content is being received from the remote source, wherein the code to disguise comprises: code to playing back disguise content, locally accessible by the playback device, while requesting and receiving the pre-roll content at the playback device; and code to halt playback of the disguise content and initiating playback of the pre-roll content received from the remote source such that the user of the playback device does not perceive a delay associated with obtaining the pre-roll content from the remote source.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 5A depicts a simplified flow diagram of an example representation of a process in playing back content from a portable storage medium where a remote source is not accessed to obtain pre-roll content.

FIG. 5B depicts a simplified example representation of content sequentially displayed in accordance with the playback process of FIG. 5A.

FIG. 6A depicts a simplified flow diagram of an example representation of a process according to some embodiments of playing back content in association with a portable storage medium.

FIG. 6B depicts a simplified example representation of content sequentially displayed in accordance with the playback process of FIG. 6A.

FIG. 13 depicts a simplified table depiction of an example script with a plurality of sub-scripts in accordance with some embodiments.

Figure 1:
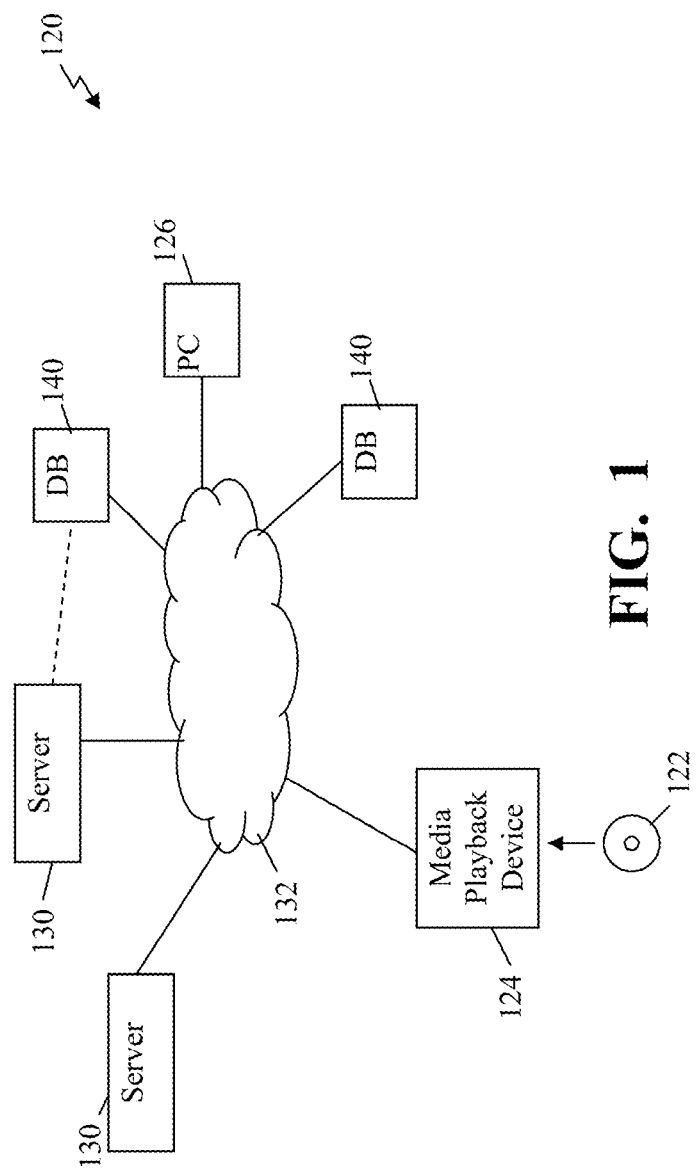
FIG. 1 depicts a simplified block diagram of a system according to some embodiments for obtaining and playing back pre-roll content in association with content recorded on a portable storage medium.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments allow a playback device accessing a portable storage medium to receive pre-roll content from a remote source to be played back through the playback device in association with content recorded on the portable storage medium. The pre-roll content is not recorded on the portable storage medium and can be substantially any relevant content to be played back in cooperation with the portable storage medium, and typically is content to be played back in advance of at least the main title content recorded on the portable storage medium or the content for which the portable storage medium is most associated (e.g., a main movie title). Further, the pre-roll content is typically intended to be played back prior to playing back menus and/or a main title content from the portable storage medium. In allowing access to pre-roll content some embodiments provide current and relevant content that can be played back in cooperation with the portable storage medium, and in some instances in place of content recorded on the portable storage medium. Further, the present embodiments attempt to provide the pre-roll content without introducing an adverse user experience due, in part, to delays in obtaining the pre-roll content.

The pre-roll content can be substantially any type of content (e.g., video, audio, text, images, games, menus, graphics and the like) that can be presented singularly or as a series of elements. Further, the pre-roll content can additionally have interactive elements such as a "call to action," that could, for example, ask a user to click on a button or hyperlink, or take other actions. In some implementations, the pre-roll content can be presented prior to providing a user with access to a main menu, a main title, content or feature stored on a portable storage medium. Some specific embodiments present the pre-roll content upon a playback device detecting or as soon as possible after detecting access to a portable storage medium (e.g., disc insertion into the playback device). The pre-roll content is not limited to being played back prior to the main menu or the feature, but instead can be played back at substantially any time associated with access to the portable storage medium and/or playback of content from the portable storage medium. Pre-roll content to be played back after the main title has initiated playback, in some instances, can be referred to as post-roll content. The main title or content associated with a portable storage medium is typically the primary content that a user or viewer would associate with the portable storage medium and/or that a user wants to view (e.g., a feature length movie). The main title is typically retrieved from the portable storage medium being accessed, however, in some instances the main title may be obtained from a separate source, such as through streaming, downloading, progressive downloading or the like.

As is understood in the art, content can be retrieved from a remote source and played back relative to a portable storage medium. However, users can experience significant delays in obtaining content from a remote source. Some embodiments, in part, attempt to address the degraded user experience resulting at least from such delays by initiating the retrieval of the pre-roll content while simultaneously disguising the acquisition of the pre-roll content, or at least the acquisition of a sufficient amount of a first pre-roll content to allow the first pre-roll content to start being played back while the remainder of the first pre-roll content is acquired.

The pre-roll content is accessed from one or more remote sources and played back in cooperation with the content being accessed by the playback device from the portable storage medium. In accessing the pre-roll content, the pre-roll content is downloaded, progressively downloaded, streamed or otherwise provided to the playback device to be played back in cooperation with the content recorded on the portable storage medium. Because of the nature of portable storage mediums, the content recorded on portable storage mediums is dated and can quickly become out dated or stale. As such, the present embodiments provide methods and systems that allow pre-roll, additional and/or alternative content to be obtained and played back in association with the content recorded on the portable storage medium and/or in place of some or all of the content recorded on the portable storage medium. Further, in some implementations, the pre-roll content is retrieved early on in the start-up flow in accessing the portable storage medium. Additionally, some embodiments retrieve and playback the pre-roll content prior to a main menu being displayed and/or prior to playback of one or more main titles of the portable storage medium, where the main menu is a menu that provides a user with general control of playback and access to content on the portable storage medium, and in some instances can be considered similar to a home page on a web site.

Still further, some embodiments obtain and initiate playback of the pre-roll content without the user's knowledge such that the playback of the pre-roll content appears as though it was played back from the portable storage medium. Additionally, the process of obtaining of the pre-roll content from the one or more remote sources can be masked, disguised or otherwise obtained without degrading the playback experience of content associated with the portable storage medium.

As a result, the present embodiments allow content not recorded on the portable storage medium to be dynamically selected, streamed, downloaded or otherwise delivered to a playback device and played back early on in a start-up flow. For example, the present embodiments can allow for dynamic trailer delivery and sequenced playback of content before displaying a main menu from the portable storage medium with minimal user perceived disc start up time before the pre-roll content playback begins. As introduced above, the retrieval of the pre-roll content can be masked or otherwise disguised to achieve the minimal user perceived disc start up.

FIG. 1 depicts a simplified block diagram of a system 120 according to some embodiments for obtaining and playing back pre-roll content in association with content recorded on a portable storage medium 122. A playback device 124 directly accesses the portable storage medium 122 and can playback content from the portable storage medium 122. The playback device 124 is further configured to access one or more remote sources 130, 140 over a distributed network 132 to acquire the pre-roll content in association with the portable storage medium.

The playback device 124 can be substantially any relevant device capable of directly accessing the portable storage medium 122, reading, accessing and/or retrieving content from the portable storage medium 122 and connecting, and receiving and playing back content acquired from over the distrusted network 132. Further, the playback device 124 is configured to implement software, executables and/or other such programming from local memory, firmware and/or the portable storage medium 122. The portable storage medium 122 can be substantially any relevant storage medium capable of storing content and provided the playback device 124 with access to that content. For example, the portable storage medium can be an optical medium (e.g., Blu-ray, high-definition digital versatile disc (HD-DVD), digital versatile disc (DVD), compact disc (CD), and other such optical mediums), magnetic medium, non-volatile memory (e.g., flash memory, EEPROM (Electrically Erasable Programmable Read-Only Memory), memory cards, USB flash drives, and the like), and other such relevant computer and/or processor readable memory.

The one or more remote sources 130, 140 can be substantially any relevant source or plurality of sources that individually or in cooperation can supply content to the playback device 124. For example, the remote source can be a server 130, computer, database 140, a cooperated consumer electronic device, or other such device that can communicate with the playback device 124 over the network 132. Additionally or alternatively, the remote source 130 can include one or more databases 140 or other such depositories that store and distribute content. Similarly, the playback device 124 may initially access a server 130 that directs the playback device to a database 140 or other source to obtain the pre-roll content. As such, the playback device 124 can retrieve or receive relevant pre-roll content directly from the server 130, accessed from a remote storage or database 140, received from a separate playback device, a content generating device (e.g., video recording device, camera, and other such device) or other such sources. In some instances, the server 130 may include or be directly coupled with a database 140 to retrieve and provide the pre-roll content directly from the server 130.

Figure 2:
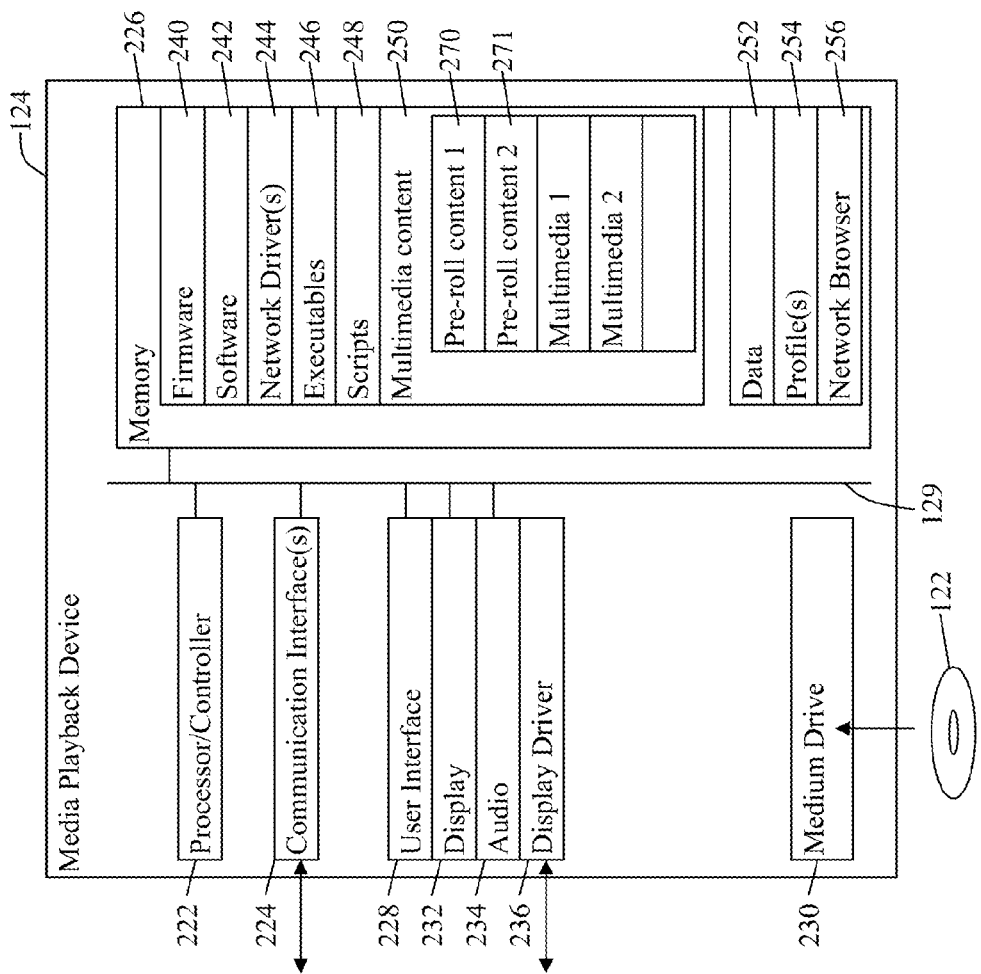
FIG. 2 depicts a simplified block diagram of a media playback device.

FIG. 2 depicts a simplified block diagram of a media playback device 124. The media playback device 124 includes one or more processors or controllers 222, one or more communication interfaces 224, one or more memory or computer readable storage 226, user interface 228 and other relevant components such as internal communication links and/or buses 229, and the like. The media playback device 124 further include relevant components for use in playing back content, such as one or more medium drives 230, one or more displays 232, one or more audio systems (e.g., one or more audio drivers and/or one or more speakers) 234, one or more display drivers 236 that provides information to a separate display device (e.g., television) and other relevant components.

The media playback device 124 can be substantially any relevant playback device that can playback content from a portable storage medium, such as, but not limited to, a disc player (e.g., Blu-ray, high-definition digital versatile disc (HD-DVD), digital versatile disc (DVD), compact disc (CD), etc.), audio player, computer, a set-top-box, a TV, portable playback device and the like. The controller 222 can be implemented through one or more microprocessors, processors, minicomputers or other such processing devices or combinations of devices programmed with executable instructions or that execute programming to access and implement the playback of the multimedia content and provide functional control of the playback device 124. In some embodiments, the controller 222 includes video and/or audio processing functionality, such as decoders, encoders, demultiplexors, multiplexors, decryption devices, encryption devices, and the like; however, the video and/or audio processing functionality can be implemented through separate devices cooperated with the controller 222 such that at least some of the processing of content is initiated by the controller 222 instructing other processing devices to perform some or all of the content processing. Additionally, in some instances, the controller 222 includes communication functionality and/or directs additional devices to process received communications (e.g., communications from over the network 132, from a remote control device, and other such communications) and transmit communications. The communication interfaces 224 provides ports, interfaces, connections, antenna and/or the like through which the media playback device 124 can communicate with other remote devices and/or over communication networks. The one or more communication interfaces 224 can include interfaces such as, but not limited to, a parallel port, an IEEE 1394 serial port, a game port, a USB port, Ethernet network port, an IR interface, RF interfaces, antenna or other such interfaces.

The memory 226 is coupled with the controller 222 and typically includes one or more processor readable and/or computer-readable mediums accessed by at least the controller 222 and can include volatile and/or nonvolatile media, such as RAM, ROM, EEPROM, flash memory, cache memory or other memory technology. The memory can store firmware 240, software 242, network or communication drives 244, executables 246, scripts 248, multimedia content 250 (which may include previously received pre-roll content 270-271, graphics, video, audio, images, and other such multimedia content), data 252, profiles and/or account information 254, network device ID and/or address 256 and the like.

A user interface 228 can be included in the playback device that allows the user to interact with the media playback device 124 and can include substantially any relevant interface, such as physical buttons, displays, lights, LEDs, an optical or radio communication interface for communicating with one or more remote controls, or other such user interfaces or combinations thereof. Further, the user interface 228 can further include user interfaces displayed on the display 232 or a display coupled with the playback device 124, such that the playback device 124 receives selections and/or commands corresponding with options and/or fields displayed through the user interface. The display 232 can be substantially any relevant display such as, but not limited to, a cathode ray tube display, a liquid crystal display (LCD), plasma display panel, light emitting diode display, and other relevant displays. Similarly, the audio 234 can be substantially any relevant audio drive, device and/or system, such as one or more speakers, speaker drivers and the like.

Additionally or alternatively, some embodiments further include one or more display drivers 236 that can supply and/or drive one or more displays 232 of the playback device 124 and/or one or more separate display devices, such as a television, a computer monitor, cathode ray tube display, a liquid crystal display (LCD), plasma display panel, light emitting diode display, and/or other such relevant displays. The one or more medium drives 230 receive a portable storage medium 122 and allows the controller 222 or other relevant components of the media playback device 124 to access content stored on the medium 122. The portable storage medium 122 can be substantially any portable computer or processor readable medium, such as a disc, flash memory and other such memory as described above.

Figure 3:
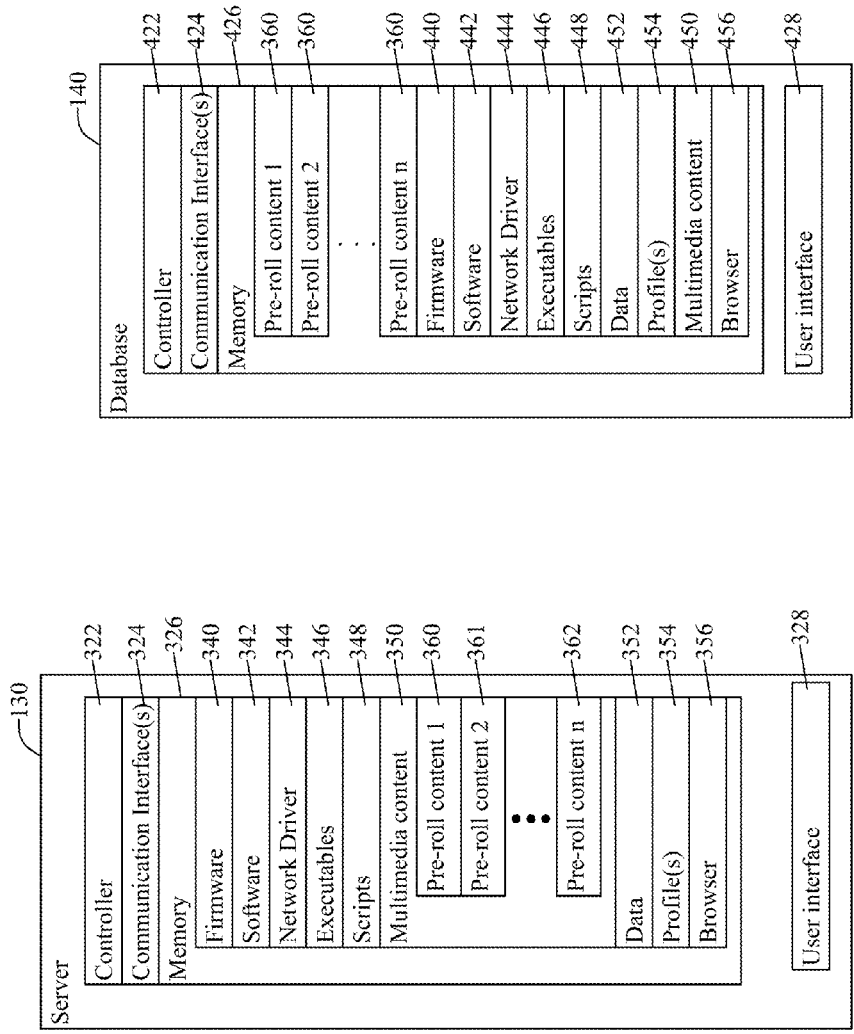
FIG. 3 depicts a simplified block diagram of a remote source that can communicate over a distribute network with a playback device and can control the distribution of pre-roll content.

FIG. 3 depicts a simplified block diagram of a remote source 130, such as a network device or server, according to some embodiments that can communicate over the distribute network 132 with the playback device 124 to control the distribution of and supply the pre-roll content and/or direct the playback device to another network device (e.g., database 140) to obtain the pre-roll content. The remote source 130 can be implemented through a computer or other data processing device and includes one or more processors or controllers 322, one or more communication interfaces 324 and one or more local memory or computer readable storage 326. In some instances the remote source 130 can be similar to or the same as the playback device 124 of FIG. 2. Some embodiments optionally include user interface 328 (which may include a display and/or audio) and other relevant components such as internal communication links and/or buses (not shown), and the like.

The controller 322 can be implemented through one or more microprocessors, processors, minicomputers or other such processing devices or combinations of devices. In some embodiments the controller 322 includes video and/or audio processing functionality, such as decoders, encoders and the like; however, the video and/or audio processing functionality can be implemented through separate devices cooperated with the controller 322. The communication interfaces 324 provide interfaces, ports, connections, antenna and the like through which the remote source 130 can communicate over the distributed network 132. Additionally, in some instances, the communication interface 324 provides communication with remote data storage devices 140. These communication interfaces can include interfaces such as, but not limited to, a parallel port, an IEEE 1394 serial port, a USB port, an IR interface, RF interfaces, antenna or other such interfaces.

The memory 326 is coupled with the controller 322 and typically includes one or more processor and/or computer-readable mediums accessed by at least the controller 322 and can include volatile and/or nonvolatile media, such as RAM, ROM, EEPROM, flash memory or other memory technology. The memory can store firmware 340, software 342, network or communication drives 344, executables 346, scripts 348, media content 350 (e.g., one or more pre-roll content 360-362), data 352 (which can include records, documents, databases, tables, reports, statistics, and other such data), profiles and/or account information 354, a network drive and/or browser 356, and the like.

Figure 4:
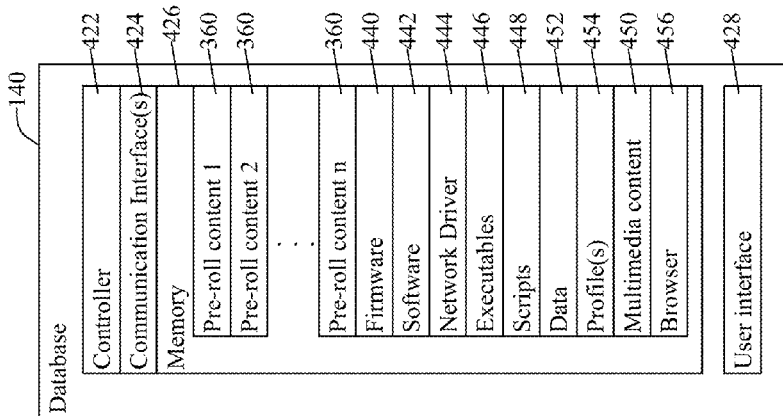
FIG. 4 depicts a simplified block diagram of a database or other data storage device that at least in part can store pre-roll content and/or other such content.

FIG. 4 depicts a simplified block diagram of a database or other data storage device 140 that at least in part can store pre-roll content and/or other such content. The database 140 includes one or more processors or controllers 422, one or more communication interfaces 424 and computer readable storage 426. The database 140, in some instances, can include a user interface 428 (which may include a display and/or audio) and other relevant components such as internal communication links and/or buses (not shown), and the like.

The controller 422 can be implemented through one or more microprocessors, processors, minicomputers or other such processing devices or combinations of devices. In some embodiments the controller 422 includes video and/or audio processing functionality, such as decoders, encoders and the like; however, the video and/or audio processing functionality can be implemented through separate devices cooperated with the controller 422. The communication interfaces 424 provide interfaces, ports, connections, antenna and the like through which the database 140 can communicate over the distributed network 132 and/or directly with a coupled device such as a server 130. These communication interfaces can include interfaces such as, but not limited to, a parallel port, an IEEE 1394 serial port, a USB port, an IR interface, RF interfaces, antenna or other such interfaces.

The memory 426 is coupled with the controller 422 and typically includes one or more processor and/or computer-readable media accessed by at least the controller 422 and can include volatile and/or nonvolatile media, such as RAM, ROM, EEPROM, flash memory or other memory technology. The memory 426 stores one or more pre-roll content 360 and in some instances can additionally store firmware 440, software 442, network or communication drives 444, executables 446, scripts 448, media content 450, data 452, profiles and/or account information 454, a network drive and/or browser 456, and the like. In other embodiments, the database 140 can be similar to or the same as the server of FIG. 3 or in some instances is similar to the playback device 124 of FIG. 2.

As introduced above, the present embodiments provide the pre-roll content to be played back in cooperation with the portable storage medium 122. Further in some implementations, the pre-roll content 360 is supplied to the playback device 124 to be played back as part of the initial content a user experiences upon initiating playback of content in association with the portable storage medium 122. Still further, the pre-roll content 360 can be played back prior to displaying a main menu specified on the portable storage medium 122. For example, the pre-roll content can be a trailer or preview of a movie to be released or recently released and playing in movie theaters, trailers of a movie to be released or recently released for purchase on portable storage mediums, advertisements, additional video or audio content, and other content played back as an initial start-up or playback experience. Further, some embodiments provide playback of some pre-roll content during, following or in place of playback of a main or feature title content stored on the portable storage medium 122.

FIG. 5A depicts a simplified flow diagram of an example representation of a process 510 in playing back content from a portable storage medium 122 where a remote source 130 is not accessed to obtain pre-roll content. FIG. 5B depicts a simplified example representation of content sequentially displayed in accordance with the playback process 510 of FIG. 5A. Referring to FIGS. 5A-5B, in this example, upon an initial detection of the portable storage medium (e.g., the portable storage medium 122 is inserted or otherwise initially coupled with the playback device 124, the presences of the portable storage medium upon power up of the playback device, or other such initial detection of the portable storage medium 122), a start-up application 512 is initiated at the playback device 124.

In some instances a blank or blue screen 540 is displayed upon initiation of or while waiting for the start-up to begin. One or more trailers 514 recorded on the portable storage medium can be played back 542-543. Following the playback of the trailers 542-543, in this example, a legal notification or warning 516 may be played back, and a legal graphics or animation 546 is displayed. In some instances one or more logos or other identifiers 520 of companies associated with the content recorded on the portable storage medium 122 can be displayed or played back, with graphics or animations of the logos 550-551 or identifiers being displayed. Then a main menu 522 is then accessed with a main menu interface displayed 554. As is known in the art, the main menu is a common user interface displayed by playback devices 124 as defined on the portable storage medium 122 to allow the user to control access to and/or playback content on the portable storage medium 122.

As demonstrated in this example process 510, the content displayed and/or played back by the playback device 124 is restricted to content on the portable storage medium 122. Further, as demonstrated above, some or all of the content on the portable storage medium can become out-dated or stale because the content is fixed on the portable storage medium 122 as some time in the past. For example, the trailers 514 typically will quickly become out dated from when the portable storage medium 122 was released and/or made available to users.

The present embodiments, however, allow access to the pre-roll content 360 not recorded on the portable storage medium and obtained from a remote source 130. As such, the present embodiments provide current and more relevant content to be made available to users in cooperation with the portable storage medium 122. Additionally, in some implementations, the pre-roll content is provided to the playback device 124 such that playback of the pre-roll content appears from a user's or viewer's perspective as though the pre-roll content were on the portable storage medium. Still further, in many instances, the initiation of the playback of the pre-roll content is initiated at a beginning of the playback experience with limited delay in playing back the pre-roll content and while disguising the delays associated with acquiring the pre-roll content from the remote source 130.

FIG. 6A depicts a simplified flow diagram of an example representation of a process 610 according to some embodiments of playing back content in association with a portable storage medium 122. FIG. 6B depicts a simplified example representation of content sequentially displayed in accordance with the playback process 610 of FIG. 6A. Referring to FIGS. 6A-6B, similar to the process 520 of FIG. 5A, initially a start-up application 612 is activated upon an initial detection of the portable storage medium 122. Again, in some instances a blank or blue screen 640 is displayed upon initiation of or while waiting for the start-up to begin. In some instances, the start-up application 612 at least in part initiates a communication connection with the remote source 130 as described above and further below.

Following the activation of the start-up application a pre-roll masking or disguising 614 is implemented where one or more disguise or masking content 616-617 are retrieved and displayed and/or played back 642-643. The disguise content 616 is played back or displayed while the playback device 124 is obtaining a first pre-roll content 621 to be played back in association the portable storage medium 122. As such, the disguise content 614 disguises and/or masks the process implemented by the playback device in obtaining one or more pre-roll contents 620.

Once the first pre-roll content 621 is obtained or a sufficient amount of a first pre-roll content 621 is obtained to allow playback of the first pre-roll content to begin, there is a transition to playing back the pre-roll content. In some instances, the transition occurs by allowing a disguise content currently 614 being played back to complete playback and then transitioning to initiate playback of the pre-roll content. In some implementations, the playback of other disguise content (e.g., 617) is halted or prevented from being played back. In other instances, the transition to playing back the pre-roll content comprises halting or interrupting the display and/or playback of the disguise content 614 and the playback of the pre-roll content 621 is initiated and displayed 646. Because the disguise content 614 is played back while the pre-roll content is obtained the time needed to obtain a sufficient portion of the pre-roll content 621 to implement playback of the pre-roll content is not perceived and the playback experience appears as though the pre-roll content was effectively played back from the portable storage medium 122. In some implementations, the amount of disguise content 614 and/or the delay time associated with initiating playback of the pre-roll content is minimized. Further, the playback of the disguise content provides a user with a seamless playback of current and/or relevant content without adversely affecting the user experience.

The pre-roll content 620 continues to playback 646 as it is downloaded and/or streamed. In some implementations, one or more pre-roll content 620 can be retrieved (e.g., downloaded, progressively downloaded, streamed or otherwise obtained) from one or more remote sources 130. In the event that additional pre-roll content 622 is to be played back, these additional pre-roll contents 622 can continue to be acquired while the disguise content or the prior pre-roll content is being played back (e.g., pre-roll content 621). The additional pre-roll content 622 can then be played back 648 following the playback of a prior pre-roll content 621. In some implementations, where a sufficient amount of a subsequent pre-roll content (e.g., pre-roll content 622) has not be received, one or more disguise content 614 can be displayed and/or played back while the playback device 124 continues to acquire the subsequent pre-roll content.

Following the playback of the pre-roll content 620, the playback of content associated with the portable storage medium 122 continues in accordance with the playlist defined on the portable storage medium. In some instances, one or more content 626 are displayed and/or played back from the portable storage medium. This portable storage medium content 626 can include substantially any relevant content, such as legal notifications, logos for companies 650 associated with content recorded on the portable storage medium, trailers or other content recorded on the portable storage medium. It is noted, however, that one or more of the portable storage medium contents 626 may have been displayed and/or played back as disguise content 614 as described above and further below. The playback process 610 can then proceed to access the main menu 632 or other main title content to display and/or allow playback 652 of the main menu, main title content or the like in accordance with the portable storage medium 122.

As such, the present embodiments provide for the playback of relevant and/or current content without adversely affecting the playback experience, and typically enhance the playback experience. In part, the present embodiments can ingest, process and publish video content designed to be dynamically selected, retrieved and played back early on in a start-up flow for content associated with a portable storage medium 122. Again for example, the pre-roll content can provide one or more trailers that are dynamically delivered as well as substantially any other relevant content, such as advertising, additional content, and the like to be played back in cooperation with the portable storage medium 122. Further, the time needed to receive the pre-roll content or at least a sufficient amount of pre-roll content to implement playback can be disguised in attempts to improve a playback experience. This allows the pre-roll content to be played back earlier in the play scheme and in many instances before displaying the main menu from the portable storage medium, while minimizing user perceived disc start-up timing and delays before download and/or streamed content playback begins.

As fully described below, some embodiments additionally adjust and/or optimized download and/or streaming rates to provide improved video quality and/or attempt to minimize re-buffering events. Therefore, the present embodiments are enhancements to network connected playback devices that allow additional content to retrieved from remote sources and played back, including Blu-ray Disc (BD) Live.

In some embodiments, the playback device 124 has a resident application that is activated at the start-up 640 to read and interpret the portable storage medium 122 and provide a general level of services to higher level applications (e.g., an operating system, messaging application, a media feed application, and the like). When the portable storage medium 122 contains additional applications or scripts (e.g., Blu-ray disc Java (BD-J) content), an interpreting service may be initiated and an initial application on the portable storage medium can be launched when appropriate and relevant to start up. For example, the initial application can be indicated by data on the portable storage medium (e.g., data formatted in conformance with the Blu-ray specification). As an example, some portable storage mediums can be configured with a "bootstrapped" application start up sequence. The initial application may perform checks for application updates across the network 132 and/or discover network service provided packages of applications. In some instances, a first update to be downloaded can be a "bootloader" application that can contain fixes or patches to one or more applications on the portable storage medium, and/or an application that is configured to discover a next level of application updates that might be available over the network 132. This updating application can further query and/or check the network for a pre-roll application that can be downloaded and launched when discovered. It is noted, however, that one or more or all of these applications may be recorded on the portable storage medium 122. Providing one or more of these applications over the network 132, however, can allow them to be more readily and freely modified, updated and/or upgraded.

Once the pre-roll application is downloaded (when not recorded on the portable storage medium or already locally stored on the playback device 124) and launched, it can activate a network service application program interface (API), some times referred to as a "Media Feed" API, that can acquire the pre-roll content, which can be presented to the playback device as a feed. In some implementations, the pre-roll application initiates requests for the content from the feed in the following manner: a request for a guide is communicated (where, in some instances, the guide is a file, XML document or the like that provides links to detailed information about possible content that can be downloaded; a content request is communicated to a remote source 130 (e.g., a "GetNext" request), with a response providing an identifier for a first item of content to be played (where the identifier can map or provide a link or URL to an element in the guide and related information files so that the playback device 124 can locate the resources that constitute the content); the indentified content is downloaded and played back, which may include playing back in a progressive manner; and on play completion of the item of content, a subsequent request (e.g., "GetNext") call can be made to get a next identifier for a next item of content. When content is not available or no further content is available the network service API (e.g., Media Feed API) can signal content is not available or no further content is content.

As introduced above, some embodiments implement the display and/or playback of disguise content. The selection of the disguise content, when disguise content is to be played back, can depend on many factors. In some instances, the disguise content and/or a sequence defining the playback of one or more disguise content is predefined while in other instances, an evaluation of potential disguise content can be implemented to select an appropriate or advantageous disguise content. For example, there may be an initial anticipated delay in playing pre-roll content based on an initial establishment of a communication connection with a remote source 130, a query of the remote source and the retrieval of at least a portion of the pre-roll content. Based on this anticipated delay, a playlist defined on the portable storage medium may designate one or more disguise content to be displayed and/or played back while this initial connection is established. For example, the initial disguise content can include the display of a legal warning (e.g., a Federal Bureau of Investigations (FBI) warning relative to impermissibly copying content on the portable storage medium and/or content associated with the portable storage medium); a "coming soon" or similar display; one or more logos, images and/or animations identifying one or more companies associated with the production, distribution and ownership of content on the portable storage medium; one or more trailers recorded on the portable storage medium, and/or other such disguise content.

In other instances, an evaluation of available disguise content can be performed to identify and/or select disguise content. For example, in some implementations pre-roll content may be retrieved by the playback device 124 from a remote source 130 in response to the playback device previously accessing the same or a different portable storage medium. As a result, the previously obtained pre-roll content may still be stored at the playback device 124 and available to be played back allowing the previously obtained pre-roll content to serve both as pre-roll content as well as disguise content.

Some embodiments additionally attempt to improve the user experience in playing back pre-roll content by trying to use content with a desired playback quality. For example, in many instances it is desirable that the pre-roll content be played back with a quality that is similar to or as good as that obtained when playing back high definition (HD) content retrieved directly from the portable storage medium 122. In other instances, however, the time involved in retrieving sufficient content to provide a high definition playback of the pre-roll content would degrade the playback experience. As such, some embodiments in attempts to optimize quality while minimizing and/or avoiding delays in playback use parameters to determine which version of a pre-roll content should be requested and/or sent. Similarly, the parameters can be monitored to determine, while pre-roll content is being received, whether a different version of the pre-roll content should be substituted allowing continued adjustments to optimize playback and a user's experience. For example, the bandwidth of a communication connection or link between the remote source 130 and the playback device 124 can be monitored and when insufficient bandwidth is available to continue to receive a version of a pre-roll content with a first playback quality or resolution without exceeding a threshold delay, then adjustments can be made to request a lower quality version of the pre-roll content for the portion of the pre-roll content not yet received, the communication of the pre-roll content can be aborted along with aborting the playback of the pre-roll content, a reduced duration or edited version can be communicated or other such actions taken. Similarly, if an available communication bandwidth can support the transfer of higher quality version, a higher quality version of the pre-roll content can be transferred. One or more parameters can be monitored in optimizing the playback experience, such as but not limited to, buffer limits, memory capacity at the playback device, write performance capabilities of the playback device to write to local storage, communication link bandwidth, processing capabilities of the playback device, resolution of an intended display, and other such parameters. Again, the received content, in some instances, is conformed to a selected template, and that template may similarly be selected based on one or more of these factors.

Figure 7:
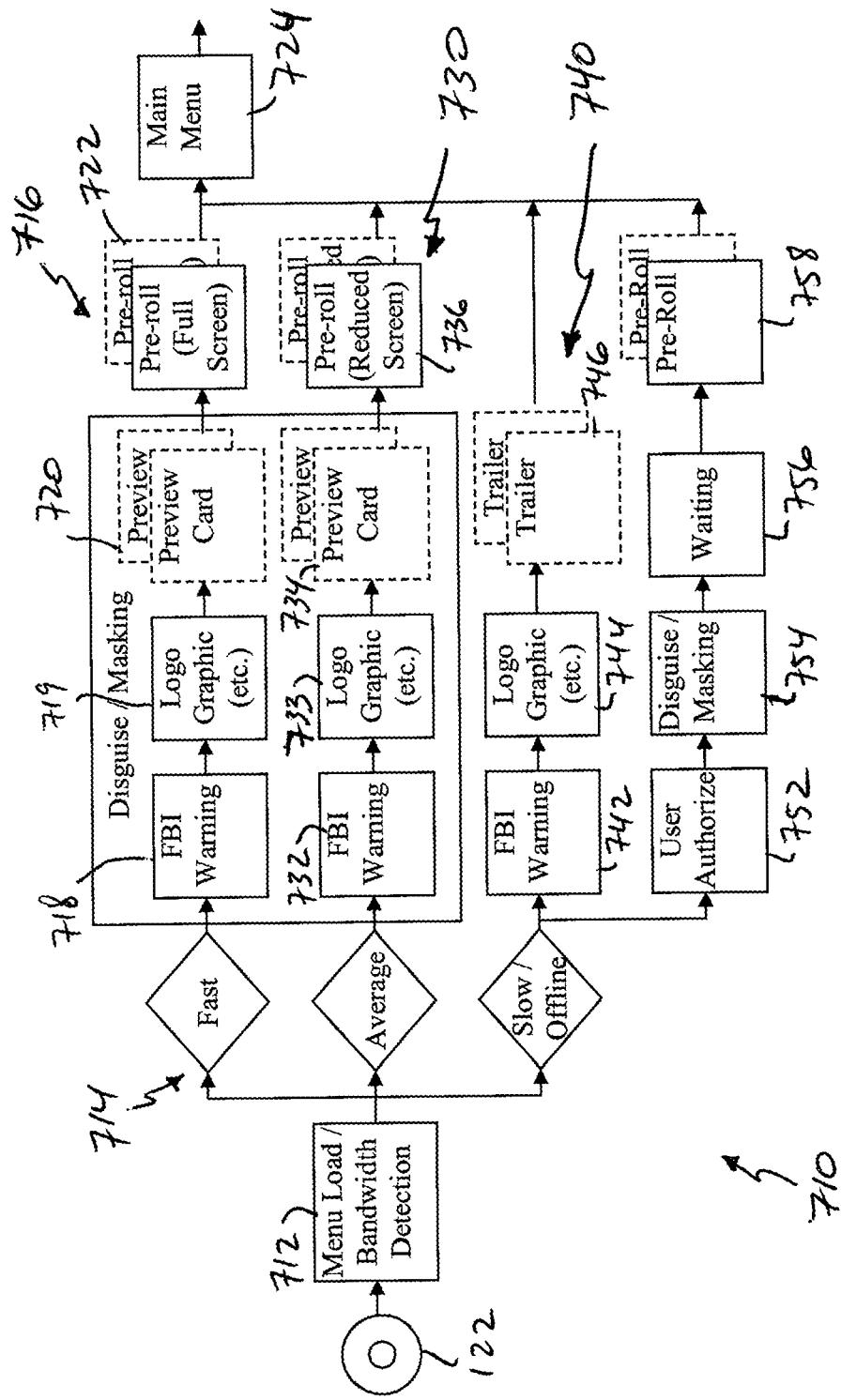
FIG. 7 shows another representative process, according to some embodiments, that allows pre-roll content to be acquired while disguising the acquisition of the pre-roll content.

FIG. 7 shows another representative process 710, according to some embodiments, that allows pre-roll content to be acquired while disguising the acquisition of the pre-roll content. In step 712, the portable storage medium 122 is initially accessed and an available communication bandwidth over a network connection, such as the distributed network 132, is determined. This determination can be achieved through one or more methods. In one example, a request is sent to the remote source to determine whether there is one or more pre-roll content available and associated with the portable storage medium and/or content on the portable storage medium. The request can include an identification of the portable storage medium 122, an identification of the user, an identification of the playback device, other such information or combinations of such information.

In step 714 the available bandwidth is evaluated to make an initial determination about the amount and/or data rates that can be supported without introducing undesirable delay, a predicted delay that exceeds a threshold or an amount of time predicted to receive a sufficient amount of the pre-roll content to initiate playback of the pre-roll content exceeds a threshold. In those instances where the determined bandwidth exceeds a first bandwidth threshold, a first playback path 716 is entered where a relatively high data rate pre-roll content is requested (e.g., a trailer to be displayed in full screen mode with at least a minimum resolution). While the relatively high data rate pre-roll content is being acquired one or more disguise content 718-720 are displayed and/or played back. As one example, a legal notification 718 can be displayed; one or more logo animations 719 can follow the legal notification identifying one or more companies associated with the content to be accessed in association with the portable storage medium; and one or more trailers, promotional and/or advertising content (e.g., commercial), a preview cards 720 or other relevant disguise content can then be displayed. A promotional and/or advertising can display advertisements, commercials, show products, provide user's with the ability to access additional sources to obtain further information and/or make purchases and other such information and services.

A transition from playing back the disguise content to playing back the pre-roll content is initiated 722. This transition can allow a current disguise content to complete playback with subsequent disguise content is not queued up or is halted from being played back. In some instances, the transition can include halting or interrupting the playback of the disguise content and playback of the pre-roll content can be initiated 722. Again, in some embodiments, the playback of the pre-roll content can be initiated while a remainder of the pre-roll content is being received, and/or other pre-roll content can continue to be acquired while a pre-roll content continues to be played back. In some instances, once the playback of the one or more pre-roll content has completed a main menu 724 is displayed or other content is displayed in accordance with a playlist on the portable storage medium.

Still referring to FIG. 7, in those instances where the detected bandwidth is less than the first bandwidth but higher than a second bandwidth threshold a second path 730 reduced bit rate pre-roll content is requested (e.g., the same trailer is requested but in a format to be displayed in less than the full screen mode, such as a half-screen mode, and still with at least the minimum resolution). Again, while partial screen or reduced quality pre-roll content is being received, one or more disguise content 732-734 are displayed and/or played back. This disguise content 732-734, in some instances, can be the same as the disguise content 718-720 (e.g., a legal notification 732, one or more logo animations 733, and a preview 734). In other instances, additional disguise content can be played back and/or a runtime of the display disguise content can be increased (e.g., the legal notification and/or preview card can be displayed for a longer duration). Once a sufficient amount of the reduced screen trailer (or lower resolution trailer) has been received, the playback of the trailer can be activated 736. Following the playback of the one or more pre-roll content the main menu 724 can be displayed.

In those instances where the bandwidth is relatively slow, or below a third threshold that would result in delays in playing back the pre-roll content, some embodiments instead it is determined not to playback the pre-roll content, abort playback of pre-roll content and/or prevent pre-roll content from being played back, and a third playback path 740 is initiated. In at least some instances, playback would be activated, for example, in accordance with a playlist as defined on the portable storage medium 122, such as displaying a legal notification 742, displaying one or more logo animations 744, potentially displaying one or more trailers 746 recorded on the portable storage medium and then advancing to the main menu 724.

In the embodiment depicted in FIG. 7 the process 710 attempts to optimize performance while still providing the user with the more relevant pre-roll content. In those instances where the playback experience is expected to be degraded beyond a selected level, for example due to unacceptable delays (which can be specified on the portable storage medium 122, specified by the user, specified by the content provider (e.g., movie studio) or other source), the playback of pre-roll content is prevented.

In some embodiments, a notification may be provided to the user indicating that pre-roll content is available and requesting authorization to retrieve the pre-roll content, or that pre-roll content is available but that the playback might experience some delays and request instructions from the user regarding whether to obtain the pre-roll content. In those instances where authorization is to be requested a fourth playback path 750 can be implemented in accordance with these embodiments. When authorization is received 752 (whether in response to the notification and request or previously authorized) one or more disguise content 754 can be displayed and/or played back. In some instances, additional disguise content may be played back, which might include playing back content from the portable storage medium. In other instances a wait indicator 756 may be displayed notifying the user that the pre-roll content is being obtained. This wait indicator may further indicate an estimated time remaining until the pre-roll content is acquired. In some instances the wait indicator may further provide an override or cancel option to the user allowing the user to terminate the downloading of the pre-roll content and continue to the main menu 724 or otherwise implement playback relative to the portable storage medium. In those instances where the user authorizes the delay and waits for the pre-roll content the pre-roll content 758 is played back once received or a sufficient amount is received to initiate playback. It is noted that FIG. 7 depicts that the user authorization 752 and/or wait indicator 756 are implemented relative to the relatively slow bandwidth connection; however, the user authorization 752 and/or wait indicator 756 can similarly be displayed with respect to the higher bandwidth connections.

Figure 8:
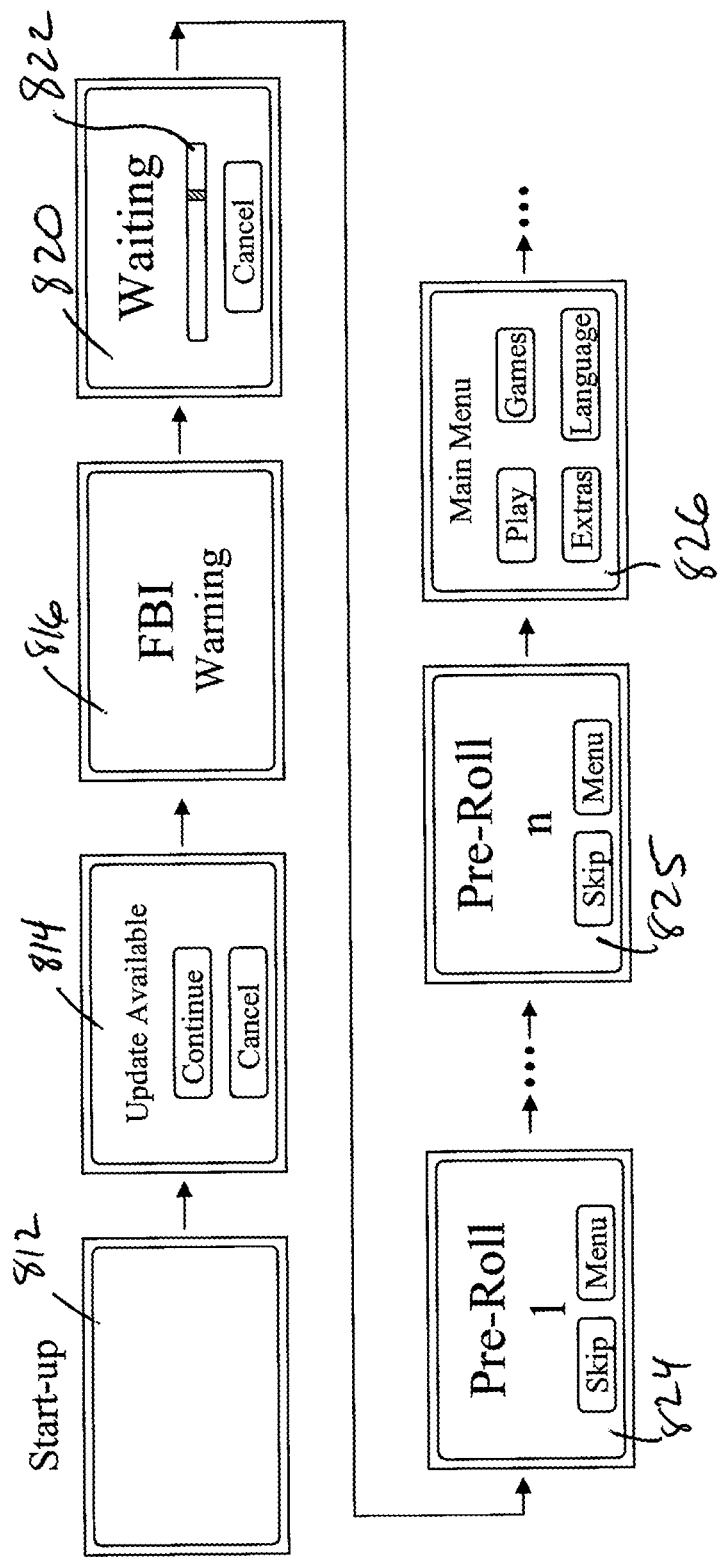
FIG. 8 depicts an example sequence of displayed content according to one implementation of the process of FIG. 7.

FIG. 8 depicts an example sequence of displayed content according to one implementation of the process 710 of FIG. 7. Similarly to FIG. 6B, a start-up blank, blue screen or other indicator of start-up 812 may be viewed upon initiation of or while waiting for the start-up to begin. An authorization to acquire updated and/or pre-roll content is displayed 814. When authorization is received one or more disguise content may be displayed 816. In those instances where the delay is expected to exceed a threshold or further disguise content is not available, a wait notification or indicator is displayed 820 notifying a user that the pre-roll content is being acquired, and in some implementations includes an estimated remaining time 822. One or more pre-roll content 824-825 may subsequently be displayed upon receiving at least a sufficient amount of the pre-roll content to initiate playback. Following the playback of the pre-roll content local content or in response to determining not to playback the pre-roll content as a result of determining a delay is expected to be or is in excess of a delay threshold, content on the portable storage medium 122 may further be played back or displayed, such as one or more trailers, logos, content or a menu, such as a main menu 826.

Figure 9:
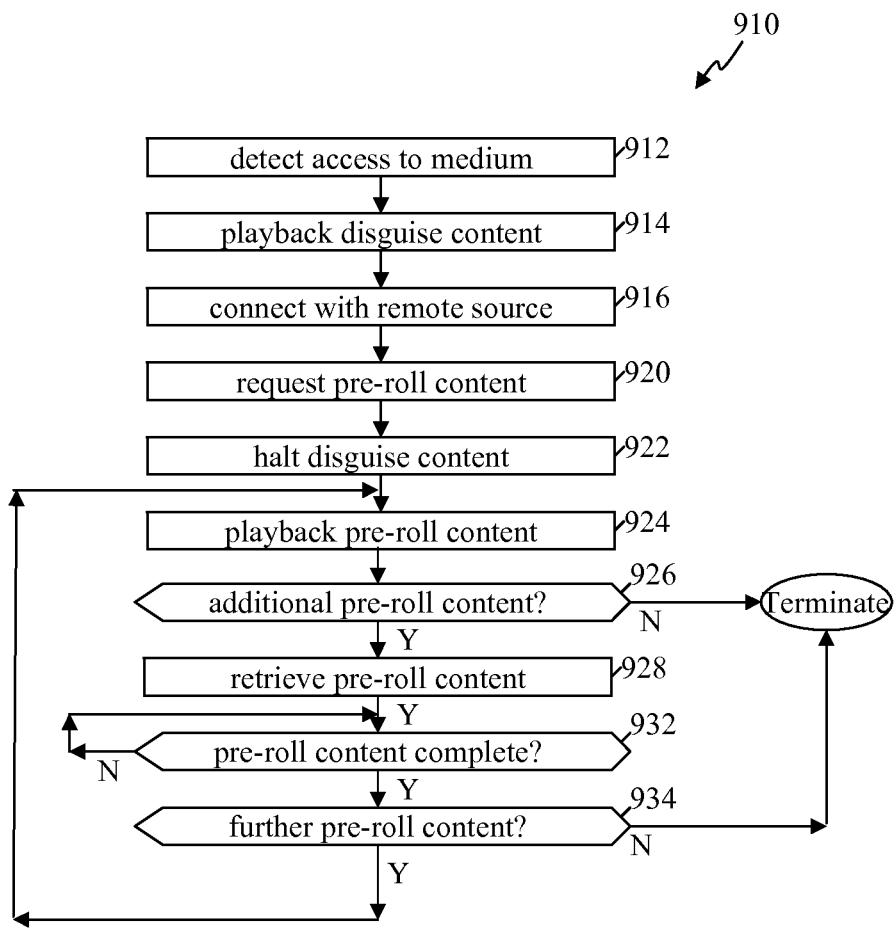
FIG. 9 depicts a simplified flow diagram of a process implemented by a playback device to obtain pre-roll content in association with a portable storage medium in accordance with some embodiments.

FIG. 9 depicts a simplified flow diagram of a process 910 implemented by a playback device 124 to obtain pre-roll content in association with a portable storage medium 122 in accordance with some embodiments. In step 912, an initial access to the portable storage medium 122 is detected (e.g., a disc is insertion into the playback device, the playback device is powered up, a portable storage medium 122 is plugged into a playback device 124 and other such detections). In step 914, playback of disguise content is initiated. In step 916, a connection is established between the playback device 124 and a remote source 130 when a connection is not already established. In some instances, the portable storage medium 122 defines the access to the remote source 130, such as a uniform resource identifier (URI), uniform resource locator (URL) or other such source designation. In other instances, the playback device 124 may know or have a default source designation. For example, the playback device 124 may have stored locally a default source designation that is used to access a default remote source 130 that can then direct the playback device to a secondary source, for example based on an identification of the portable storage medium and/or content recorded on the portable storage medium.

In step 920, the playback device 124 submits a request to the remote source 130 for pre-roll content. The request can take on many forms and can include one or more types of information. Typically, however, an identification of the portable storage medium 122 or content recorded on the portable storage medium being accessed by the playback device 124 is forwarded to the remote source 130 as part of the request. Other information can include, but is not limited to, a playback device identifier, user identifier, a level of access, and other such information. Additional information may further be provided to the remote source 130, for example, in response to requests for the information, such as user profile, account information, password or other security clearance, and other such information.

The process then transitions to playing back the pre-roll content. Some embodiments include step 922, where the playback of the disguise content is halted and/or removed from the display. In some instances, the process 910 in halting the playback of the disguise content allows the current disguise content to complete playback, for example, when the disguise content is a trailer or other content with a designated runtime. In other instances, the disguise content can be halted at a next designated halt point or a skip to a designated halt point defined relative to the disguise content (e.g., when the disguise content is a trailer, one or more scenes of the trailer may be skipped). In still other embodiments, the disguise content may be, for example, a displayed logo or other content and the halting can comprise removing the disguise content from the display.

In step 924, the transition continues where the playback device initiates playback of the received first pre-roll content. In step 926, it is determine whether additional pre-roll content is to be obtained from the remote source and cached or otherwise stored at the playback device 124 for playback. The determination in step 926 can take place while the first pre-roll content is still being received and/or played back. In those instances where no further pre-roll content is to be obtained, the process 910 terminates and playback is continued in accordance with control defined on the portable storage medium 122 and/or other instructions or playback lists as received from the remote source 130 or another source. Alternatively, when additional pre-roll content is to be retrieved, the process continues to step 930 to retrieve one or more subsequent pre-roll content, which can be from the same remote source 130 or a different remote source. In step 932, it is determine whether playback of the first pre-roll content has completed playback. In those instances where playback has not completed, the process returns to step 932 to await completion. Alternatively, the process 910 determines in step 934 whether further pre-roll content is to be played back. When there is no further pre-roll content to be played back the process terminates.

In those instances where further pre-roll content is to be played back the process returns to step 924 when a sufficient amount of the subsequent pre-roll content has been received to initiate playback of a subsequent pre-roll content. As described above, the first pre-roll content can act as disguise content while the subsequent one or more pre-roll content is being retrieved. As such, playback of a second pre-roll content may be initiated upon completion of playback of the first pre-roll content without further delay in retrieving the second pre-roll content. In some instances, the process may initiate playback of disguise content while the subsequent pre-roll content or a sufficient portion of the subsequent pre-roll content is being received to effectively implement playback when the first pre-roll content completes playback prior to the second pre-roll content being received or the sufficient portion of the second pre-roll content received.

Figure 10:
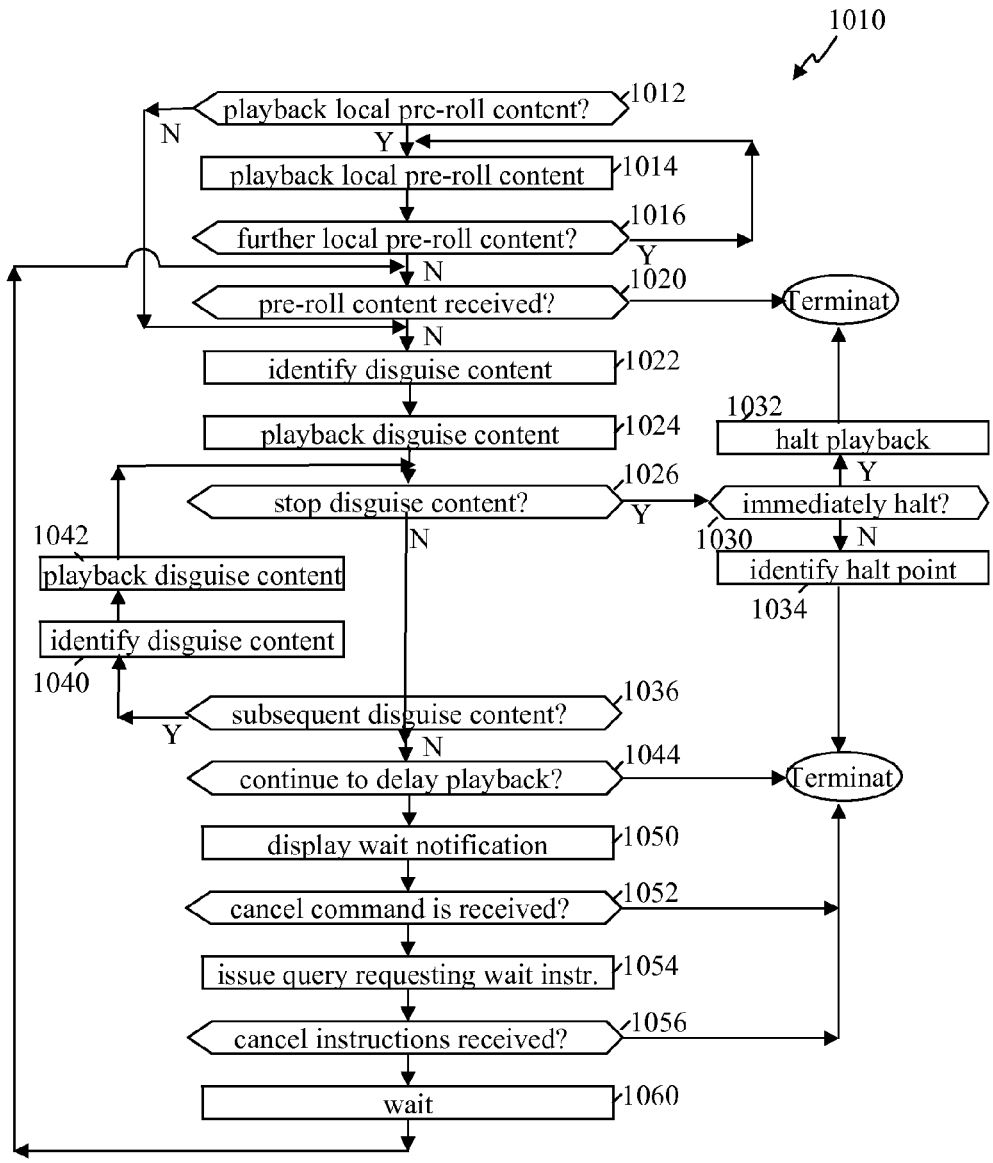
FIG. 10 depicts a simplified flow diagram of a process implemented by a playback device in playing back disguise content while pre-roll content is acquired from a remote source according to some implementations.

FIG. 10 depicts a simplified flow diagram of a process 1010 implemented by a playback device 124 in playing back disguise content while pre-roll content is acquired from a remote source 130 according to some implementations. In some instances, the process 1010 can be implemented while the process 910 is being implemented, such as to implement step 914. In step 1012, it is determined whether previously obtained and locally stored pre-roll content is to be played back. As described above and further below, in some embodiments the playback device 124 may have previously received and locally stored pre-roll content. The playback device may have retrieved pre-roll content in response to previously accessing a portable storage medium (which could be the portable storage medium currently being accessed or a different portable storage medium). For example, the playback device 124 may have previously acquired pre-roll content in relation to a separate portable storage medium and that previously acquired pre-roll content may also be associated with the portable storage medium 122 currently being directly accessed by the playback device, or similarly, the playback device 124 may have activated an unbound application in relation to a previously accessed portable storage medium that retrieved one or more pre-roll content, disguise content or other relevant content. As such, some embodiments are configured to store at the playback device 124 pre-roll content previously acquired by the playback device to be played back in relation to the same or subsequently accessed portable storage mediums. As such, the playback device 124 may locally store content, including pre-roll content, that can be played back without delays associated with and/or waiting for content to be acquired from a remote source 130.

In determining whether locally stored pre-roll content is to be played back an evaluation of metadata associated with the locally stored pre-roll content may be performed to determine whether the locally stored pre-roll content is relevant to the portable storage medium 122 currently being accessed and/or whether the locally stored pre-roll content is authorized to be played back in association with the currently accessed portable storage medium. For example, it can be determined whether the content owner of the locally stored pre-roll content (e.g., a movie studio) similarly owns the content recorded on the portable storage medium; whether the metadata defines an authorization to be played back in association with the content on the portable storage medium 122; whether a user has authorization to view the locally stored pre-roll content (e.g., based on a user profile, age of user or other such information); whether the previously received pre-roll content has expired; a hierarchy of pre-roll content relative to other pre-roll content and/or other content, and other such factors. Similar evaluations of data defined on the portable storage medium can be performed to confirm that the content owners of the content recorded on the portable storage medium authorize playback of the locally stored pre-roll content in association with the portable storage medium 122. In some embodiments, the remote source 130 can notify and/or instruct the playback device 124, for example in response to a request for pre-roll content, to initiate playback of one or more locally stored pre-roll content. These instructions can be defined in a sequence or other instruction provided by the remote source 130. In other implementations, an identifier, name, path, link, URL or the like may be used to identify content to be played back and the playback device 124 can initiate search local content, including the portable storage medium 122, to determine whether the content is locally stored.

Still referring to FIG. 10, when it is determined that previously acquired pre-roll content is not locally stored and/or is not to be played back in association with the currently accessed portable storage medium 122 the process 1010 advances to step 1022 to select different disguise content. In those instances where previously acquired pre-roll content is locally stored and is to be played back in association with the currently accessed portable storage medium 122, step 1014 is entered where playback of the locally stored pre-roll content is initiated. The playback of the locally stored pre-roll content can thus, in some implementations, be utilized not only as pre-roll content to provide a user with access to content not recorded on the portable storage medium, but additionally can be utilized as disguise content such that as the previously received and locally stored pre-roll content is being played back additional pre-roll content can be obtained from a remote source 130 to be played back following the playback of the locally stored pre-roll content. In some embodiments, one or more disguise contents may be displayed and/or played back while implementing step 1012, such as when communicating with the remote source 130 to determine a sequence and/or whether the playback device 124 should initiate playback of one or more locally stored pre-roll content.

In step 1016 it is determined whether further previously received and locally stored pre-roll content is to be played back upon completion of the playback of the first locally stored pre-roll content. In those instances where further locally stored pre-roll content is to be played back the process 1010 returns to step 1014 to initiate playback of the further locally stored pre-roll content upon completion of the playback of the locally stored pre-roll content. When further locally stored pre-roll content is not to be played back or there is no other locally stored pre-roll content to be played back step 1020 is entered to determine whether a sufficient amount of the pre-roll content has been received from a remote source 130 to return to step 924 to initiate playback of currently received pre-roll content. When there is a sufficient amount of pre-roll content received to be played back the process 1010 terminates to return to play back the acquired pre-roll content.

The process 1010 continue to step 1022 when it is determined in step 1020 that there is not a sufficient amount of pre-roll content received from a remote source 130 to be played back and, in some instances, in response to determining in step 1012 that locally stored pre-roll content is not to be played back. In step 1022, an identification of which content is to be displayed and/or played back as disguise content in attempts to disguise or mask the acquisition of the pre-roll content from a remote source 130. The identification of the disguise content can be based on predefined disguise content, a playlist stored on the portable storage medium, based on an estimated time to obtain a sufficient amount of the pre-roll content to initiate playback, determined based on previous disguise content played back, determined based on disguise content that may have been acquired from a remote source, based on disguise content previously viewed, based on playback timing, identified by the remote source providing the pre-roll content and/or other such factors. In some implementations, the selection of disguise content is defined and/or specified in the pre-roll application, and in these implementations disguise content is chosen as part of the authoring and stream selection model is then tuned to the defined disguise content.

In step 1024, playback of the identified and/or selected disguise content is initiated. In step 1026, it is determined whether the playback device is to stop or interrupt the play back of disguise content, for example, because the pre-roll content has been received, a sufficient amount of the pre-roll content has been received to initiate playback, a user has issued a command (e.g., a skip or cancel command), or other such factors. When the playback of the disguise content is to be halted step 1030 is entered to determine whether the disguise content is to be immediately halted. For example, the disguise content may simply be a displayed logo that can be halted without adversely affecting the playback experience. Alternatively, the disguise content may be a video clip, a trailer or other such content that potentially should complete playback. Step 1032 is entered when it is determined that the disguise content is to be immediately halted and playback of the disguise content is halted and the process 1010 is terminated. In those instances where the playback of the disguise content is not to be immediately halted the process 1010 continues to step 1034 to identify halt points or skip points within the disguise content, or when the disguise content is to completed playback. Upon reaching halt points or completion of playback the process 1010 then terminates to initiate playback of the pre-roll content received from the remote source, for example returning to step 924 of the process 910.

When it is determined in step 1026 that the playback device should continue playing back disguise content the process continues to step 1036 to determine whether subsequent disguise content is available to be played back. When subsequent disguise content is available, step 1040 is entered to identify a subsequent disguise content. In step 1042 playback of the subsequent disguise content is initiated upon completion of the displaying and/or playing back of the current disguise content. The process then returns to step 1026 to continue to evaluate whether further disguise content is to be played back and/or displayed.

In those instances where it is determined in step 1036 that further disguise content is not available step 1044 is entered to determine whether to continue to delay playback relative to the portable storage medium control until the pre-rolled content can be obtained and played back, or to terminate obtaining the pre-roll content and initiate playback of content on the portable storage medium, e.g., to display a main menu or initiate playback of a main title. In some instances the user may specify that delays should be tolerated so that the user can receive the pre-roll content, while in other instances a user may not want to wait for playback. The determination of whether to wait can be based, for example, on a user profile, defined by the portable storage medium (e.g., settings), specified by the remote source 130, a user selection in response to a query to the user, or other such instructions or designations. When it is determined that the process 1010 should not to wait step 1046 is entered where the process terminates upon a determination that playback of the disguise content has completed.

In step 1050, a wait or delay notification is displayed (e.g., wait notification 820). In some embodiments an estimated time 822 to retrieve the pre-roll content, or at least a sufficient portion of the pre-roll content, is displayed. For example, a count down timer with an estimated time to retrieve the pre-roll content can be displayed, a bar graph showing an amount of the pre-roll content received and a remainder of the pre-roll content to be received can be displayed or other such indications. Additionally in some embodiments, in response to determining that the process should wait to receive the pre-roll content the process 1010 can optionally enter step 1052 to determine whether a cancel command is received and/or to query a user for instructions on whether to continue to wait for the pre-roll content. When a query is to be generated step 1054 is entered and a query is issued to the user requesting instructions regarding whether to continue to wait for the pre-roll content. This query can be issued as part of the wait notification, displayed in cooperation with the wait notification (e.g., a cancel option), displayed in place of the wait notification and/or displayed over the wait notification.

In step 1056 it is determined whether instructions are received from the user to cancel waiting for the pre-roll content. The process 1010 terminates when instructions are received not to wait for the pre-roll content and playback control returns to the playback device 124, typically as dictated by the portable storage medium 122 being accessed (e.g., a playlist on the portable storage medium). Alternatively, in step 1060 the process continues to wait until the pre-roll content is received or a sufficient amount of the pre-roll is received to initiate playback. In some instances the process returns to step 1020 to determine whether a sufficient amount of the pre-roll content has been received.

As described above, the present embodiments provide for the playback of pre-roll content associated with a portable storage medium such that a user can obtain relevant and/or current content. Further, some embodiments attempt to mask or disguise the time needed to retrieve the pre-roll content, including when that pre-roll content has to be retrieved from a remote source 130. In attempts improve the user experience and to limit the delay in obtaining the pre-roll content some embodiments initiate playback of the pre-roll content without fully receiving the complete pre-roll content and instead initiates playback as the pre-roll content is being received (e.g., received as streamed content, through progressive downloads or other such methods that allow playback to be initiates prior to receiving all of a pre-roll content). Further, some embodiments try to provide a quality playback experience consistent with a user's expectations or as close to the user's expectations as possible relative to conditions at the time the content is being received and/or played back. As a result, some embodiments may adjust playback and/or adjust a data stream being delivered to the playback device 124 to compensate for various conditions, such as communication link bandwidth, buffer levels, processing capabilities, playback capabilities and other such conditions and factors. These adjustments can result in a reduced resolution, a reduced data rate, changes in data quality, not playing back one or more pieces of content, playing back a shortened version, and other such compensations.

Figure 11A:
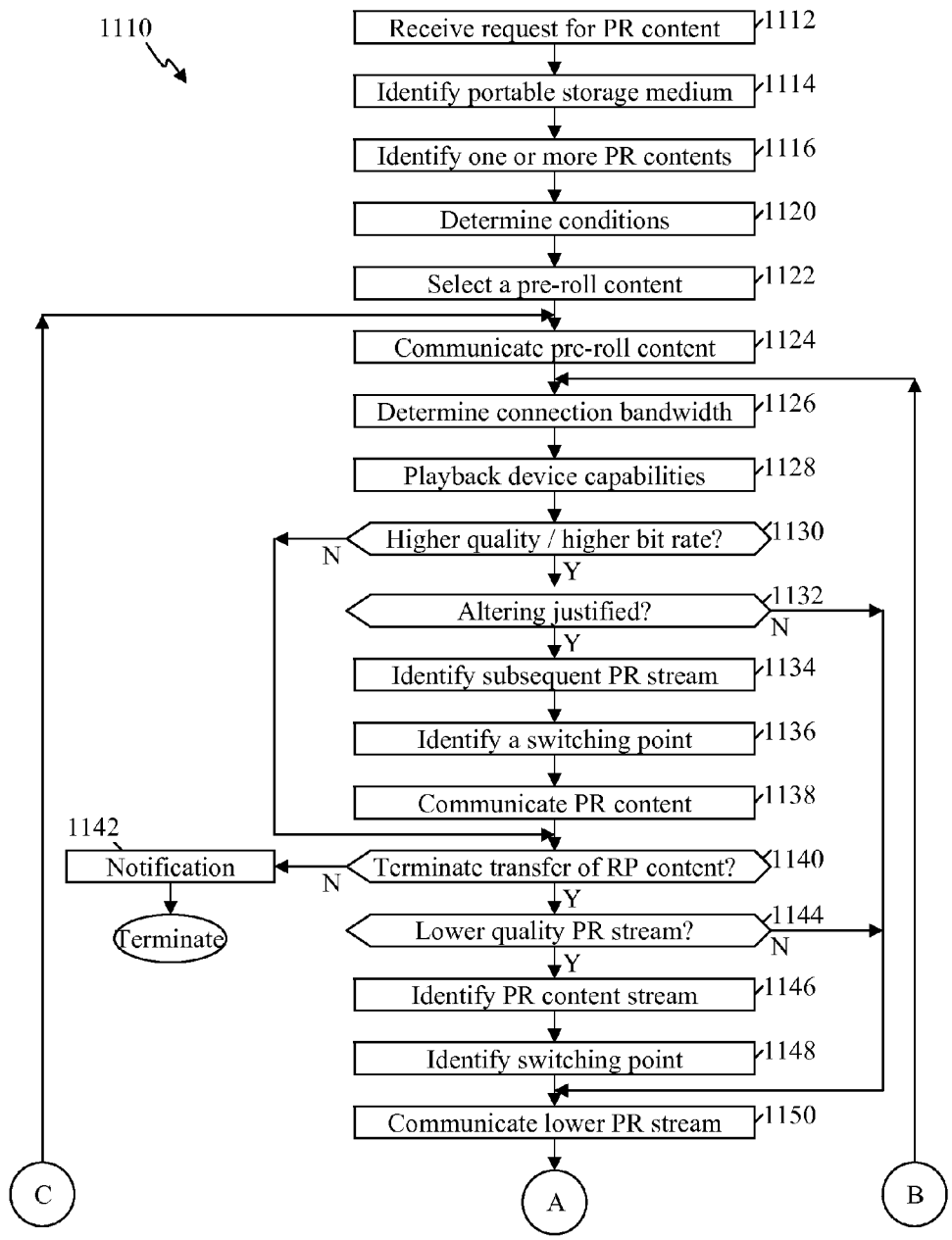
FIGS. 11A-B depict a simplified flow diagram of a process implemented by a source for use in making adjustments in communicating the pre-roll content to a playback device.
Figure 11B:
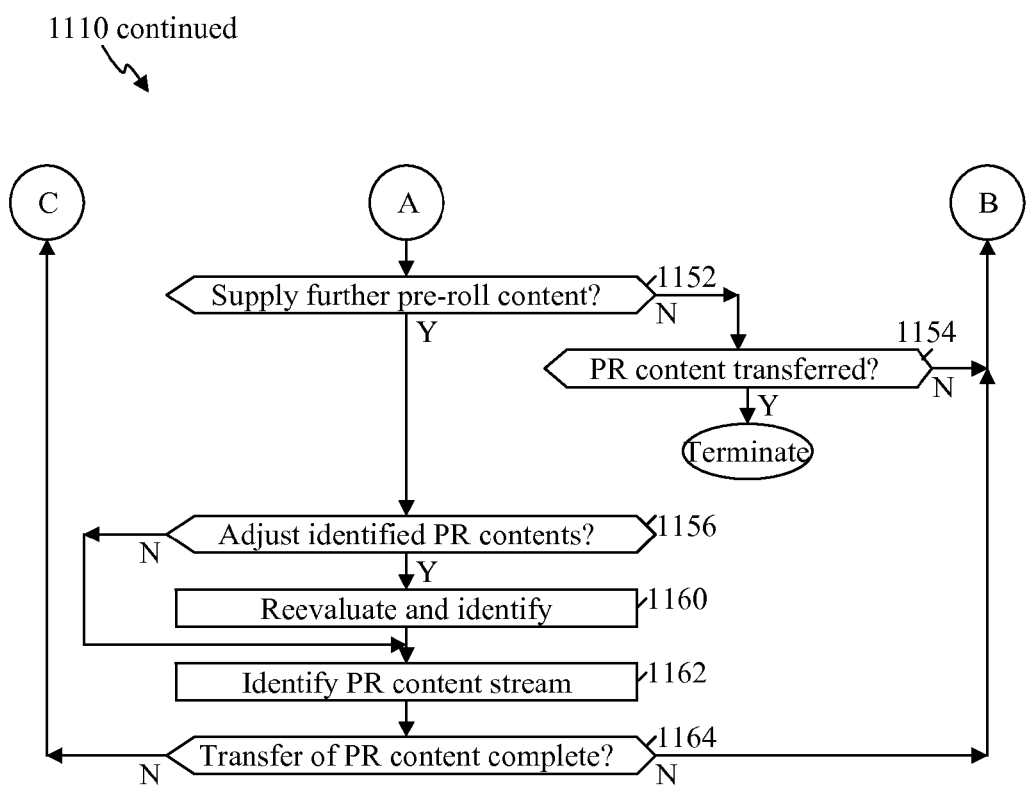

FIGS. 11A-B depict a simplified flow diagram of a process 1110 implemented by a remote source 130 for use in making adjustments in communicating the pre-roll content to a playback device in response to changes in conditions and/or determinations that conditions allow for or dictate changes relative to supplying the pre-roll content. In step 1112, a request for pre-roll content is received. In step 1114, the portable storage medium 122 and/or the content recorded on the portable storage medium associated with the request is/are identified. In some embodiments, other parameters are acquired or determined, such as a user identification, a playback device identification and other such information that can be utilized in selecting pre-roll content.

In step 1116, one or more pre-roll content associated with the identified portable storage medium are identified. The identification can be based on an evaluation of metadata of potential pre-roll content, based on sequences defined relative to the portable storage medium 122, based on a user's history and/or other such factors. In optional step 1120, an initial determination is made of conditions. This initial determination can included determining an available bandwidth over the communication connection between the remote source 130 and the playback device 124; determine a previous bandwidth available when pre-roll content was previously forwarded to the playback device 124; identify a requested data quality and/or resolution; and other such conditions.

In step 1122, a pre-roll content file or stream is selected from the identified one or more pre-roll contents. The selection of the pre-roll content can be based on one or more factors as more fully described below, but some of these factors may include a priority associated with the portable storage medium and/or the identified one or more pre-roll content, the initial conditions when identified, previous pre-roll content accessed by the user and/or playback device, user profile information, user preferences, the user's past viewing patterns and other such information.

In step 1124, communication of the pre-roll content is initiated. In step 1126, a connection bandwidth is determined. In step 1128, playback device capabilities are identified if they are not already known based on the previously identified conditions. The identification of capabilities can be based on a playback device identifier, capability information provided by the playback device in response to queries or the like. In step 1130, it is determined whether the bandwidth and/or playback device can support a higher quality pre-roll content and/or a higher bit rate. In those instances where at the time it is determined that a higher quality or higher data rate cannot be supported the process skips to step 1140. Alternatively, when a higher quality or data rate can be supported step 1132 is entered to determine whether a current timing justifies altering the content stream to a higher quality. In some instances, the pre-roll content may be relatively short or the remainder of the pre-roll content to be communicated may be relatively small and as such changing the data stream may not be justified; in other instances the change in quality may not be significant based on the capabilities of the playback device; or other such factors. In those instances where modifications are not justified the process skips to step 1152 to determine whether further pre-roll content is to be supplied to the playback device.

Step 1134 is entered when a change is justified to identify a subsequent pre-roll content file or stream of the same pre-roll content with a higher quality, resolution and/or the like (e.g., selecting pre-roll content file or stream that provides high definition playback instead of standard definition television resolution). In step 1136 a transition or switching point is identified. The switching point provides a point within the pre-roll content to allow for a transition from the lower quality pre-roll content file or stream to the higher quality pre-roll content file or stream. For example, the switching point can be a point where the transition is less likely to be detected by a user, such as a scene change, an action sequence with rapid variations in the displayed images, a threshold change of an image (e.g., a threshold number of pixel changes) or other such points. In other instances, the switching point may be an intera-coded frame (I-Frame), a chapter point or other such structure of the content. In some embodiments, as further described below, some embodiments evaluate conditions and/or thresholds in response to a request or each request for subsequent content. Further, some embodiments transmit a request (e.g., a "GetNext" request) from the playback device 124 for each item or segment of pre-roll content to be played back, and an evaluation may be performed in response to one or more or each request for a subsequent item or segment. The evolution can consider metric data (e.g., bandwidth, memory capacity, read rate, write rate, resolution(s), and/or other such metrics) to determine whether to select a different pre-roll stream of the pre-roll content. The request can be made either at the frequency of content items, at the frequency of individual chunks to get finer grained control, or other frequencies. In some implementations, the switching between streams at mid-playback is constrained to streams matching a currently playing template (e.g., equivalent to a BD-ROM playlist construct). Typically, the higher quality pre-roll content file has a corresponding switching point so that the playback when switched between pre-roll content files does not result in a skip, lost content or other such adverse affects. In step 1138, the content source 130 halts the communication of the lower quality pre-roll content at the switching point and initiates the communication of the higher quality pre-roll content stream from the switching point.

Step 1140 is entered when it is determined in step 1130 that a higher quality or higher data rate cannot be supported and in some instances following step 1138, to determine whether the transfer of the pre-roll content should be terminated. This termination can be based on insufficient bandwidth, lack of playback device capabilities and/or other such factors. When the transmission should be terminated step 1142 is entered where transmission is terminated, and in some instances, the playback device 124 is notified to initiate playback of content on the portable storage medium 122 (e.g., initiate playback of a trailer recorded on the portable storage medium or advance to a main menu).

In step 1144, it is determined whether a lower quality pre-roll content file or stream should be forwarded to the playback device 124. As described above, the changes in bandwidth, changes in conditions at the playback device (e.g., buffer fill level(s) relative to one or more buffer thresholds, error rates, changing conditions on the playback device (e.g., related to CPU resource availability impacting the through put performance of the playback device), and the like), and other such factors may indicate that a change could be beneficial. For example, a change in bandwidth of the communication link below a threshold level can designate a change to a second stream of the pre-roll content. The threshold, in some implementations, may be determined based on an identification or prediction that the playback device cannot sustain continuous playback of the first stream of the pre-roll content received at a higher bit rate without interrupting the playback of the pre-roll content. This determination can be performed at the playback device; however, may in some instances be performed by the remote source. In some embodiments, the remote source 130 queries the playback device 124 for conditions, settings, parameters and/or status information to be used, at least in part, in determining capabilities and/or current conditions. In other instances, the playback device 124 forwards relevant information without prompting by the remote source 130. Further, there may be parameters and/or settings that restrict reductions in quality and/or that restrict reductions below threshold qualities. For example, a parameter may dictate that a content owner or a user viewing the content would prefer to display a wait notification or incur delays in playing back the pre-roll content instead of supplying a lower quality content or a content below a threshold quality. Similarly, the portable storage medium 122 may dictate that a threshold quality should be maintained, and in those instances where delays might occur in receiving and playing back content at the threshold quality a wait notification can be displayed or simply a black screen can be displayed until playback of the pre-roll content can effectively commence. Again, the wait notification may include and/or be accompanied by an indication of a time remaining to receive the pre-roll content and/or a sufficient portion of the pre-roll content. In those instances where the lower quality pre-roll content file is not to be forwarded the process advances to step 1152 to determined whether further pre-roll content is to be supplied to the playback device.

Alternatively, when the lower quality pre-roll content is to be forwarded the process continues to step 1146 to identify a subsequent pre-roll content file or stream of the same pre-roll content with a lower quality, resolution and/or reduced bit rate. In step 1148, a transition or switching point is identified providing a point within the pre-roll content to allow for a transition from the higher quality pre-roll content file to the lower quality pre-roll content file. In step 1150, the content source 130 stops sending the higher quality pre-roll content file and starts sending the subsequent lower quality pre-roll content file from the switching point.

In step 1152 it is determined whether further pre-roll content is to be supplied to the playback device. When further pre-roll content is not to be supplied the process advances to step 1154 to determine whether the pre-roll content file being transferred has been fully transferred. When the pre-roll content file has not been transferred the process returns to step 1126 to reevaluate conditions or wait until the transfer is completed. Once the transfer is completed the process 1110 terminates.

When it is determined in step 1152 that further pre-roll content is to be supplied step 1156 is entered to determine whether the identified one or more pre-roll contents is to be adjusted. Again, in some instances the conditions may dictate that fewer pre-roll content be forwarded, different pre-roll content be forwarded, that no pre-roll content be forwarded or other such adjustments be made. For example, in some instances when the detected communication bandwidth is below a threshold bandwidth the number of pre-roll content to be transferred may be reduced. As a further example, because of the detected bandwidth and/or playback device capabilities the initially identified one or more pre-roll content may be adjusted to include higher quality content, lower quality content, shorter versions of pre-roll content or other such adjustments. When adjustments are not to be made the process advanced to step 1062.

When adjustments are to be implemented, step 1160 is entered to reevaluate the conditions and identify a subsequent one or more pre-roll contents relative to the reevaluation of the conditions. In step 1162 a subsequent pre-roll content file or stream to be forwarded to the playback device is identified. In step 1164 it is determined whether the transfer of the pre-roll content file has been completed. When the pre-roll content file has not been fully transferred the process 1110 returns to step 1126 to reevaluate conditions or returns to step 1164 to wait until the transfer is completed. Once the transfer is completed the process 1110 returns to step 1124 to initiate the communication of the subsequent pre-roll content file.

Figure 12:
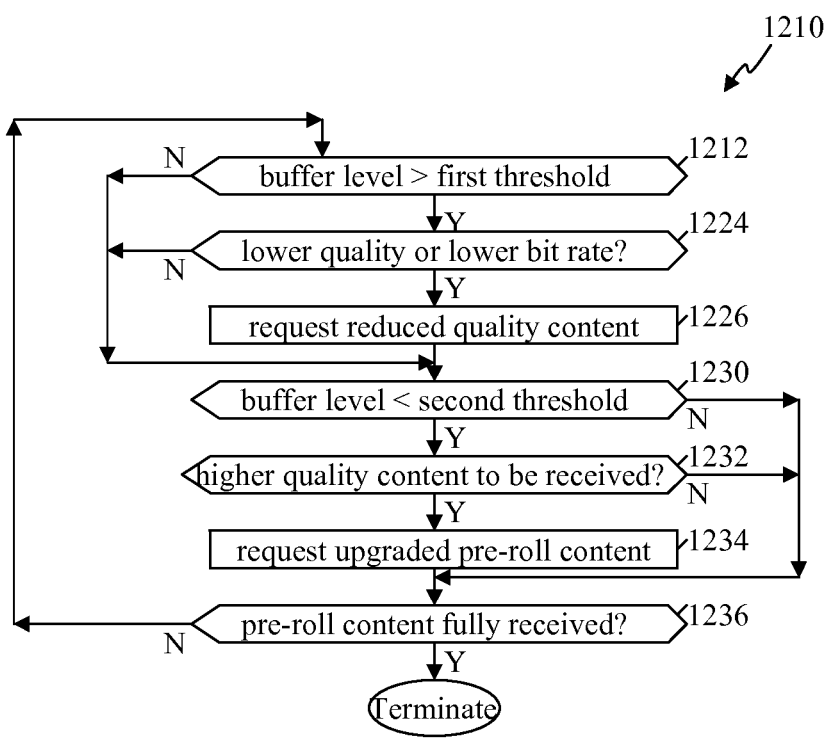
FIG. 12 depicts a simplified flow diagram of a process that may be implemented by the playback device, according to some embodiments, to request adjustments to the pre-roll content being received from a remote source.

FIG. 12 depicts a simplified flow diagram of a process 1210 that may be implemented by the playback device 124, according to some embodiments, to request adjustments to the pre-roll content being received from a remote source 130. Again, the requests can be for content with a lower bit rate and/or lower quality, a higher quality and/or higher bit rate, less content or other such adjustments. In step 1212 it is determined whether a buffer level is greater than a first threshold buffer level. For example, it can be determined whether a buffer level is greater than a buffer level threshold indicating that the buffer is close to full and may induce delays. When the buffer level does not exceed the first buffer threshold the process 1210 advances to step 1230 to further evaluate the buffer levels.

In step 1224 it is determined whether a lower quality or lower bit rate pre-roll content should be requested. In some instances there may be instructions that lower quality content should not be played back and instead a delay should be accepted and/or a delay notification displayed. For example, the playback device may have instructions, the portable medium 122 or the content may define, and/or the remote source 130 may specify and/or have instructions that the playback device 124 should not playback lower quality content. When lower quality or reduced bit rate content is to be requested step 1226 is entered where a request is issued to the remote source 130 for the reduced quality content.

In step 1230 it is determined whether a buffer level of the playback device falls below a second buffer level threshold, whether playback of the pre-roll content enters a data starve situation and/or whether there is insufficient pre-roll content to continue playback. When the buffer levels do not fall below the second buffer threshold, the process 1210 advances to step 1236. Alternatively, when buffer levels do fall below the second buffer level threshold step 1232 is entered to determine whether a higher quality content can be received. This can depend on one or more factors, such as but not limited to the buffer capabilities, the connection bandwidth, processing capabilities of the playback device, display resolution, and other such parameters and factors. When a higher quality pro-roll content can be received the process 1210 continues to step 1234 where the playback device 124 can issue a request to the remote source 130 for an upgraded or higher quality pre-roll content. In step 1236 it is determined whether the pre-roll content has been fully received. In those instances where it has been fully received the process 1210 can terminate. Alternatively, the process can then return to step 1212 to continue to monitor the conditions relative to receiving the pre-roll content.

The embodiments described above are generally described with reference to the pre-roll content being played back relatively early on in the playback process, such as one of the first few pieces of content, if not the first piece of content, played back in response to accessing a portable storage medium 122. It is noted, however, that pre-roll content can be acquired during any portion of the playback of content recorded on the portable storage medium 122 and/or content acquired in relation to the portable storage medium. For example, pre-roll content can be acquired and played back in place of a portion of a main title recorded on the portable storage medium. As a specific example, a main title can include a first scene with a first length that is played back during the playback of the main title. A pre-roll content can be acquired from a remote source 130 that comprises the first scene with enhanced content, such as an extended version of the first scene with additional content not present on the portable storage medium 122. This enhanced pre-roll content can be acquired in association with the portable storage medium, and in some instances during the playback of content recorded on the portable storage medium 122, including the main title in which the enhanced pre-roll content is to be incorporated during playback.

In some embodiments, the portable storage medium 122 may include a trigger detected during playback of the main title that instructs the playback device to initiate the acquisition of the enhanced pre-roll content. This allows the portable storage medium 122 to initiate a push of the pre-roll content from the remote source. In other embodiments the portable storage medium may include one or more scripts, sequences or schedules that when utilized similarly trigger the playback device 124 to retrieve the enhanced pre-roll content. This script, in some instance, can include time codes defining a time relative to playback of content when the playback device 124 is to initiate retrieval, and can further define a remote source designation (e.g., a URI, URL or other such identifier). In some embodiments a remote source 130 may provide the playback device 124 with a script that corresponds with the portable storage medium and can similarly define when and from what remote source 130 pre-roll content is to be acquired. In these embodiments, the remote source supplied script can be a more current and up to date script than that recorded on the portable storage medium 122 allowing greater flexibility and increased functionality. Further, in some instances the remote source supplied script may override a script recorded on the portable storage medium 122. As such, the portable storage medium 122 may be supplied with a script in the event playback occurs without the benefit of obtaining the remote source supplied script while still allowing the playback device 124 to utilize the remote source supplied script in place of and/or in cooperation with the script recorded on the portable storage medium should the remote source script become available to the playback device 124. Further, the remote source 130 can maintain one or more scripts relative to a portable storage medium 122, and based on communication link bandwidth and/or information provided by the playback device 124 the remote source 130 can selected one of the scripts in accordance with the bandwidth and/or other information, and utilize the selected script to identify appropriate pre-roll content files to be transferred to the playback device 124. Similarly, as factors may change, such as changes in bandwidth, the remote source 130 may select a different script or select a sub-script within a script that corresponds to the updated parameters.

Additionally, in accordance with some embodiments, the script may be changed over time, including changed during the playback of content in association with the portable storage medium 122, a different script can be selected or a different sub-script within a script can be selected. For example, the remote source 130 may change or select a different script in response to changes in the connection between a remote source and the playback device. As described above, when the bandwidth of the connection changes the pre-roll content supplied to the playback device may be varied. This variation may be implemented by a script that instructs the selection of different pre-roll content, the same pre-roll content but different versions (e.g., lower quality or small displayed image size), fewer pre-roll content or other such actions. In other implementations, the variation in selecting pre-roll content by selecting a different script that specifies the selection of pre-roll content in accordance with the determined bandwidth or other parameters (e.g., reducing the amount of content downloaded, the quality downloaded, the options available, the number of pre-roll content provided in cooperation with the portable storage medium and other such variations).

FIG. 13 depicts a simplified table depiction of an example script 1310 with a plurality of sub-scripts 1312-1315 in accordance with some embodiments. It will be appreciated that the script 1310 is an example and that the script can be formatted and/or configured in numerous ways (e.g., as a listing, split into multiple different scripts, or other such configurations), and further that more or less information may be provided depending on different factors. In some instances, the script 1310 is a script utilized by a remote source 130 in selecting pre-roll content to forward to a playback device 124. The script can define parameters that are used to identify which sub-script to employ in selecting pre-roll content. These parameters can be substantially any relevant parameter that may have a bearing on the type and/or amount of information and/or content that can be forwarded. For example, the parameters can include communication link bandwidth 1318, buffer levels 1320, resolution capabilities of the playback device 124 and other such parameters.

The script 1310 further identifies one or more pre-roll content 1324-1331 to be forwarded to the playback device when dictated by the parameters. Some embodiments optionally also identify a code, time codes, time stamps 1336 or other designation that define a relevant playback timing of the pre-roll content relative to content on the portable storage medium 122. For example, a zero time stamp (e.g., 00.00.00) can dictate that the corresponding pre-roll content is to be forwarded upon request for the pre-roll content to be played back early in the playback sequence and typically prior to a main menu and main title content, while non-zero time stamps are to be played back relative to the designated timing of playback relative to the portable storage medium. In some instances, the script 1310 can additionally identify a source 1340 where the playback device 124 can acquire the corresponding pre-roll content. Other embodiments can identify a title content recorded on the portable storage medium 122 with which a pre-roll content corresponds, instructions to forward even if delays have to be endured by the user and other such information.

Figure 14:
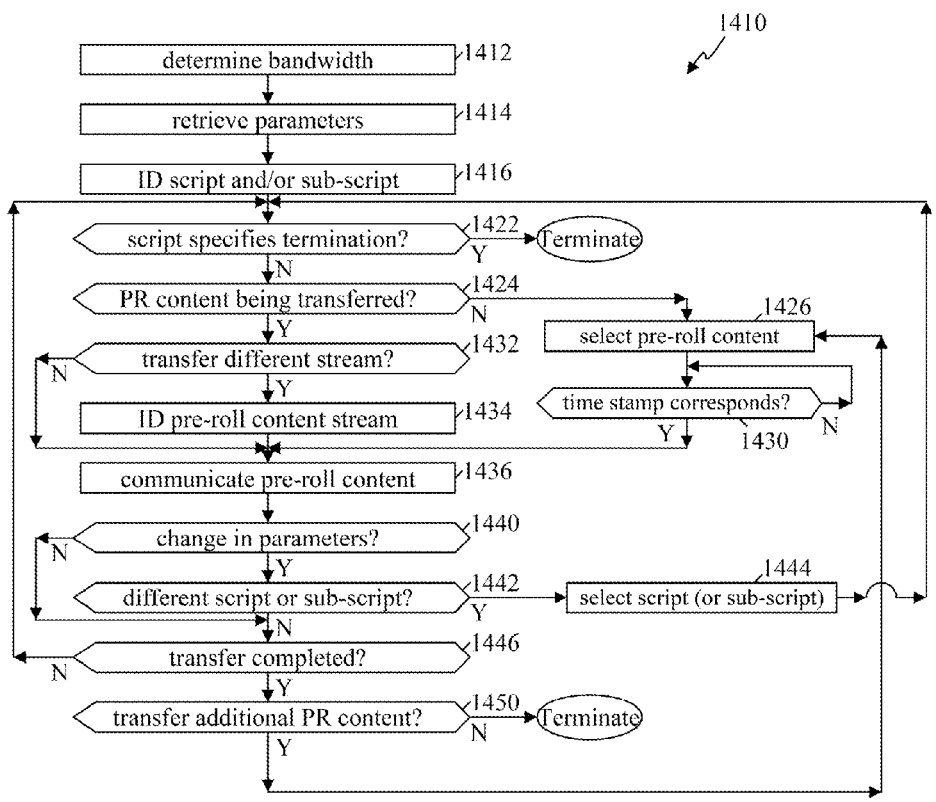
FIG. 14 depicts a simplified flow diagram of a process implemented by a source of identifying and forwarding pre-roll content that the playback device can access according to some embodiments.

FIG. 14 depicts a simplified flow diagram of a process 1410 implemented by a remote source 130, such as a server, for identifying and forwarding pre-roll content that the playback device 124 can access, such as accessed over the network 132 according to some embodiments. In step 1412, a current communication link bandwidth is identified. Some embodiments include optional step 1414 to identify playback device parameters and/or user parameters that can further limit content delivery, such as buffer levels, resolution, instructions defined by the playback device 124, instructions defined by a user (e.g., instructions not to transfer pre-roll content), user profile parameters, and other such parameters. In step 1416, a script 1310 is identified, a sub-script is identified within a script and/or instructions are identified within the script that corresponding to the identified parameters, such as the bandwidth and/or other parameters or limits in accordance with the playback device 124.

In step 1422, it is determine whether the identified script (or sub-script) dictates that the transfer of pre-roll content should be terminated. This can include cancelling the transfer of a remainder of a pre-roll content that is actively being transferred and/or preventing the transfer of pre-roll content, for example, because of insufficient bandwidth that likely would result in excess delays. In those instances where the transfer is to be interrupted and/or prevented the process 1410 terminates. A notification may optionally be communicated to the playback device 124, for example, notifying the user that the pre-roll content could not be provided and may further identify a reason why it is not being provided and/or one or more options to try and correct the problem(s).

When it is determined in step 1422 that pre-roll content is to be communicated step 1424 is entered to determine whether a pre-roll content is currently being transferred. When a pre-roll content is not actively being transferred the process continues to step 1426 to select appropriate pre-roll content to be forwarded as defined in the script. This selection would follow the script and depend on which portions of the script had already been implemented and the subsequently designated pre-roll content. Some embodiments include optional step 1430 to determine whether a time stamp is defined in the script 1310 and whether that time stamp corresponds with a current playback timing. In those instances where the timing does not correspond, the process 1410 returns step 1430 to continue to monitor bandwidth and/or other parameters, and can continue to loop until the time stamp corresponds with the playback timing, or a different script or sub-script is selected that alters the path along the process 1410. When the timing stamp is present and does correspond with playback time the process advances to step 1436.

When it is determined in step 1424 that a pre-roll content (e.g., Pre-roll_file_1.1) is actively being transferred step 1432 is entered to evaluate the script 1310 and/or sub-script 1312-1315 to determine whether a different pre-roll content file or stream (e.g., Pre-rollfile_1.2) is instructed to be transferred for the pre-roll content currently being transferred, where the different file may be providing a higher quality content, larger image size, a low quality content, or other such changes. In those instances where modifications are to be implemented the process continues to step 1434 to identify a subsequent pre-roll content file or stream and a switching point within the pre-roll content currently being transferred. This switching point is a point or location within the content where a transition can be implemented, for example, an I-frame, a scene change or other switching point where a change in quality is less likely to be detected by a user.

In step 1436, a transfer of the identified pre-roll content is initiated or continued. In step 1440, it is determined whether a change in bandwidth, playback device statistics and/or other parameters are detected that may result in the transition to a different script or selection of a different sub-script. In those instances where a change is not detected the process advances to step 1446. Alternatively, when a change is detected step 1442 is entered to determine whether a different script, different sub-script or different script instructions should be utilized relative to current parameters (e.g., bandwidth, playback device statistics, etc.). The determination may be based on detecting a threshold change, a change beyond boundaries or other such changes. When a different script is not to be selected the process advances to step 1446. Alternatively, step 1444 is entered where a script or sub-script is selected. The process then returns to step 1422 to determine whether the process 1410 continues to be implemented relative to the selected script.

In step 1446, it is determined whether the transfer of a current pre-roll content is completed. When the transfer is not complete the process returns to step 1422 to continue evaluating the process and parameters. In those instances where the pre-roll content has been transferred, the process continues to step 1450 to determine whether additional pre-roll content is to be forwarded as dictated by the script. In those instances where additional pre-roll content is to be forwarded to the playback device the process 1410 then returns to step 1426 to select the subsequent pre-roll content and initiate the transfer in accordance with the script 1310. When it is determined in step 1450 that further pre-roll content is not to be forwarded the process terminates upon completion the transfer of the pre-roll content actively being transferred.

Figure 15:
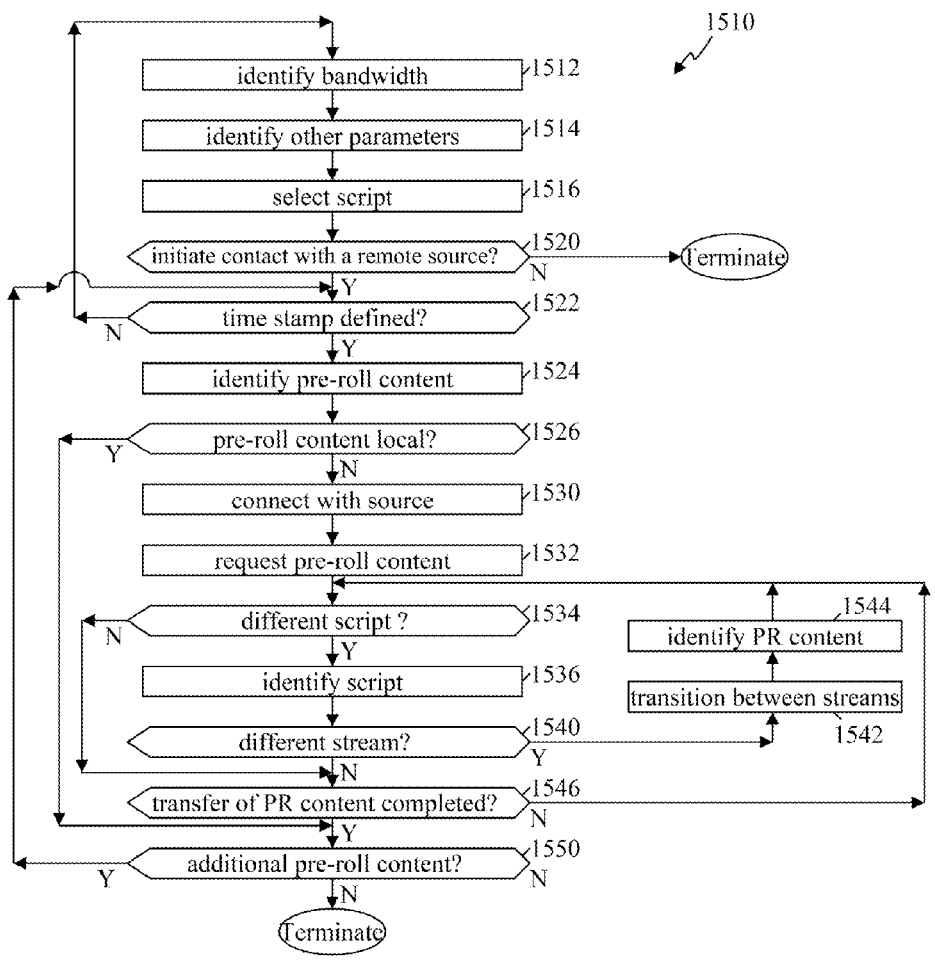
FIG. 15 depicts a simplified flow diagram of a process implemented by a playback device in requesting pre-roll content from one or more remote sources according to some embodiments.

FIG. 15 depicts a simplified flow diagram of a process 1510 implemented by a playback device 124 in requesting pre-roll content from one or more remote sources according to some embodiments. In step 1512, a current communication link bandwidth is identified. Some embodiments include optional step 1514 to identify other parameters dictated by the playback device 124 may further limit an amount of and/or type of content received, such as buffer levels, resolution and other such parameters. In step 1516, a script, a sub-script and/or instructions are identified within the script that corresponds to the identified parameters.

In step 1520, it is determine whether the identified script (or sub-script) instructs to initiate contact with a remote source to obtain pre-roll content. Again, in some instances the conditions may result in delays to obtain pre-roll content. As such, some embodiments may prevent waiting for the pre-roll content and instead implement playback from locally available content. When pre-roll content is not to be obtained the process 1510 terminates. A notification may additionally be displayed, for example, notifying the user that the pre-roll content could not be provided and may further identify a reason why it is not being provided and/or one or more options to try and correct the problem(s).

When pre-roll content is to be obtained, optional step 1522 may be to determine whether a time stamp is defined in the script and whether that time stamp corresponds with a current playback timing. In those instances where the timing does not correspond, the process 1510 returns step 1512 to continue to monitor bandwidth and/or other parameters, and can continue to loop until the time stamp corresponds with the playback timing, or a different script or sub-script is selected that alters the path along the process 1510. When the timing stamp is present and does correspond with playback time the process continues to step 1524 to identify a pre-roll content and/or pre-roll content identification.

In step 1526 it is determined whether the identified pre-roll content is locally stored at the playback device 124. In some instances, specified pre-roll content may have been previously acquired by the playback device 124, for example, in response to previously accessing the same portable storage medium 122 or a different portable storage medium that may be associated with the portable storage medium being currently accessed (e.g., content on the previously accessed portable storage medium is owned by the same entity that owns the content on the portable storage medium being currently accessed). When the identified pre-roll content is locally stored the process continues to step 1550 to determine whether additional pre-roll content is to be received as dictated by the script, and playback of the pre-roll content is initiated in accordance with the script.

When it is determined that the pre-roll content is not locally stored, the process continues to step 1530 where a connection is established with a remote source 130 associated with the pre-roll content as identified in the script or a default remote source. In step 1532 the pre-roll content specified in the script is requested from the remote source.

In step 1534 the bandwidth and/or other parameters are further evaluated to determine whether a different script or sub-script should be utilized relative detected changes. When a different script or sub-script is not needed the process skips to step 1546 to determine whether the pre-roll content has been completely received. Alternatively, when a different script or sub-script should be utilized the process enters step 1536 to identify the script and evaluate the script to identify pre-roll content to be utilized by the playback device. In step 1540 the selected script 1310 and/or sub-script 1312-1315 is evaluated to determine whether a different file for the pre-roll content is instructed to be transferred, which may be providing a higher quality content, larger image size, that low quality content should be forwarded, or other such changes. In those instances where modifications are to be implemented the process continues to step 1542 to identify the pre-roll content and a switching point within the pre-roll content currently being transferred. This switching point is a point or location within the content where a transition can be implemented, for example, an I-frame, a scene change or other switching point where a change in quality would not readily be detected. In step 1544, a transition between pre-roll content files is initiated. The process then can return to step 1534 to continue to evaluate the bandwidth and/or other parameters.

In step 1546, it is determined whether the transfer of a current pre-roll content is completed. When the transfer is not complete the process returns to step 1534 to continue evaluating parameters. In those instances where the pre-roll content has been transferred, the process continues to step 1550 to determine whether additional pre-roll content is to be received as dictated by the script. In those instances where additional pre-roll content is to be received the process returns to step 1522 to determine whether a time stamp is defined. When further pre-roll content is not to be received the process 1510 terminates.

The script can dictate the pre-roll content to be played back. Further, by allowing the script to have different variations and/or allowing different scripts to be implemented as a result of changes in parameters the playback experience can be improved. Again, the script can provide a priority and/or hierarchy relative to content supplied to and/or played back through the playback device 124. For example, when it is determined that the bandwidth is less than a threshold amount while a first pre-roll content is being supplied the script can dictate that a second pre-roll content be skipped and instead deliver a third pre-roll content due to a higher priority and thus limiting the content delivered to the playback device. Similarly, a different pre-roll content file may be selected for the same pre-roll content such that a shorter version of the pre-roll content is received at the playback device reducing potential delays. Further, one or more pre-roll contents (e.g., one or more trailers) are simply not supplied or retrieved. As one specific example, a single advertisement may be selected and supplied to the playback device instead of sending two advertisements. Similarly, an advertisement might be dropped between two trailers so that the trailers can be fully received and played back. In another example, a shorter version of a trailer with a smaller defined display resolution is supplied to a playback device as apposed to a full version of the trailer with full high definition quality and larger display resolution.

A script can be received from the portable storage medium 122, locally stored at the playback device 124 and/or received from a remote source 130. In some instances, a playback device 124 can receive updated, altered and/or new scripts depending on one or more factors, such as the communication link bandwidth, playback device capabilities and other such factors. This allows the scripts to vary over time, and even vary during playback of pre-roll content and/or content on the portable storage medium 122.

Figure 16:
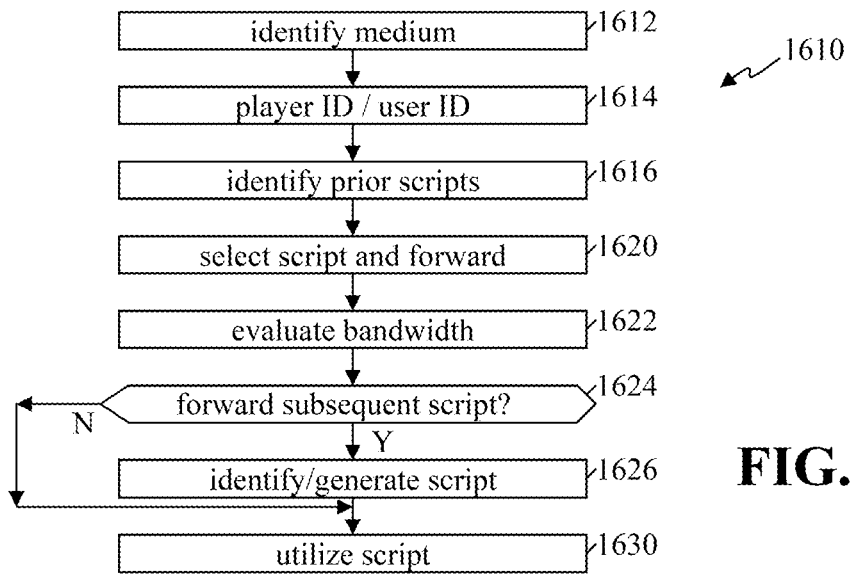
FIG. 16 depicts a simplified flow diagram of a process as implemented by a source for use in providing scripts to a playback device.

FIG. 16 depicts a simplified flow diagram of a process 1610 as implemented by a remote source 130 for use in providing scripts to the playback device 124. In step 1612 the portable storage medium 122 being accessed by the playback device 124 requesting the pre-roll content is identified. In some instances, the playback device forwards a medium identification upon establishing a connection with the remote source 130. Some embodiments optionally include step 1614 where an identification of a playback device and/or user or identified.

In step 1616 it is determined if one or more prior scripts were utilized in forwarding pre-roll content to playback device and/or the user, and when prior scripts were utilized those scripts are identified. In step 1620 an evaluation of the connection bandwidth and/or playback device capabilities is performed. In step 1624 it is determined whether a subsequent script should be utilized in identifying and pre-roll content to be forwarded to the playback device 124. Again, a previously identified script may again be utilized in identifying pre-roll content, for example, when a prior script was forwarded to a playback device 124 that was not implemented or was interrupted. In other instances, the prior utilized scripts are used to identify or generate a subsequent script that differs from those previously used, for example, so that different pre-roll content is forwarded to the playback device. When a subsequent script is not to be generated or utilized the process skips to step 1630 to initiate playback relative to a previously utilized script.

Alternatively, when an alternative script is to be generated or selected step 1626 is entered where a script is identify or generate. The selection or generation can be based on one or more factors as described above and further below, including but not limited to one or more of bandwidth, playback device capabilities, pre-roll content priority, prior content forwarded to the playback device and/or user, user profile information, user viewing habits, priority of scripts (which typically take into account priority of pre-roll content and/or priority of content providers), and other such factors. In step 1630 the selected script is utilized by the remote source to identify pre-roll content or forward script to the playback device 124 to allow the playback device to initiate the acquisition of pre-roll content in accordance with the script.

Figure 17:
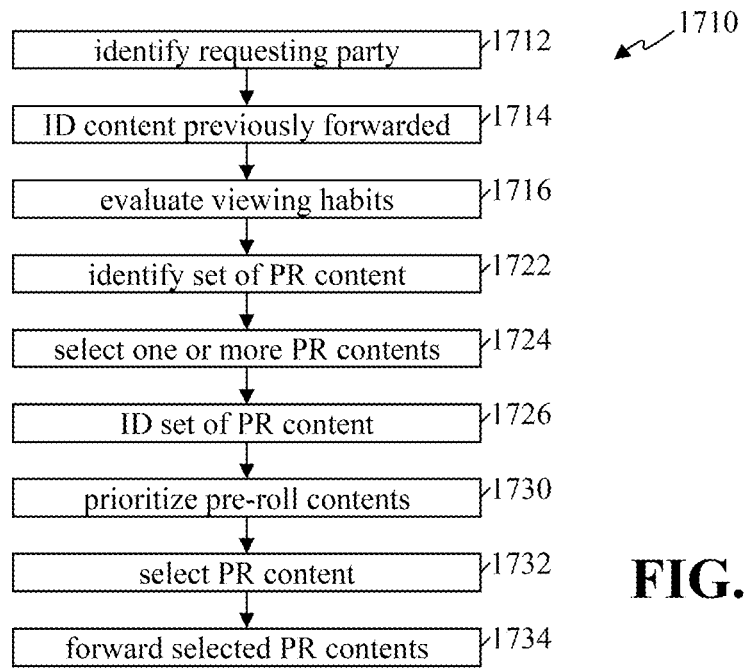
FIG. 17 depicts a simplified flow diagram of a process implemented by a source or a cooperation of sources to identify pre-roll content to be forwarded to a playback device in accordance with some embodiments.

FIG. 17 depicts a simplified flow diagram of a process 1710 implemented by a remote source 130 or a cooperation of remote sources to identify pre-roll content to be forwarded to a playback device in accordance with some embodiments. In some embodiments, some or all of the process 1710 can be implemented as part of step 1626 of the process 1610 of FIG. 16 in generating or selecting a script. In step 1712, a requesting party is identified. This identification can be based on an identification of a user (e.g., user log-in and/or user profile), a playback device, a portable storage medium, other identification or combinations thereof. In step 1714, based on the identified requesting party the process determines what content has previously been forwarded to the playback device 124.

In step 1716, an evaluation is performed of the requesting party's viewing and/or playback habits. The playback habits can include identifying and evaluating pre-roll content where playback was terminated by the requesting party before the pre-roll content completed playback; identifying a timing during the playback of the pre-roll content corresponding to when the playback of the pre-roll content was terminated by the requesting party; identifying and evaluating pre-roll content that was played back completely; identifying orders submitted by a requesting party in response to offers presented through pre-roll content; identifying access to additional content associated with information and/or offers presented through pre-roll content (e.g., a user accessing an Internet site to obtain additional information relative to pre-roll content supplied to the requesting party); and other such evaluations. Further, the evaluation of the pre-roll content can additionally include considering playback lengths of pre-roll content; intended audience associated with pre-roll content; genre or genres for the content corresponding to the pre-roll content; correlations of the pre-roll content and the content to be played back from the portable storage medium 122; content of the pre-roll content (e.g., violence level, animation, special effects, audio volume, and the like); actors in the pre-roll content; actors in the feature fill associated with a trailer when the pre-roll content is a trailer; companies associated with the content corresponding to the pre-roll content (e.g., movie studios, production companies, distributors, and the like); and other such factors. Similarly, evaluations of viewing history and/or habits can determine whether there are one or more consistencies relative to the requesting party's viewing of pre-roll content. For example, it can be identified that a particular user consistently or relatively consistently views a complete trailer for movies associated with the science fiction genre, relatively consistently views complete trailers for cartoons, and other such habits. In some instances, the pre-roll content includes metadata and/or metadata is stored, for example at the remote source 130, and utilized in evaluating the requesting party's habits.

In step 1722, available pre-roll content not previously forwarded to the requesting party is identified. In step 1724, one or more pre-roll content are identified from the available pre-roll content not previously forward that correspond with the consistent habits of the requesting party (e.g., have metadata that correspond viewing habits). Some embodiments include optional step 1726, pre-roll content that was previously forwarded to the requesting party and that has a relationship with the identified habits that exceeds a threshold, for example, that appears to be particularly relevant to the habits may additionally be identified, and to determine whether the one or more identified pre-roll content should again be forwarded.

In step 1730 the one or more identified pre-roll contents are prioritized relative to an order for which one or more of the identified pre-roll contents might be forwarded to the playback device 124. The priority may be based on a viewer's habits, the type of content being forwarded, whether the content is an advertisement and/or an amount of revenue that may be generated by forwarding the content, other such factors and/or combinations of such factors. In step 1732, a number of pre-roll content to be forwarded are identified in those instances where the available and relevant pre-roll content may exceed a threshold number or result in a playback duration that exceeds a threshold, where this threshold may vary. The selection of the limited number of pre-roll content can be based on the priority and one or more factors, such as but not limited to, playback runtimes of the identified pre-roll content, anticipated interaction by a user relative to the pre-roll content (e.g., based on offers presented in the pre-roll content and/or links to additional information available over the distributed network 132, and the like), content to be played back from the portable storage medium, available bandwidth, capabilities of the playback device, and other such factors.

In step 1734, the one or more selected pre-roll contents are forwarded to the playback device 124 based on the number of pre-roll contents to be forwarded and the priority of the identified pre-roll content. As indicated above, the distribution of pre-roll content can vary over time. As such, the priority of the pre-roll content may be adjusted as a result of changing parameters. Similarly, the number of pre-roll content to be forwarded may be varied over time.

Figure 18:
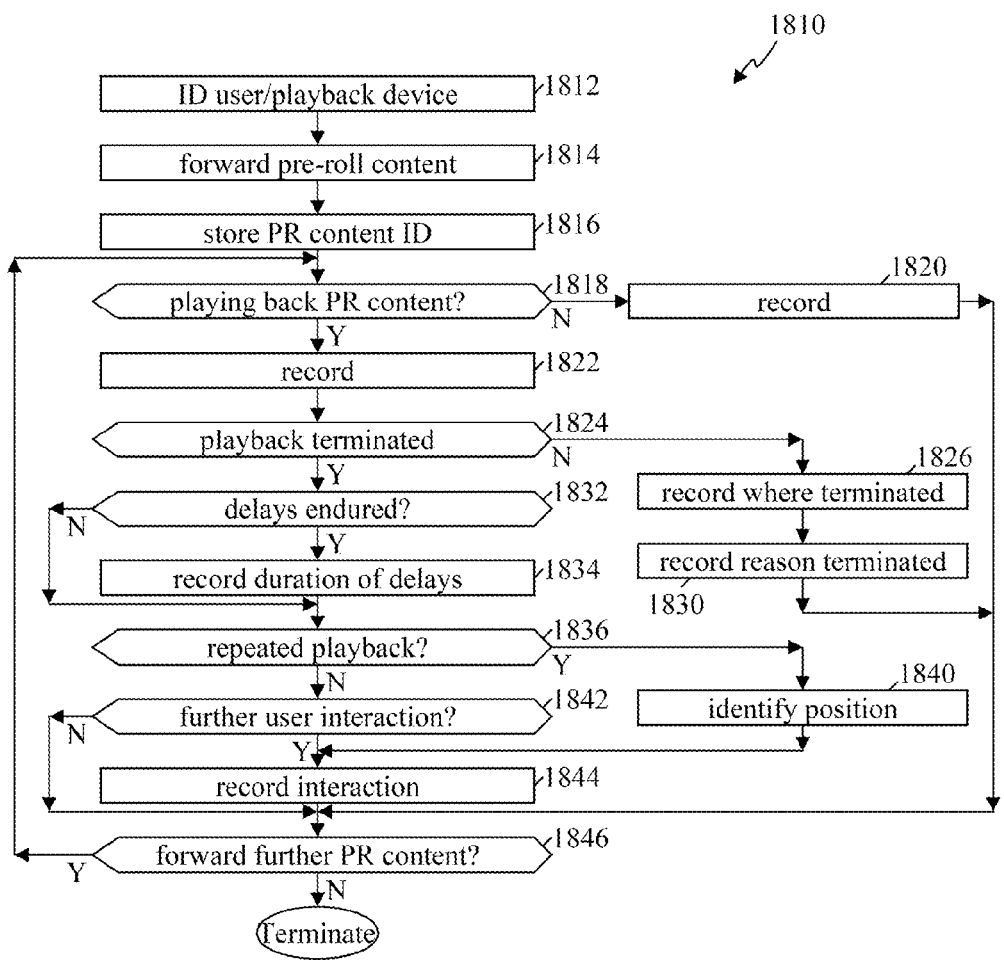
FIG. 18 depicts a simplified flow diagram of a representative process for use in tracking viewing of pre-roll content according to some embodiments.

As introduced above, the playback device and/or the remote source 130 can further track users' habits relative to providing pre-roll content as well as providing relevant information to content owners (e.g., movie and/or television studios) and/or pre-roll content producers. As such, the content owners and/or pre-roll content producers can utilize this information in preparing content, deciding distribution of content and/or how to produce pre-roll content. For example, a pre-roll content producer may utilize the information about user habits to generate two different pre-roll content for a single content, for example two different trailers for a single movie, such that the different trailers would appeal to and be directed to two different classes of users (where a class may be defined, for example, by user's having one or more similar habits). FIG. 18 depicts a simplified flow diagram of a process 1810 for use in tracking viewing of pre-roll content, effectiveness of pre-roll content, a user's habits and/or viewing habits relative to a playback device or combination of playback devices (e.g., multiple playback devices associated with one user or a single household). In some implementations the process 1810 is implemented while supplying pre-roll content. In other instances, the process 1810 is implemented based on information provided by the playback device, for example, after pre-roll content has been forwarded to the playback device. In step 1812, a user and/or playback device is identified. In step 1814, one or more pre-roll content forwarded to a playback device (whether the identified playback device or a playback device associated with the identified user) are identified.

In step 1816, the identities of the one or more pre-roll contents are stored along with metadata associated with the pre-roll content. This metadata can include one or more genres of the pre-roll content and/or the content associated with the pre-roll content; rating of the content associated with the pre-roll content; information about actors, actresses directors, produces and similar information; the one or more movie studio releasing the content associated with the pre-roll content; the one or more production companies releasing the content associated with the pre-roll content; length and/or runtime of the pre-roll content; the production company that produced the pre-roll content; and/or other such information. In step 1818, it is determined whether playback of a first of the one or more pre-roll contents was initiated. In those instances where playback of a first pre-roll was not initiated step 1820 is entered to record that the first pre-roll content was not played back and a reason why the playback of the pre-roll content was not initiated. The unsuccessful playback of the pre-roll content may result from one or more factors, such as, the pre-roll content was not fully received, there was insufficient bandwidth, a user skipped the content or other such factors.

When playback of the first pre-roll content is initiated the process continues to step 1822 to record that the playback was initiated. In step 1824, it is determined whether playback of the first pre-roll content was terminated before completing played back. In those instances where the pre-roll content was played back the process advances to step 1832 to evaluate a playback experience, for example, interactions with the pre-roll content (e.g., requests to access additional information, purchases, order, and other such interactions), whether some or all of a pre-roll content was played back and other such interactions. Alternatively, when the pre-roll content was not played back step 1826 is entered to identify and record where the playback was terminated. This can include identifying a playback timing, an index number, a frame, a chapter and/or other such indications of a point where playback was terminated. In optional step 1830 a reason for termination can be identified and recorded. For example, the process can determine whether playback was terminated by user instructions, terminated due to insufficient bandwidth, terminated due to playback device inefficiencies or other such reasons. The process then advances to step 1846 to determine whether there are one or more further pre-roll contents to be forwarded to the playback device 124.

In step 1832 it is determined whether delays had to be endured to receive and/or complete playback. When delays were not endured the process advances to step 1836. In those instances where delays were endured step 1834 is entered where the durations of those delays can be obtained and recorded. In step 1836 it is determined whether one or more portions of the pre-roll content were replayed (e.g., the user replayed a portion of the pre-roll content). In those instances where a portion of the pre-roll content or the entire pre-roll content was replayed step 1840 is entered where the portion of the pre-roll content replayed is identified and recorded, and in some instances the number of times replayed is recorded.

In step 1842, it is determined whether there was further user interaction relative to the pre-roll content. As described above and further below, in some embodiments, the pre-roll content can provide the user with the capability to select options provided through the pre-roll content, to obtain additional information, to access related information, to make purchases and/or submit orders, register to receive more details, to respond to queries and/or polling questions presented relative to the pre-roll content or other content, and/or otherwise interact with the pre-roll content. Step 1844 is entered to record the one or more interactions the user performed when there was interaction. This can include recording the information and/or type of information requested, the action(s) taken, the costs and/or amounts spent, and the like. In step 1846 it is determined whether further pre-roll content is to be forwarded and/or was forwarded to the playback device 124. When further pre-roll content is to be forwarded and/or was forwarded to the playback device the process returns to step 1818 to determine whether playback of a subsequent one of the one or more pre-roll contents was initiated.

As such, some embodiments can measure the effectiveness and/or success of pre-roll content and provide meaningful data about usage and/or viewing behaviors relative to pre-roll contents. This statistical information can be utilized by the remote source 130 in subsequent selections, scripting and/or sequencing of pre-roll content. Similarly, the statistical information can be provided to third parties, such as movie studios, production companies, advertisers and other third parties, to be utilized, at least in part, in the production of future pre-roll content and/or the modification of existing pre-roll content. The information and/or statics tracked, recorded, evaluated and/or reported can include the number of pre-roll contents viewed; the number of pre-roll contents viewed by an individual and/or household or playback devices associated with a user and/or household; a number of times an individual pre-roll content was completely played back; a number of times an individual pre-roll content was partially played back; a number of times an individual pre-roll content was skipped; all of the above based on demographic, date and/or time, portable storage medium and other such factors; and the like. Similarly, statistics about amounts of time played back (e.g., in seconds) for pre-roll content that was only partially played back; summary of behaviors for individual pre-roll contents (e.g., did consumers consistently stop playback at about 30 seconds to identify potential point where viewers were becoming uninterested and/or got bored).

Further information about the portable storage medium 122 with which pre-roll content is provided can be collected and distributed, such as reporting on which portable storage mediums 122 were more popular for a specific pre-roll content, which might be presented as a number of views as well as a percentage of viewership for a portable storage medium. Providing information on effectiveness based, for example, on a comparison between pre-roll contents and identifying which pre-roll contents are of more interest to a particular consumer or a group of consumers (e.g., which pre-roll contents were viewed versus skipped). Similar effectiveness and/or comparisons can be provided based on the portable storage medium 122, demographic, date, time and/or other such factors. Additional information may be provided with respect to multiple pre-roll contents begin sequentially provided, such as reporting on playback behavior of a first pre-roll content relative to playback behavior of a second or other subsequent pre-roll content (e.g., what percentage of consumers bypass a second or subsequent pre-roll content; and/or identifying how viewership change when pre-roll content is played back in an earlier position relative to subsequent positions of playback of pre-roll content).

The pre-roll content in some embodiments can provide options to a user to allow the user to interact with the pre-roll content. For example, the pre-roll content may include displayed options that upon selection allows a user to purchase content, purchase a portable storage medium 122 upon which desired content is recorded, purchase movie tickets, obtain further information about the pre-roll content or aspects of the pre-roll content (e.g., about actors depicted in trailer pre-roll content), and other such interactions.

As described above, the pre-roll content can be delivered to the playback device 124 through downloads, progressive downloads, streaming and other methods. The use of downloaded content in cooperation with Blu-ray discs (BD) has provided significant advantages to this medium over prior mediums and is often utilized in a BD-Live™ experience. With some playback devices, content obtained from a remote source is viewable in a dedicated video download center (e.g., such as Universal Studio's BD-Live Center, Paramount Studio's Download Manager and the like). The acquisition of and viewing of trailers and other similar content has generally been greater than the use of other BD-Live feature to date; however, it is still a fraction of the overall disc usage, as measured using disc inserts on network connected BD players.

The present embodiments provide ways to dramatically increase usage and overall impressions remotely received content, such as impressions of BD-Live content (e.g., streaming trailers, advertising, access to additional content and other such content and capabilities). This increased usage is further enhanced in some embodiments, at least in part, by delivering this downloaded and/or streaming content upon insert of the portable storage medium 122 and prior to a main menus or main title from the portable storage medium 122 actually being displayed to the consumer. Some embodiments further provide management of the pre-roll content variation and/or rotation so that a dynamic experience can be delivered.

Further, some embodiments support multiple pre-roll contents (e.g., videos, trailers, advertisements, offers and other such content), including the ability to select pre-roll content that may be more relevant to a particular viewer and/or sequence between multiple pre-roll contents before proceeding to the main title and/or main menu. Additionally, the pre-roll content can be dynamically delivered so that the pre-roll content that is delivered changes over time, for example, based on what the consumer has already watched, based on pre-defined conditions (e.g., demographic, playback device location, and the like) identification of the portable storage medium 122, the title of a content on the portable storage medium, a consumer's viewing habits, variations in connection parameters and/or playback device parameters, pre-roll content previously viewed, other such factors and combinations of such factors. Furthermore, those embodiments that can take advantage of information about the viewer, such as through a user profile, prior viewing habits and the like can provide pre-roll content that is likely to be more meaningful to the viewer to improve viewership.

As described above, some embodiments further attempt to make the user playback experience and/or flow as seamless as possible for the consumer by attempting to initiate playback of the pre-roll content relatively quickly and in some instances disguising the delays in initiating playback. For example, the experience can be improved by initiating playback of disguise content until playback of the pre-roll content can be initiated, while attempting to limit and/or avoid appearances of buffering, interrupts, green flashes when switching resolutions, and other such indicators of changes and/or delays. As a further example, when a playback device 124 has a slow connection that cannot effectively provide the playback of pre-roll content without experiencing undesirable delays the playback of pre-roll content can be bypassed so that slow network connections do not adversely impact a consumer's experience. Furthermore, the user experience can additionally be improved by providing the user with the ability to bypass one or more pre-roll content (in some instances a single command may bypass one pre-roll content while a separate single command may bypass all potential pre-roll content) and proceed directly to the main menus and/or the main title of the pre-roll content. In some instances a setting or option may be provided to the user can that automatically bypass the pre-roll flow in relation to subsequently accessed portable storage mediums 122.

Some embodiments further track a users' viewing, such as tracking: that a consumer opted to bypass; user's interactions; user fully viewing pre-roll content; user's authorizations to wait for content when delays may be experienced; user's authorization to obtain higher quality content even though delays may be experiences; user's authorizations to obtain lower quality content when delays may be experienced; and other such actions. The identified user's viewing history, instructions and habits can be used to influence startup logic and the types of pre-roll content provided and played back.

Additionally, some embodiments attempt to provide the highest quality pre-roll content capable of being effectively received and played back by the playback device 124 without inducing undesirable delays, and in some instances attempt to provide a quality of pre-roll content (e.g., video content) that is similar to content provided through the portable storage medium 122 and capable of being displayed through the playback device. The playback devices 124 can, in some embodiments, prevent the delivery of pre-roll content having a quality that is less than standard television broadcast quality from being forwarded and/or playback back. In other instances, the resolution or size of a video frame provided is reduced while the quality is maintained.

In some implementations the pre-roll process and/or system interrupts the traditional disc startup process, and the process is configured to attempt to optimize the download performance in efforts to cause minimal disruption. The overall consumer experience ideally is perceived as though a normal disc startup flow is occurring, and in some implementations, the consumer is unaware that additional content is actually delivered from the remote source 130. The remote source 130 typically has access to multiple encoded streams (e.g., with varying bit rates) of the same pre-roll content that can be selected based on parameters (e.g., automated selection by the playback device 124 and/or remote source 130) or selection by a user. This selection can be based on one or more factors, such as selecting an optimal bit rate (and therefore stream) based on an available bandwidth of a connection between the remote source 130 and the playback device 124. In some implementations, this identified bit rate, bandwidth and/or other such relevant factors can be store and use in future downloads. Further, these parameters can be updated over time and used in stream bit rate selection.

As described above, in some instances the download of pre-roll content or a particular pre-roll content may be aborted due to slow connections. For example, some embodiments may measure time to download a first amount of a pre-roll content (e.g., a first X Kbytes) and abort the download when the time to download the first amount exceeds a pre-defined threshold. This threshold may be defined at the remote source 130, the playback device 124, specified by a user, defined on the portable storage medium 122 or the like. For example, the threshold may be passed down as part of bootloader process. Additionally, in some implementations this threshold may vary over time. The playback device 124 and/or the portable storage medium 122 may include client-side logic that is implemented by the playback device 124 to detect and measure a consumer's bandwidth, download speed and or other relevant parameters. Similarly, the playback device 124 and/or the portable storage medium 122 may include client-side logic to store or buffer pre-roll content prior to initiating playback for a large portion of the pre-roll content or the entire pre-roll content in instances where a connection speed is relatively slow so that once playback begins it is unlikely that the playback will experience delays or pauses while waiting to receive further portions of the pre-roll content.

Some embodiments further support the background downloading, progressive downloading and/or streaming of pre-roll content across title startup logic and/or during a main title or feature playback. As such, pre-roll content can be acquired that is not intended to be played back early on in the playback sequence or before a main menu or main title is displayed or played back. Further as described above, pre-roll content can be acquired that is intended to be played back in cooperation with a main title on the portable storage medium 122, including providing additional content to be played back during the playback of a main title, content to replace some or all of the main title, an alternate ending to a main title, additional advertising, replacement advertising or a replacement to a portion of advertising. For example, the pre-roll content can provide graphics of a Pepsi can, where the graphic is to be displayed over a soda can occupying a only a portion of a frame for a series of frames so that the user does not see the soda can and instead it appears to the viewer that the main title was originally captured while a Pepsi can.

Additionally, some embodiment provide for the acquisition of pre-roll content that is not necessarily intended to be played back during a current access to the portable storage medium 122, but instead is intended for playback upon a subsequent access to the same portable storage medium 122 or a different portable storage medium providing a pre-fetch of pre-roll content (e.g., one or more trailer, advertisement and/or the like). This allows the playback device 124 to playback the pre-fetched pre-roll content without delays associated with obtaining the pre-roll content from the remote source and further can allow the pre-fetched pre-roll content to be used as disguise content, when appropriate, to acquire additional pre-roll content. For example, the background progressive downloading can provide for the acquisition of pre-roll content intended for playback in association with a subsequent access to a different portable storage medium with an anticipation that the different portable storage medium will be associated with the same movie studio and/or content owner, or to a group of content owners that have authorized cross-relations. This pre-fetching may, however, be limited by time periods in attempts to provide relevant and current content. For example, the pre-fetched pre-roll content may have a defined relevant time period within which the subsequent portable storage medium is to be accessed, or the pre-fetched pre-roll content may have a defined expiration (e.g., date and time). A verification may additionally be implemented to verify that the pre-fetched pre-roll content was actually received (e.g., a local MD5 Hash check can be provided to verify the one or more background downloads were completed properly). In some embodiments, the one or more pre-roll contents and/or pre-fetched pre-roll contents may be store at an organization ID level so that it can be used in association with a later accessed portable storage medium 122.

As a further example, some embodiments pre-fetch a portion of one or more pre-roll content, such as obtaining the first five, seven or ten playback seconds (or other duration) of the one or more pre-roll contents. This allows the pre-fetched portion of the pre-roll content to additionally act as disguise content while the remainder of the pre-roll content is obtained from the remote source 130. Similarly, by pre-fetching portions of two or more pre-roll contents the playback of a second pre-roll content can quickly be initiated upon completing playback of a previous pre-roll content or initiating in the event that the playback of the first pre-roll content is aborted, skipped by a user or otherwise interrupted.

Parameters are evaluated in selecting pre-roll content to be forwarded to the playback device 124. In some instances a bandwidth of the connection between the remote source 130 and the playback device 124 can be determined. The remote source, for example, can associate defined bandwidths or bandwidth ranges with pre-roll content thresholds as to which version of a pre-roll content file should be selected for playback based on a measured bandwidth, for example, as measured by the playback device. This measurement can be forwarded by the playback device 124. For example, the playback device 124 can provide an elapsed time, provide a conversion (e.g., conversion of time to a bandwidth based on a size of downloaded content divided by time), or other such bandwidth parameters. Further in some implementations, a relatively low quality portion or segment of a pre-roll content can be initially forwarded to the playback device to allow the playback device 124 to measure timing. Based on the measurement(s) the remainder of the pre-roll content and/or subsequent pre-roll content can be selected and forwarded. Measurements can regularly be taken, for example taken on each video segment, and subsequent stream selection can be preformed at least in part based on one or more measurements.

As introduced above, some embodiments attempt to optimize the quality of the pre-roll content delivered to the playback device within the bounds of experiencing potential delays, while some embodiments additionally or alternatively evaluate the content quality provided on the portable storage medium and attempt to limit the delivery of pre-roll content to content having a quality similar to or better than the quality of content on the portable storage medium. For example, if the portable storage medium 122 provides high definition (HD) content then the remote source 130 can recognize that the portable storage medium provides HD content and attempt to restrict the delivery of pre-roll content having HD quality. This delivery can be limited by delays that may be experiences and as such the remote source may allow lower quality or lower resolution pre-roll content to be delivered, or may request instructions from a viewer regarding allowing delays to occur.

The quality of potential pre-roll content to be delivered to the playback device 124 can be compared to the quality of the content recorded on the portable storage medium, and while delivery and/or download performances are within threshold limits (e.g., where the viewer is unaware that content is being received from a remote source 130, or the perceived difference upon playback is less than a threshold) pre-roll content are selected with optimal quality relative to content provided on the portable storage medium 122 and delivered to the playback device. As such, many embodiments would prevent delivery, to a playback device, of standard definition quality pre-roll content that had macro-blocking when this pre-roll content is intended to be played back in association with a portable storage medium 122 providing HD quality content as this may have a significantly negative impact on the consumer experience. Similarly, in some embodiments a playback device 124 may prevent playback of a standard definition quality pre-roll content (e.g., locally stored and/or pre-fetched) when this pre-roll content is to be played back in association with a portable storage medium 122 providing higher quality content. These embodiments attempt to ensure that the pre-roll content played back in association with a portable storage medium does not diminish this high-quality consumer experience.

Because of varying potential qualities on differing portable storage mediums 122, some embodiments support pre-roll content files of the same pre-roll content with ranges of quality, such as a range between standard definition and high definition resolutions. To generate these multiple pre-roll content files some embodiments apply different encoding to the pro-roll content. Further, this encoding can be provided to content owners and/or pre-roll content production entities through automated encoding processes, manual encoding processes and/or a combination of automated and manual (e.g., implement an automated encoding and provide manual re-encoding of one or more portions). The capability to provide at least some manual encoding may be beneficial with regard to encoding for higher quality content. Further, because different qualities can be provided some embodiments initiate a transfer of a lower quality pre-roll content file or pre-roll content at a lower resolution, and as bandwidth and/or other parameters allow can switch to a different pre-roll content file with a higher quality and/or larger resolution in accordance with the measured and/or learned parameters.

As introduced above, some embodiments provide the viewer with at least some control over obtaining and/or playing back of pre-roll content. This control can be provided, at least in part, through a user interface and/or command available through a remote control or other user inputs. For example, the user can be provided with the ability to skip one or more pre-roll content, prevent the playback of pre-roll content, advance to a main menu or other menu, potentially rewind and/or fast forward pre-roll content and other such control. Again, these options can be provided through a displayed user interface that allows a user to select options (e.g., by using a remote control, pointing device or the like), options displayed with the pre-roll content, pop-up options and/or displays (which may be activated by displayed options or a remote control) inputs on a remote control or other such inputs.

It is noted, however, that in some instances the playback device may prevent or otherwise prohibit a viewer from implementing one or more commands, such as preventing skipping some or all of one or more pre-roll content, preventing skipping some or all of one or more disguise content, preventing a jump to a main menu during playback of a single pre-roll content, preventing a jump to a main menu during entire pre-roll process and/or other such prohibitions. The one or more prohibitions can be defined in association with a pre-roll content, defined as metadata of a pre-roll content, provided relative to a portable storage medium 122, defined on the portable storage medium and the like. Further, the prohibitions may be programming with executable instructions or executables implemented by the playback device 124. In other instances the prohibitions can be instructions that define an operation or prevent operations by the playback device. As one example, the pre-roll content may include an advertisement and a prohibition may be defined that prevents a user from skipping the advertisement. Similarly, the pre-roll content may include a legal notice or warning and a prohibition may be defined that prevents a user from skipping the legal notice.

In some embodiments, a user interface can be provided that allows a user to select and/or specify a desired stream, which in some instances includes effectively specifying a quality level. The selection can be preformed at runtime, for example in response to a prompt from the playback device 124 and/or remote source 130, can be defined by one or more user settings as defined by a user, for example when setting a portion of a user profile or playback profile, and other such designations. Additionally or alternatively, the desired stream and/or parameters in defining which stream a remote source supplies can be based on one or more playback back and/or user profile settings that can be set as a default, set based on an evaluation of a playback device's capabilities, set based on prior evaluations of bandwidth and the like. A user interface can similarly allow a user to specify and/or select streaming options, such as but not limited to an option to specify that pre-roll content be downloaded in the background (e.g., background download: on/off), specify that a complete download be completed before playback is to begin, for example, to ensure no buffering and/or buffering delays, and other such selections.

Again, in displaying content to a user some embodiments attempt to minimize the perceived delays, lags and/or down time that may result when obtaining content from a remote source or other playback device performance issues associated with playing back pre-roll content. By displaying and/or playing back disguise content some embodiments limit or eliminate perceived lag or downtime. In some implementations, information and/or options can additionally further be provided prior to or while pre-roll content is attempting to be obtained and/or played back. For example, a graphic or other small downloaded item that provides some informative information can be displayed or played back prior to a download of a video pre-roll content. Similarly, information can be provided during downloads, after downloads and/or during playback of pre-roll content. This information can include information about the pre-roll content, information about the download, timing information about the download and other relevant information.

Further, the time in initiating playback of the pre-roll content may be reduced by initially forwarding a relatively small or short pre-roll content that allows additional pre-roll content to be received while the initial pre-roll content is played back. Additionally or alternatively, delays in initiating playback of pre-roll content may be reduced by initially downloading a low or minimum quality and/or resolution version of a pre-roll content, and based on bandwidth detection switching to a higher quality and/or resolution when the detected bandwidth can support the higher quality and/or resolution.

Furthermore, some embodiments may format pre-roll content so that a reduced amount of content actually has to be received at the playback device before playback can be initiated. For example, the pre-roll content can be encoded in relatively short duration chucks so that the playback device 124 can initiate playback more quickly. In some embodiments, the pre-roll content is encoded in accordance with a template that corresponds to a playlist defined on the portable storage medium. This template allows the pre-roll content to be received and played back at the playback device 124 without introducing further delays because the pre-roll content corresponds with the portable storage medium 122. Some embodiments employ a predefined clip template that is expressed or defined prior to segmenting the pre-roll content into clips or segments. Further in some instances, clip information is recorded on the portable storage medium 122 at the time content is recorded to the portable storage medium, where the clip information corresponds with a clip template. The clip template can be used to dictate how the pre-roll content or other content is to be segmented into clips of pre-roll content. The pre-roll content, as such, may be chunked or otherwise broken up to conform to the predefined clip template, and thus correspond with the clip information available to the playback device 124.

Additionally, the clip template defines the clip information for each clip prior to the pre-roll content being segmented into clips and can be used in encoding and formatting the pre-roll content. By applying the clip template, the clip information for each clip of pre-roll content is known prior to breaking down the pre-roll content into clips. Utilizing a clip template allows the clip information for each clip to be recorded on the portable storage medium 122 or forwarded to a playback device 124 prior to playback. As a result, the pre-roll content does not have to be known or even exist at the time the clip information is recorded to the portable storage medium 122 or supplied to the playback device 124. Further, because the pre-roll content does not have to exist at the time the clip information is recorded to the portable storage medium 122 or provided to the playback device 124, substantially any pre-roll content can be provide relative to the clip template, the pre-roll content can be change over time, and pre-roll content with undefined lengths can be conformed to allow playback within a fixed length standard or framework.

Still further, a clip template can be configured for pre-roll content at a bit rate that is in excess of an expected bit rate of a pre-roll content that is to be segmented based on a clip template. As the pre-roll content is broken up into clips as defined by the clip template the pre-roll content may not fill or fully occupy the available data size of some if not all the clips defined by a clip template. Some embodiments compensate for the smaller data size of the pre-roll content by padding clips of pre-roll content generated in accordance with a clip template with null data or data that is ignored by the playback device 124. Further, the pre-roll content has a profile (e.g., number of bits relative to playback timing), and the padding can be incorporated to shift or move parts of the profile so that they align with predefined place holder clip information. For example a series of zero bits, a predefined pattern of bits, a null packet or other such configuration can be incorporated into the data of relevant clips where appropriate to maintain timing.

Moreover, because the pre-roll content is being delivered, in some embodiments, in segments and/or chunks of data that match the place holder clip information the segment boundaries may not align to an actual playback duration. As such, in some instances, a segment containing an end of playback may be padded out to the full segment length to stay in compliance with the place holder clip information and/or timing. For example, the padding can be in the form of null packets of data and/or additional padding following a series of packets within a clip. As one example, some implementations provide that integer numbers of packets are to be incorporated into each clip, and in those instances where an integer number of packets of pre-roll content does not complete fill a clip and a subsequent packet would exceed the clip boundaries, padding data can be incorporated to fill in the remainder of a clip. In some embodiments, the padding or null data can be defined relative to the pre-roll content but not incorporated into the pre-roll content that is forwarded to the playback device 124. Instead, the playback device, by identifying triggers or instructions and/or utilizing a mapping, incorporates the padding or null data into the pre-roll content at the playback device 124. This allows for a reduced data size of the pre-roll content to be transmitted to the playback device 124.

Further details about the use of templates, the formatting, encoding, chunking and utilizing of templates, and the padding are described in U.S. patent application Ser. No. 12/479,474, filed Jun. 5, 2009, entitled METHODS AND SYSTEMS FOR USE IN PROVIDING PLAYBACK OF VARIABLE LENGTH CONTENT IN A FIXED LENGTH FRAMEWORK, which is incorporated herein by reference in its entirety.

Additionally, the portable storage medium 122 may include clip information corresponding to multiple different templates, for example different templates relative to different content quality and/or resolution. Similarly, a single template may not have a sufficient length to allow playback of a complete pre-roll content; however, some embodiments loop a template such that the pre-roll content continues to be formatted according to the template as the formatting loops back on the template.

The perceived delays of obtaining the pre-roll content can further be reduced by enabling the background downloading of the pre-roll content during or shortly after the disc startup routine, and in some instances during loading routines and/or while displaying other content (e.g., displaying and/or playing back one or more factoids, news and/or RSS feeds, providing access to and/or showing a social networking feed or interface, and/or other such disguise content). The disguise content further reduces perceived delays in obtaining the pre-roll content. Again, the disguise content can be substantially any relevant content, which might include Information about the pre-roll content and/or the obtaining of the pre-roll content can also be provided to a user in some embodiments. For example, an on-screen progress indicator of download/playback status can be provide. Some embodiments that can display a progress indicator may further provide a user with the ability to turn on or off the progress indicator. Similarly, the progress indicator may be displayed when buffering is encountered and/or further delays in playback are predicted. This indicator and/or other information that may be displayed can provide information as to what is happening. Additional options may be provided to the user while the indicator is displayed or when delays are predicted, such as providing the user with the ability to manually select another stream (if available), transitioning to a menu, stopping playback of the current pre-roll content or other such options.

Further, when displaying pre-roll content some embodiments attempt to hide or mask the transition from one quality to a different quality. For example, some embodiments attempt to mask or eliminate the perceived resolution switching, such as by eliminating a green flash and possible player performance lags related to resolution switching, and/or other such disruptive display anomalies. Further, in some implementations, lower quality content can be incorporated within a higher quality container and/or configure lower quality content to appear to a playback device as higher quality content. For example, some embodiments can incorporate standard definition content within a high definition container to limit or avoid anomalies associated with transitioning from standard definition to high definition, or from high definition to standard definition.

Some embodiments additionally or alternatively provide for user-selectable pre-roll content, which can include, for example, video, trailers, advertisements, music, and other such content. The user can be provided with a user interface that provides a listing of available content from which the user can select. Similarly, the user interface may allow a user to search for available content, navigate through levels or structures that identify content, and other such assets. Disguise content may be utilized while the selected content or a sufficient portion of the selected content is received and/or played back.

As described above, the pre-roll content, in some embodiments, may include interactive content. The interactions available, can include, but are not limited to pre-ordering, purchasing cinema tickets, purchasing related products, placing orders for when content corresponding to pre-roll content is made available, obtaining additional information (e.g., accessing an Internet site, accessing another remote source or the like), participating in a community associated with content on the portable storage medium 122 (e.g., joining a chat room, accessing a blog or the like) and other such interactions.

Figure 19:
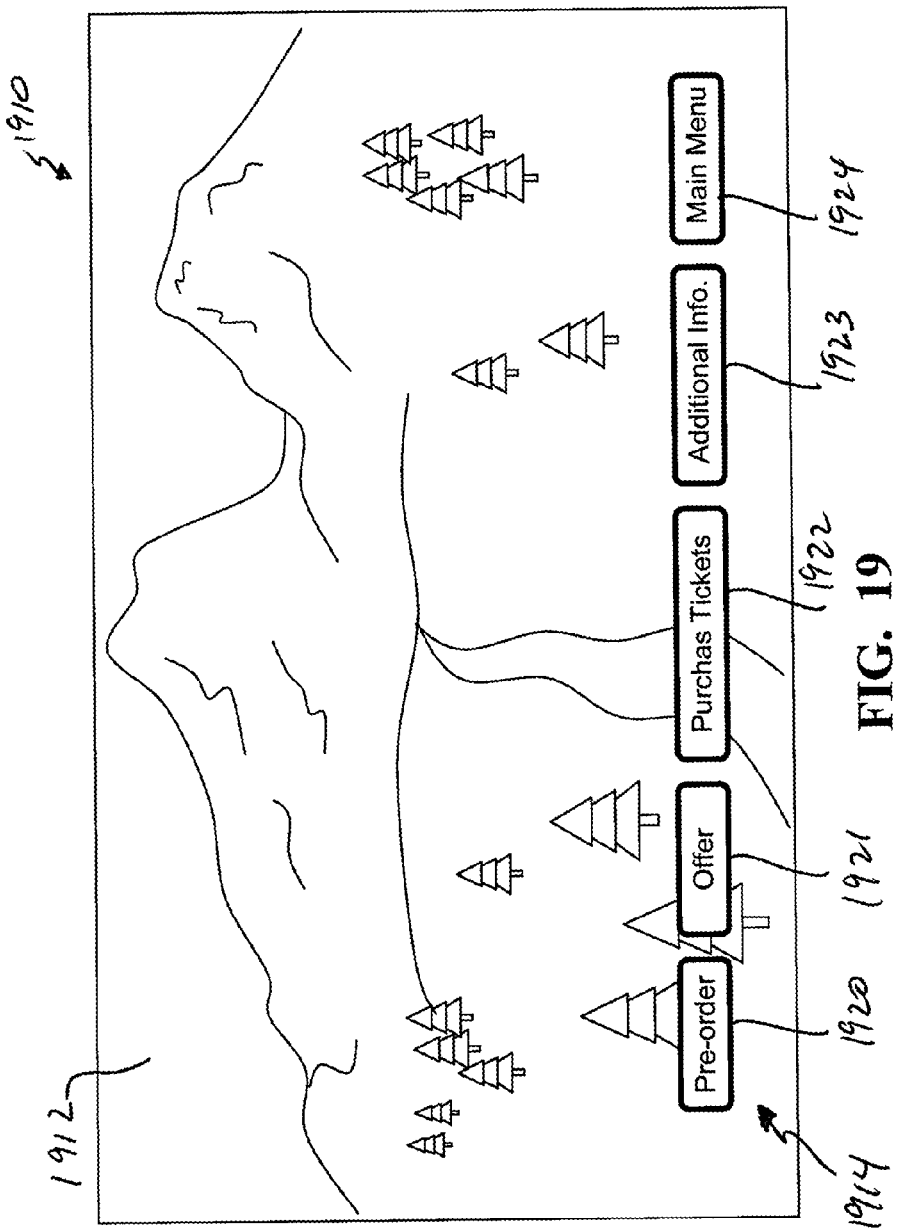
FIG. 19 depicts a simplified version of a displayed user interface according to some embodiments.

FIG. 19 depicts a simplified version of a displayed user interface 1910 according to some embodiments. In this example of the user interface content 1912 is being displayed and/or played back while options 1914 are available, where one or more of the options are interactive. For example, a first interactive option 1920 allows a user to purchase or pre-order a copy of the movie being advertised in the pre-roll content 1912, for example on a portable storage medium when the movie becomes available. A second interactive option 1921 can allow a user to access other offers or advertisements regarding the pre-roll content. A third interactive option 1922 allows a user to purchase movie tickets for the feature advertised in the pre-roll content 1912 being played back. A fourth interactive option 1923 allows a user to link or connect with a subsequent remote source to access additional information, for example, additional information about the content being advertised through the pre-roll content 1912 being played back, access to additional information about an actor in a trailer pre-roll content being played back, accessing additional information about the movie for which a trail pre-roll content is advertising, and the like. A fifth interactive option 1924 may provide the user with the option to advance to a main menu of the portable storage medium 122. Other interactive options may be provided.

Figure 20:
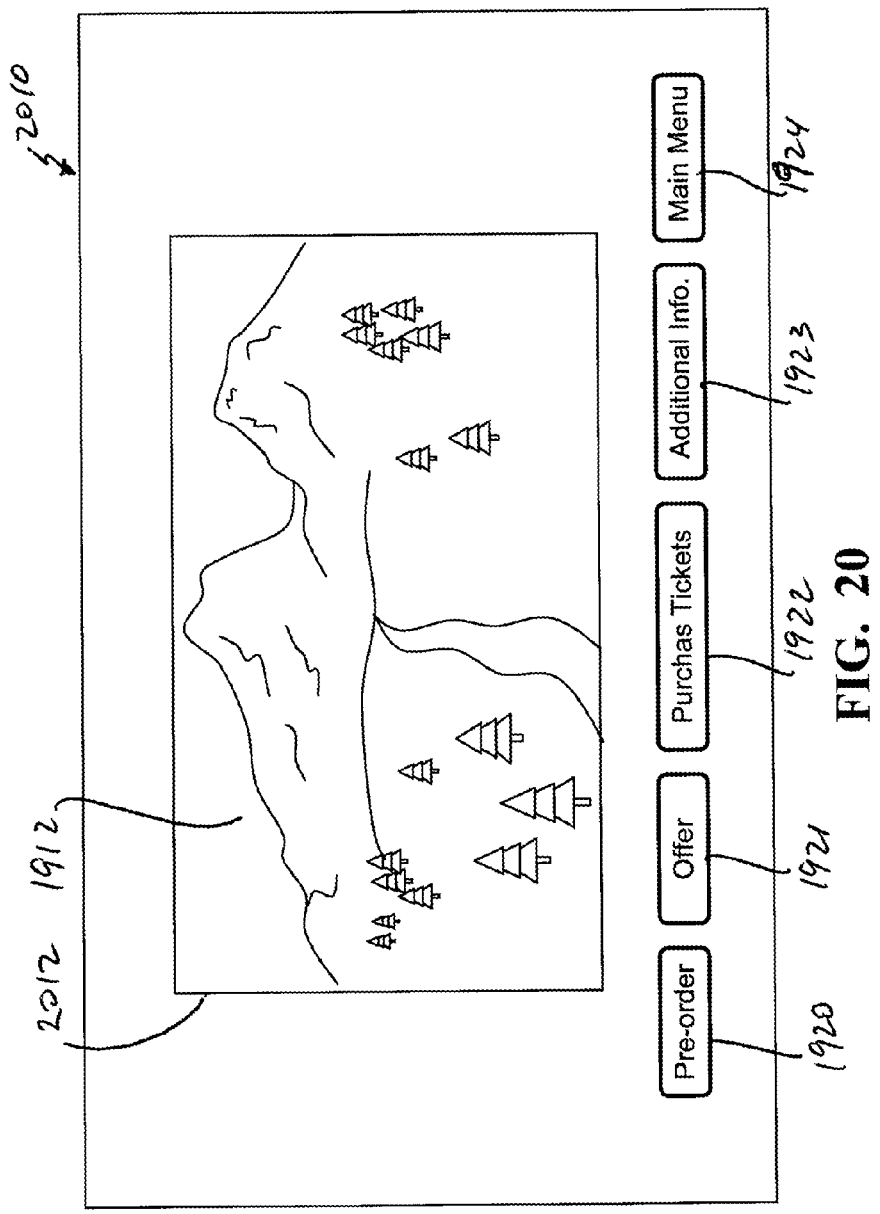
FIG. 20 depicts a similar display of pre-roll content and the interactive options.

FIG. 20 depicts a similar display of a user interface 2010 that includes interactive options 1920-1924 that are displayed while pre-roll content 1912 or other content is played back. In this example the pre-roll content is displayed in a sub-window 2012 with a lower resolution or image size. The interactive options are displayed along a boarder of the displayed pre-roll content.

Referring to FIGS. 19 and 20, in some embodiments the displayed pre-roll content 1912 can further provide information about one or more of the displayed options 1920-1924. For example, the pre-roll content 1912 may advertise a discount if a user selects to make a pre-order. As another example, the pre-roll content may explain types of information that may be available or offers that might be viewed.

Pre-roll content can be produced and released through various methods. Some of these methods are manual production and/or are partially manual, while other embodiments may provide automated or at least partially automated processes in the production and/or distribution of pre-roll content. Further, some embodiments support the ingest, processing, mapping and publishing of pre-roll content (e.g., video content, audio content and the like) designed to be dynamically selected, streamed and played back early on in the start-up flow with portable storage mediums 122, such as with BD-Live titles. This process provides for the production of substantially any type of pre-roll content, including but not limited to trailer content, advertising content, interactive content and other relevant content. Some embodiments provide and utilize pre-roll content to allow for content to be streamed, downloaded, progressively downloaded or otherwise delivered to a playback device 124 to be sequenced and played back before displaying or playing back a main menu or a main title recorded on the portable storage medium. Further, these embodiments attempt to minimize user perceived portable storage medium start up timing and other delays before acquired pre-roll content playback begins. Some embodiments additionally improve or optimized download rates to maximize video quality and minimize re-buffering events. By tracking distribution, usage and viewing habits some embodiments further are capable of providing comprehensive usage statistics and can dynamically select pre-roll content in accordance with relevant statistics.

Figure 21:
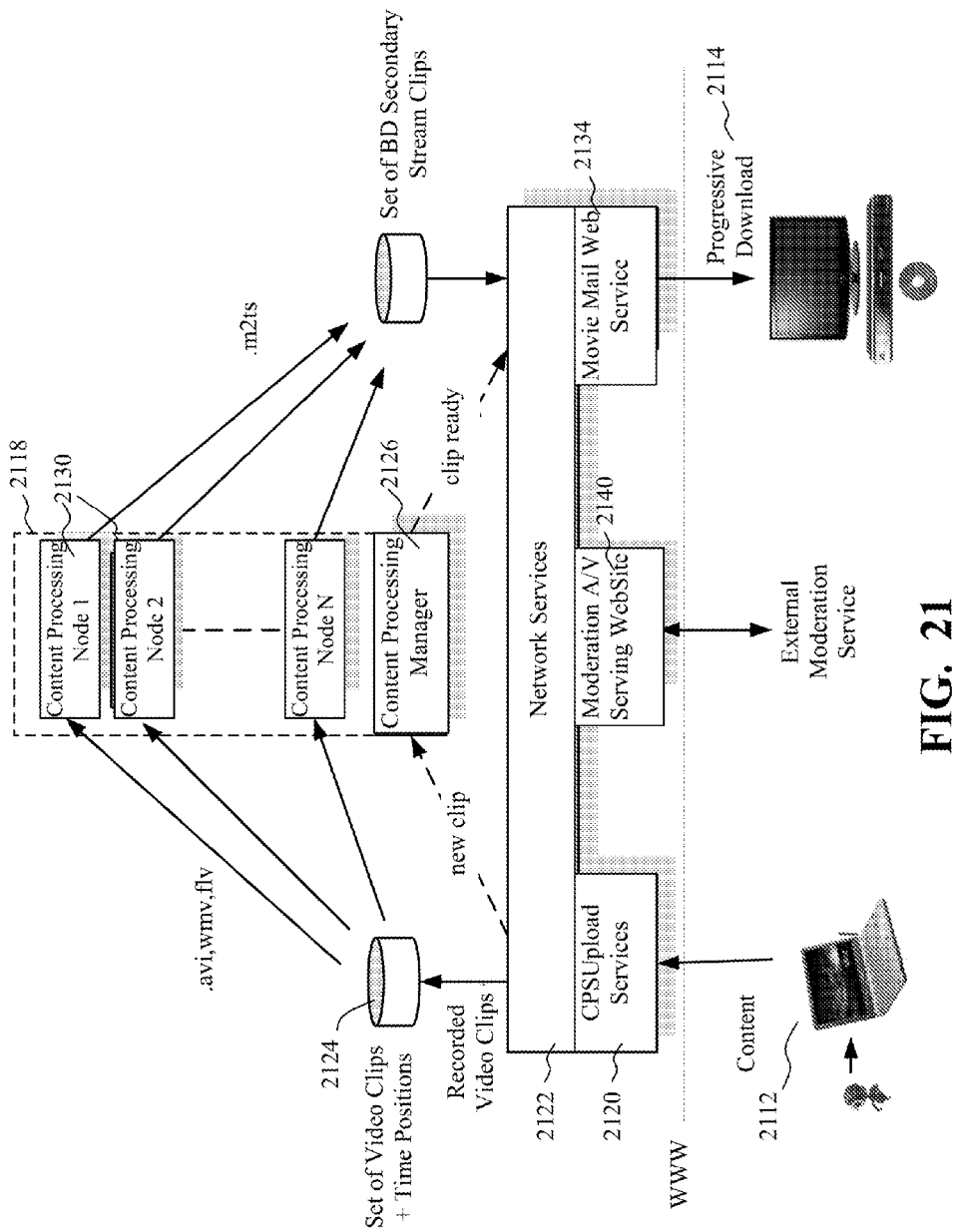
FIG. 21 depicts a simplified block diagram of a processing system utilized in processing content to generate pre-roll content available for distribution.

FIG. 21 depicts a simplified block diagram of a processing system 2110 utilized in processing content to generate pre-roll content available for distribution. The system receives content 2112 and outputs processed content 2114. Further, the system 2110 includes a content processing system (CPS) 2118, a CPS upload services 2120, a network services 2122, memory storage 2124, and a content distribution service 2134. The CPS 2118, according to some embodiments, includes one or more content processing managers (CPM) 2126 and one or more content processing nodes (CPN) 2130. In some embodiments, the processing system 2110 can additionally include a moderation content serving service 2140 that allows a content owner, distributor or other party with control over the content to provide authorization and/or pre-approved (e.g., according to some guidelines) before the processed content can be made available for distribution. Further, in some embodiments the processing system 2110 and/or the CPS 2118 can be implemented on one or more devices, such as one or more servers 130.

The content 2112 can be substantially any relevant content provided for processing. For example, the content can be produced trailers, portions of content extracted from other content, newly generated content, user generated content (e.g., content captured on a video camera, webcam or the like), and other such content. The processing system 2110 uploads or otherwise receives the content 2112, processes the content and then makes the processed content 2114 (e.g., produced pre-roll content) available for distribution, for example, to a playback device 124. In some embodiments, the CPS 2118 is file orientated such that a file is created during content capture and a content file is forwarded as a file to the CPS. In other embodiments, however, the content may be supplied as a stream of content or as a progressive download of multiple files. The content 2112 is uploaded to the CPS upload services 2120. From the CPS upload services 2120 the content can be stored in memory 2124 or directly supplied to the CPS 2118 to implement processing as more fully described below.

Once content is submitted to or retrieved by the CPS 2118, the content is forwarded to one or more content processing nodes 2130 for processing. A submission to a content processing node 2130 can be referred to as a "job." In some instances, a job is associated with a tracking document or set of parameters called the content traveler. For example, a content traveler tracking document or record can be created and utilized through the processing of the content. A content traveler record specifies where a source file of the content is located (e.g., in memory 2124), how it should be processed and where to put the results. Additionally, in some implementations, the content traveler record can further specify a source or who sent the content, and to where the processed content 2114 it is going to be delivered, which may be needed in some processing and/or distribution environments, such as in a mail messaging environment. The content traveler document is implemented as an XML document in some embodiments; however, the content traveler record can be formatted in substantially any relevant format from which information can be extracted and utilized. An additional document or set of parameters, referred to as a pipeline configuration, can specify how the content (e.g., source file) 2112 should be processed. Again, in some instances, this pipeline configuration file can be an XML document or other such relevant document. The pipeline configuration can specify audio, video, multiplexing, conforming, chunking, encryption and other such relevant parameters to be utilized by the CPS 2118. Below is an example of a content traveler record or document and an example of a pipeline configuration document.

Upon job completion a content processing node 2130 can open the associated content traveler document for the corresponding job and add the output source file locations and job status. The content processing node 2130 can then signal to the content processor manager 2126 that the job is complete. The content processor manager then updates a database to indicate the job is done, that the content is available for distribution, and that a requestor or some other entity can now consume the processed content 2114.

In some embodiments, the processing system 2110 employs the BD-Live mail messaging scheme as a component of the CPS 2118. The BD-Live mail messaging is used to message and manage workflow between the content processing manager 2126 and other entities of the system 2110 and or outside the system 2110. Additionally, in some embodiments, the BD-Live mail messaging scheme also represents processed content 2114 and presents a playback device player side application program interface (API) for accessing processed content generated from the CPS 2118. In some embodiments, the player side API (sometimes referred to as the "Mail API") presents an API based on the metaphors of mail folders (e.g., "in box"), messages and attachments. The player side API allows the playback device 124 to query for messages in a specific mail folder, read the messages and get URIs to associated attachments. For example, in some implementations, the pre-roll content processing can, similar to MovieMail and MyCommentary, represent individual user accessible pieces of content by a mail message. Further, the actual stream content can be represented by one or more attachments, links to content and/or identifies where content is stored. In addition to mail folders, message visibility can, in some implementations, be controlled by mail rules. These rules can include, but are not limited to, availability date ranges, by portable storage medium identification, playback device identification, age range, user identification, authorization, and other such rules. Rules can be independently applied to a given message giving a great deal of fine grained control over which messages a playback device can access.

Figure 22:
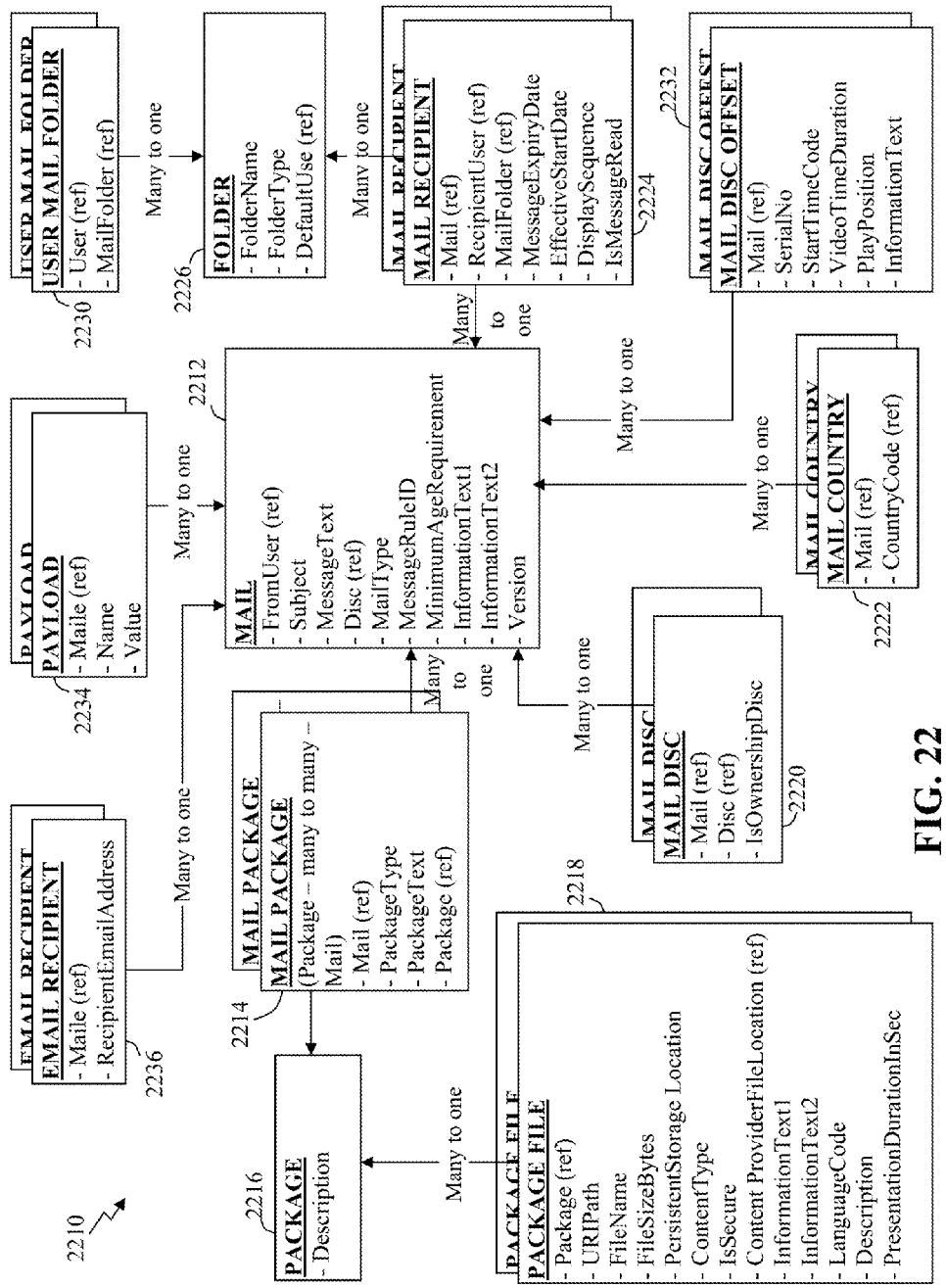
FIG. 22 depicts a simplified block representation of an exemplary messaging database schema relevant to messaging.

FIG. 22 depicts a simplified block representation of an exemplary messaging database schema 2210 relevant to messaging, such as the mail messaging, MovieMail, BD-Live mail messaging and/or other such messaging. The messaging database schema 2210 utilizes a plurality of database records or tables. In some instances the databases tables include a mail table 2212, a mail package table 2214, a package table 2216, a package file table 2218, a mail disc table 2220, a mail country table 2222, a mail recipient table 2224, a folder table 2226, a user mail table 2230, a mail disc offset table 2232, a payload table 2234, an email recipient table 2236 and/or other such relevant tables. Some of these tables reference other tables (e.g., some include "(ref)" identifiers, such as a "CountryCode" reference that has a foreign key (FK) relationship to a CountryCode table). Further, some of these tables reference other tables not shown in FIG. 22 (for clarity), which may be included such as but not limited to tables that may be utilizes with BD-Live Services. For example, the references "FromUser" and "RecipientUser" are references with FK relationships to a "User" table that contains user records for one or more users.

Utilizing the mail messaging database schema 2210, a player side API supports multiple commands and/or transactions. Some of these commands include, but are not limited to: a SendMessage( ) command that sends a message from a user to a list of users with or without attachments; a GetMessages( ) command can retrieve or obtain a listing of available messages for a specific user, and in some instances in a specific folder; a GetMessage( ) command allows a message to be retrieved and/or read in full; a Delete command deletes a message; and other such commands, such as commands for moving, adding and deleting mail folders.

The package table 2216 and package file table 2218 can, in part, provide attachments (resources), which in some instances are available with a BD-Live services framework. Further, messages can have rules and filtering applied during GetMessages or GetMessage( ) requests using a combination of the mail table 2212 and mail recipient table 2224. This can control the visibility of a message to the requestor. The rules and filtering that can be applied can include, but are not limited to: age validation; message availability dates (e.g., effective start and expiry); requestors for specific countries can be disallowed; messages can be associated with specific portable storage mediums (e.g., specific discs); message can be bound to specific folders so that requests to that folder return those messages; messages can be associated with a specific MailType (application) such as MovieMail and Trailers (e.g., where requestors can request messages associated only with that MailType); and other such rules and/or filters.

Again, the above functionality is exposed through relevant messaging services (e.g., the BD-Live Service API (MailAPI)). It can also be exposed through specialized classes as internal components for internal applications to call. For example, a CPM 2126 signaling described earlier, may use the mail scheme to pass processing state from one CPS entity (e.g., CPM or some other service or web application) to another. Each entity has a "user" identification and thus can send a message from itself to another user and check for messages to itself and act on the contents.

Figure 23:
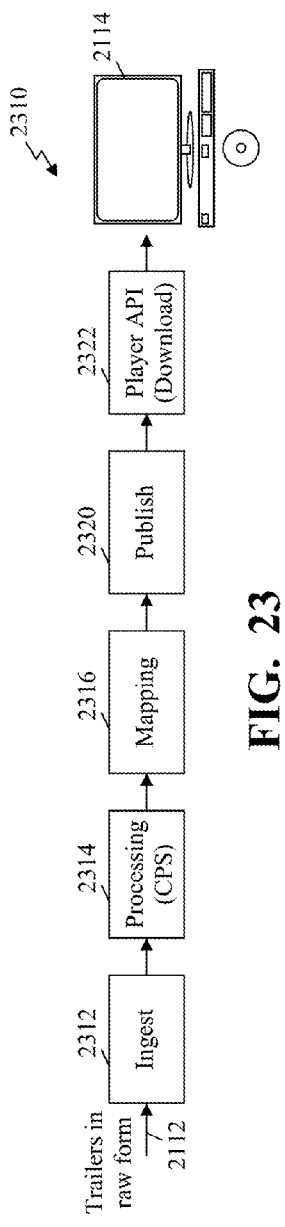
FIG. 23 depicts a simplified high level flow diagram of a process of processing pre-roll content in accordance with some embodiments.

FIG. 23 depicts a simplified high level flow diagram of a process 2310 of processing pre-roll content in accordance with some embodiments. This process 2310 can be implemented through one or more remote server 130, implemented through a local computer (or other such local content processing system, such as an editing system or the like) or a combination of a local computer and one or more remote sources 130. In step 2312, the pre-roll content 2112 is ingested. The pre-roll content is typically ingested in a raw form, such as in an audio video interleave (AVI) file, Windows Media video (WMV) file, a QuickTime (QT) media file and other such media files, although need not be restricted to linear media types. Typically each pre-roll content is represented by a dynamic content record. In step 2314, the pre-roll content is processed. This processing can include performing a conversion to a player ready content and placing the converted player ready content in a location that is ultimately accessible to a playback device 124 (e.g., at a content server 130, database 140, content delivery network (CDN) or the like).

In step 2316, a mapping of the pre-roll content is performed. This mapping can at least associate the pre-roll content with one or more portable storage mediums 122, and can further include organizing the pre-roll content relative to other content including other pre-roll content. In some embodiments, the mapping 2316 provides a process where dynamic content can be sub-organized to narrow down availability and consumption, for example, on a title by title basis, date, demographic, genre, consumers' preferences, and other such organizing. In step 2320, the processed pre-roll content is published making the pre-roll content available for download, streaming or other such delivery or access. For example, in some implementations, the publishing includes making the pre-roll content available to the Mail API and/or the production environment and accessible by playback device 124. In step 2322, the pre-roll content can be distributed to playback devices 124. In some embodiments, a playback device 124 can query for and select an appropriate mail message and then download the associated attachments.

The database tables associated with dynamic content and mapping provide for quick and convenient manipulation of the dynamic content. As such, in some instances these tables are considered administration tables. The decoupling of these tables from the messaging service (e.g., Mail API) via the publishing step allows content to be setup in a production environment without immediately being available to playback devices.

Some embodiments provide an ingest record (CPSIngest record) that provides at least some control of the ingest process and can allow the processing to comply with specific parameters, such as specific parameters as defined by a movie studio or the like. For example, pre-roll content processing can be specified for a given player side feature by creating and selecting a CPSIngest record. The CPSIngest record can be a top level database record that specifies how the raw pre-roll content file (or files) 2112 is to be ingested and processed in accordance with the requirements of the player side features.

Figure 24:
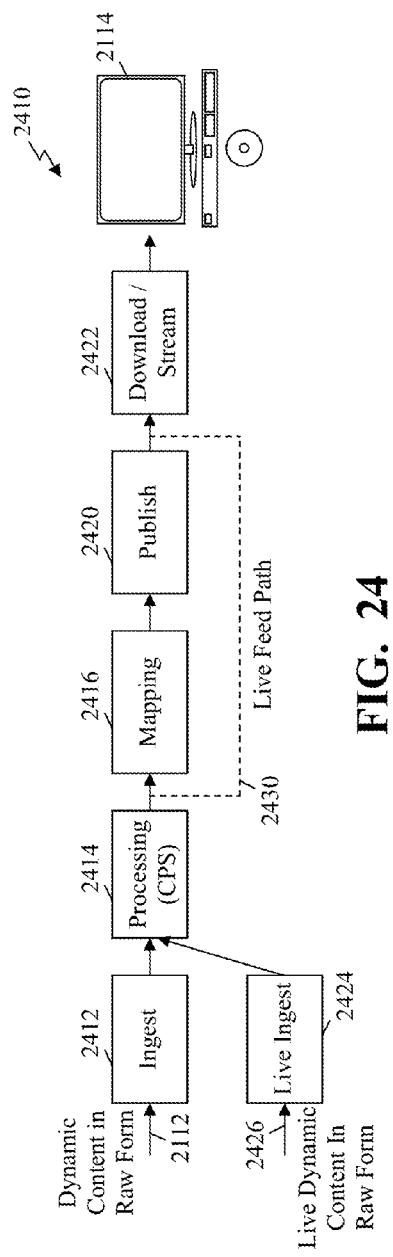
FIG. 24 depicts a simplified high level flow diagram of a process of processing content, in accordance with some embodiments, providing a feed for the flow of dynamic content from ingest to a playback device.

FIG. 24 depicts a simplified high level flow diagram of a process 2410 of processing content, in accordance with some embodiments, providing a feed for the flow of dynamic content 2112 from ingest to a playback device 124. Similar to the process 2310, the process 2410 can be implemented through one or more remote server 130, implemented through a local computer (or other such local content processing system, such as an editing system or the like) or a combination of a local computer and one or more remote sources 130. A feed represents a supply of dynamic content, which in some implementations can be similar to that of an RSS feed. An application running on the playback device 124 can be a consumer of one or more feeds. The playback device application can access content from a feed, for example a feed associated with the portable storage medium 122, query a particular feed (which may be similar to a channel query associated with an RSS feed), locate dynamic content associated with the feed (which may be similar to locating an item associated with an RSS feed) and pull down one or more content and/or streams associated with the dynamic content (which may be similar to pulling down an enclosure associated with an RSS feed).

In some embodiments a feed is associated with one or more features. A feature is the playback device side consumer of the feed. The feature may be deployed on or associated with multiple portable storage medium titles or be specific to just one title. The feature is implemented by code and resources contained within a package, which can be deployed to or otherwise implemented by the playback device. Some embodiments include a bootloader package and an updater package. Further, some embodiments can implement one or more additional vertical feature packages that implement a specific feature recorded on and/or associated with a portable storage medium title.

Still referring to FIG. 24, in step 2412 the pre-roll content 2112 is ingested. Similar to the step 2312 the pre-roll content is typically ingested in a raw form, such as in an AVI file, WMV file, a QT media file and other such media files, although need not be restricted to linear media types. In some embodiments, the ingesting configures the content in preparation for multi-stream generation that allows the raw content to be processed relative to multiple different encoding parameters to produce different resulting streams that can be utilized, as described above and further below, relative to different bandwidths and/or playback device functionality. This initial preparation can include configuring one or more pipeline configuration files relative to the multiple streams, or provides a multi-stream element that specifies override parameters for elements in a pipeline configuration file 2924 so that the ingest mechanism parses out stream elements relative to multiple streams to incorporate override parameters to each stream content traveler file. Further, the CPS-Ingest can be configured to provide a one-to-many configuration.

In step 2414, the pre-roll content is processed. Again, this processing can include performing a conversion to a player ready content and placing the converted player ready content in a location that is ultimately accessible to a playback device 124. The processing can further provide for the incorporation of null data and/or packets, and/or the generation of null packet mapping as described above and further described below. In step 2416, a mapping of the pre-roll content is performed to associate the pre-roll content with one or more portable storage mediums and/or other processed pre-roll content, and in some instances can define sequence playback orders. In step 2420, the processed pre-roll content is published making the pre-roll content available for download and/or streaming. In step 2422, the pre-roll content can be distributed to one or more playback devices 124 (e.g., downloaded, progressive downloaded, streamed or the like).

Some embodiments further include step 2424 that provides an additional or alternative ingestion of content 2426 that has an undefined end. For example, a recording of a live event being received to be distributed has an undefined end because the content is live. Similarly, continuous feed content such as broadcast content (e.g., radio, television and the like) and other such continuous feed content may not have a defined end. Some specific examples can include live director's commentary, internet radio, live sports events and other such content. In step 2424 dynamic content 2426 can be received and ingested regardless of whether the content has an end or is a complete file. A live feed, in some instances, is a specialization of a feed where the source of the feed is inherently continuous and/or has an unknown end. The ingest of continuous content can occur through a live or active connection point to the source of the raw dynamic content. A Windows streaming server is an example of such a source. It is further noted that in some embodiments one or both of mapping 2416 and publishing 2420 may not be implemented for a continuous or live feed content, and instead the process 2410 would continue along path 2430 because the content, in some instances, is defined to flow straight from the source to one or more consumers without intermediate management. In some instances a feed can be equated to an ingest (e.g., CPSIngest), a FeedFeatureType and a mail folder, with the CPSIngest representing an in-point and processing path specifying how to process the content for a feature, the FeedFeatureType represents the end-point indicating a end application on the playback device, and the mail folder string, which can be agreed upon between the player side and the server side, to specify a mail folder that content is published into and queried from. In other embodiments, a mail folder string and/or column is incorporated into a CPSIngest table, which can, at least in some instances, allow a feed to be specified by a single CPSIngest record.

Figure 25:
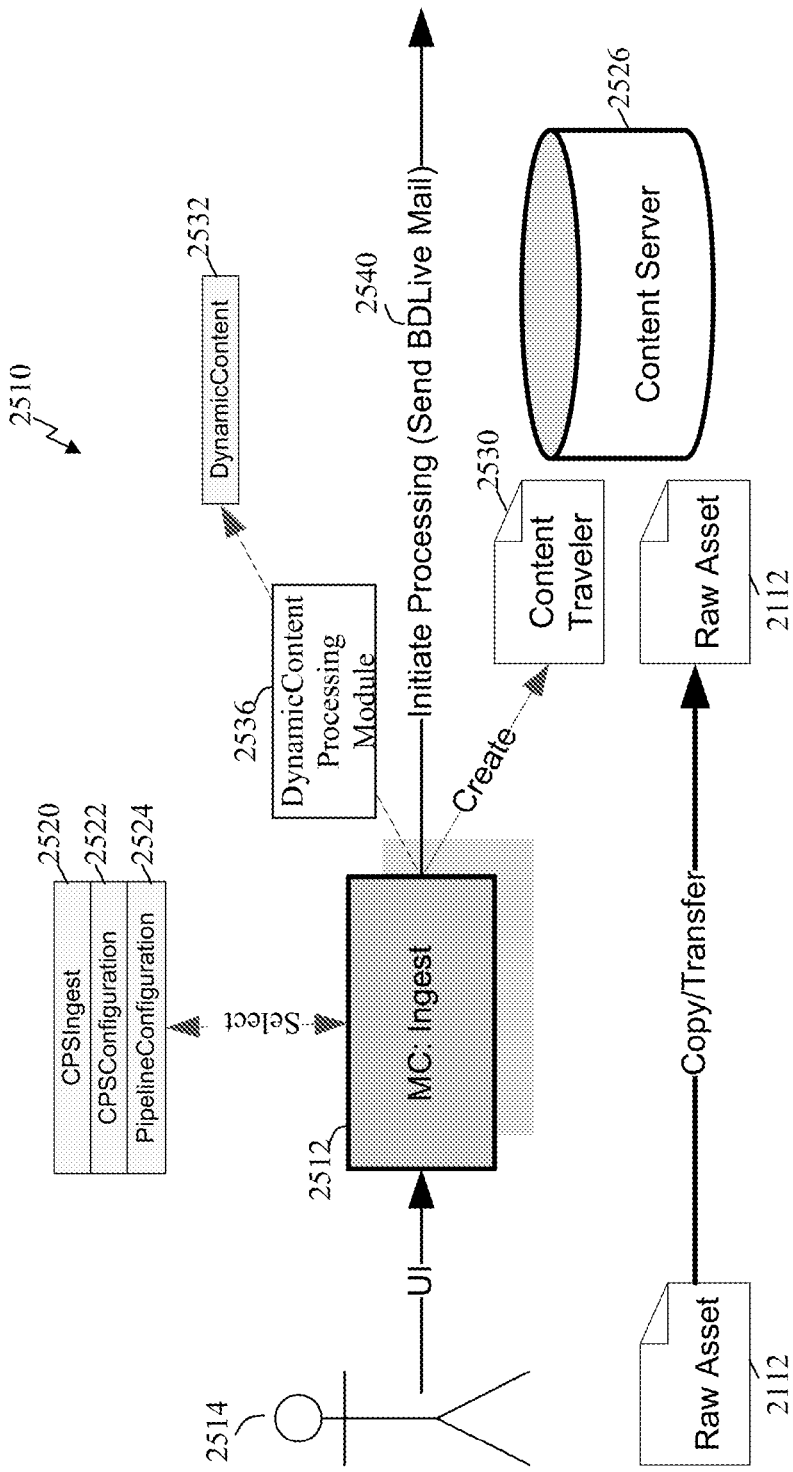
FIG. 25 depicts a simplified block diagram of an ingest system that can ingest content according to some embodiments.

FIG. 25 depicts a simplified block diagram of an ingest system 2510 that can ingest content according to some embodiments, which can implement step 2314, step 2412 and/or step 2424 in some implementations. The ingest system 2510 ingests raw content 2112 and associates relevant resources utilized in processing the content. An ingest application module 2512 identifies and/or selects a processing configuration that that in turn specifies a matching CPSIngest record 2520. Again, the CPSIngest record 2520 specifies at least some of the processing and setup parameters for the playback device side feature. In some embodiments, a user 2514 can initiate the ingest and can select the processing configuration from a user interface. The user interface, in some implementations, is provided through programming and/or executables implemented at a computer or other relevant device. In other instances, the user interface is provided through a management console Internet application (MC). The management console application can host the internal components to manage and initiate the ingest of the content 2112. As such, the ingest can be at least partially an operator controlled activity. Upon completion of the ingest the ingest system 2510 generates a notification 2540 to initiate processing (e.g., step 2414). This notification, in some embodiments, is a mail message, such as a BD-Live mail message, to the content processing system 2118 (e.g., to an appropriate content processing manager 2126 specified by the CPSConfiguration record 2522) to initiate the content processing.

The CPSIngest record 2520 additionally specifies a CPSConfiguration record 2522 that in turn specifies a pipeline configuration record or document 2524. This hierarchy of configuration allows for reuse and future expansion but taken together, in some embodiments, they specify: a content provider identification (ContentProviderID); one or more portable storage medium identifications (DiscID), which may be null in some implementations, such as in some instances where the pre-roll content is intended to be associated across title features); an identification allocator (BDIDAllocator) that provides a global allocator for clip and playlist identifications, where allocation of such identifications is managed across titles and features to avoid resource collision; a storage location of the raw content (e.g., storage locations on a content server 2526); Mail identifications used in initiating processing; pipeline configuration parameters (e.g., chunk duration) to setup the content processing node pipeline; and the like.

The raw content 2112 (e.g., pre-roll content) can be uploaded to a memory 2526 (e.g., a content server), which can be part of memory 2124, or in other embodiments a path to existing raw content 2112 is recorded. In some implementations, a user 2514 implements the upload or designates the path to existing raw content using the user interface.

The ingest application module 2512 establishes a name for the content 2112 and initiates the ingest processing. Again, in some implementations, a user can designate a name of the content 2112. Further, the ingest application module 2512 creates a content traveler record(s) or document(s) 2530 associated with the raw content 2112, typically stored or copied into the memory 2526. In some embodiments, the ingest application further communicates with the content processing managers 2126, such as sending the notification 2540 (e.g., a mail message), specified by the CPSConfiguration record 2522 to, for example, an appropriate content processing manager 2126 to activate content processing 2414. The ingest application can additionally create a dynamic record (DynamicContent record) 2532 that is further associated with the content 2112 to be processed. In some embodiments, the ingest system 2510 can include a dynamic content processing module (DynamicContentProcessing module) 2536 that receives information from the ingest application module 2512 to generate the dynamic content record 2532.

The dynamic content record 2532 is an intermediate data representation of the dynamic content 2112 in the feed to be processed. Further, the dynamic content record 2532 records state information and is used to maintain references to other data such as, but not limited to, name, processed state (e.g., new, processing, configured, and the like), a path to the source for the raw content (e.g., on the content server 2526), a path to the content traveler record 2530, a path to a module record 2540 (as described below), rules relative to use of the content and/or distribution of content, availability dates of the content, clip and playlist identifications, CPSIngest record 2520 and other such information. The created dynamic content record 2532 is used, at least in part, during the mapping 2416 and publishing 2420 stages, where the dynamic contact record 2532 can include a representation of an array of one or more streams or dynamic stream (DynamicStream) records.

As described above, some embodiments generate multiple streams or content files of the same content (e.g., same pre-roll content) to be used depending on varying bandwidths, playback device capabilities and/or other such factors. The ingest system 2510, in these embodiments, can further be implemented to provide documents and/or parameters to implement processing to generate multiple streams. Again, the pipeline parameters are generally contained in the pipeline configuration record or document 2524. Some embodiments utilizing a pipeline configuration for each intended stream (e.g., based on stream rate). In other embodiments, a single pipeline configuration record 2524 is provided with additional syntax to indicate to the ingest application module 2512 how to initiate a set of CPS processing operations based from the same source content 2112 with varying pipeline parameters. The content traveler mechanism can provide ways to override pipeline parameters generically, so in some implementations the additional syntax can define override parameters, such as an array of override parameters. Table 1 below shows an example of at least a portion of a pipeline configuration record 2524 that includes an array of override parameters:

TABLE 1

Example portion of a PipelineConfiguration record 2524

```xml
<?xml version="1.0" encoding="utf-8"?>
<pipelineConfiguration topologyID="F9D3AC51-78DD-4396-83AD-0E47
1EA2CFD6">
 <globalConfig>
  <templateVersion ver="1"/>
 </globalConfig>
 <multiStream>
  <stream sequence="0">
   <pipeElementConfig name="Transcoder">
    <VideoEncoderSettings EncodeWidth="720" EncodeHeight="480"
FrameRate="29.97">
     <InputPixelAspectRatio X="1" Y="1"/>
     <AVC_Encoder>
      <BitrateControl AvgBitrate="1000000" MaxBitrate="1500000"/>
      <Picture>
       <AspectRatio X="40" Y="33"/>
      </Picture>
     </AVC_Encoder>
    </VideoEncoderSettings>
   </pipeElementConfig>
   <pipeElementConfig name="BDSimpleConformer">
    <templateStreamPath path="TemplatePath\480i_3Mbps_rev2\00000_template.m2ts"/>
    <templateClipInfoPath path="TemplatePath\480i_3Mbps_rev2\00000_template.clpi"/>
    <templateChunkMapPath path="TemplatePath\480i_3Mbps_rev2\
00000_chunkmap.xml"/>
   </pipeElementConfig>
   <pipeElementConfig name="BinaryChunker" chunkMapPath="TemplatePath\
480i_3Mbps_rev2\00000_chunkmap.xml"/>
   <profile name="Low SD">
    <profileItem name="bitrate" value="1500000"/>
    <profileItem name="templaterate" value="3000000"/>
    <profileItem name="resolution" value="Res480i"/>
    <profileItem name="playlist" value="01928.mpls"/>
   </profile>
  </stream>
  <stream sequence="1">
   <pipeElementConfig name="Transcoder">
    <VideoEncoderSettings EncodeWidth="1280" EncodeHeight="720" FrameRate
="23.976">
     <InputPixelAspectRatio X="1" Y="1"/>
     <AVC_Encoder>
      <Generic VideoFormat="2" PictureType="0" PullDown="0" FieldOrder="1"
H264_Type="8" Profile="3" Level="40"/>
      <BitrateControl AvgBitrate="1500000" MaxBitrate="2250000"/>
      <Picture>
       <AspectRatio X="1" Y="1"/>
      </Picture>
     </AVC_Encoder>
    <VideoEncoderSettings>
   </pipeElementConfig>
   <pipeElementConfig name="BDSimpleConformer">
    <templateStreamPath path="TemplatePath\720p_4Mbps_rev2\
00000_template.m2ts"/>
    <templateClipInfoPath path="TemplatePath\720p_4Mbps_rev2\00000_template.clpi"/>
    <templateChunkMapPath path="TemplatePath\720p_4Mbps_rev2\
00000_chunkmap.xml"/>
   </pipeElementConfig>
   <pipeElementConfig name="BinaryChunker" chunkMapPath="TemplatePath\
720p_4Mbps_rev2\00000_chunkmap.xml"/>
   <profile name="Medium HD">
    <profileItem name="bitrate" value="2000000"/>
    <profileItem name="templaterate" value="4000000"/>
    <profileItem name="resolution" value="Res720p"/>
    <profileItem name="playlist" value="01929.mpls"/>
   </profile>
  </stream>
  <stream sequence="2">
   <profile name="Preview">
    <profileItem name="preview" value="true"/>
    <profileItem name="alternativePipelineConfig" value="29D09B62-CFC1-43cd-
9ADF-9243998BCEDD"/>
   </profile>
  </stream>
 </multiStream>
 <pipeElementConfig name="Transcoder">
  <General SourcePath="unused" WorkingPath="..\Temp" ChunkSize="1048576"
MaxDuration="0" EncodeVideo="true" EncodeAudio="true" RunMuxer="true"
UseFrameRateConverter="false" ClipType="1"/>
```

TABLE 1-continued

Example portion of a PipelineConfiguration record 2524

```
<VideoEncoderSettings EncodeWidth="720" EncodeHeight="480" Type="AVC"
FrameRate="29.97">
  <InputPixelAspectRatio X="1" Y="1"/>
  <AVC_Encoder>
  <Generic VideoFormat="2" PictureType="2" PullDown="2" FieldOrder="1"
H264_Type="8" Profile="1" Level="32"/>
  <BitrateControl Mode="2" Pass="2" AvgBitrate="1000000" MaxBitrate=
"1500000" CPB_BufferSize="12000000" BufferFullnessInitial="750000"
BufferFullnessTarget="0"/>
    <Picture UseSampleAspectRatio="true">
      <AspectRatio X="40" Y="33"/>
    </Picture>
    <InputInfo/>
    <GOP_Structure Max_GOP_Length="22" Max_B_FrameCount="2"
SceneChangeDetection="0"/>
    <AVC_AdvancedSettings IDR_Frequency="1" AdaptiveQuatization="false"
AdaptiveQuatizationStrength="0" NumberOfReferenceFrames="2"
 MotionEstSubpixelDepth="2" MotionEstUseSubblockSearch="true"
EntropyCodingMode="1" MotionEstSearchRange="63" UseDeblockingFilter="true"
DeblockingAalphaC0_Offset="-1" DeblockingBetaOffset="-1"
FilmGrainOptmStrength="0" BlackNormLevel="0" VideoFullRange="false"
QuantMode="2" MotionEstEnableWeightedPredictionMode="true"
MotionEstEnableFastMultiRef="false" MotionEstEnableFastSubBlock="false"
RDOptimization="true" RDOptmFast="false" UseHadamardTransform="true"
EnableFastInterDecisions="false" EnableFastIntraDecisions="false"/>
  </AVC_Encoder>
  <VideoEncoderSettings>
  <AudioEncoderSettings Type="DTSHD">
    <DTSHD_Encoder Type="DTSHD"
LicenseFilePath="..\ContentProcessingNode\DTSEncoder\dtslicense.dat"
ChannelLayout="2.0"
ProfilePath="..\ContentProcessingNode\DTSEncoder\Configurations\BD_Core
E605-51\DigSurPri_20ch_16bit_255.cfg"/>
  </AudioEncoderSettings>
  <Multiplexer TemplateConfigXMLPath="..\ContentProcessingNode\core1\
BDScript\CMP_OutOfMux_BDMV_DDS.xml" MuxerPath="..\ContentProcessingNode\
core1\ULHDAdvMuxerCmdLine.exe" BD_ApplicationType="1"/>
</pipeElementConfig>
<pipeElementConfig name="BDSimpleConformer" applyPTS="true"
allowNonCompliant=
"false">
  <templateStreamPath path="$CONFIGFILEREFBASEPATH$\Resources\Studio\
Common\Preroll\ConformerTemplates\3Mbps\00000_template.m2ts"/>
  <templateClipInfoPath path="$CONFIGFILEREFBASEPATH$\Resources\Studio\
Common\Preroll\ConformerTemplates\3Mbps\00000_template.clpi"/>
  <templateChunkMapPath path="$CONFIGFILEREFBASEPATH$\Resources\Studio\
Common\Preroll\ConformerTemplates\3Mbps\00000_chunkmap.xml>
  <conform pid="1011"/>
  <conform pid="1100"/>
</pipeElementConfig>
<pipeElementConfig name="BinaryChunker" applyPTS="true" fileSink="FileSink"
chunkMapPath="$CONFIGFILEREFBASEPATH$\Resources\Studio\Common\Preroll\
ConformerTemplates\3Mbps\00000_chunkmap.xml">
<pipeElementConfig name="PaddingRemoverElement" aacs="false" bypass="false"/>
<pipeElementConfig name="FileSink" localStorageDir="p">
<outputPath path="transoutput.mts" type="StreamProgressive" mode="OpenCreate"
intExt=
"sink"/>
</pipeElementConfig>
</pipelineConfiguration>
```

The "multiStream" element in the pipeline configuration record specifies how to override parameters for different rates of the pipeline. The ingest application module 2512 can signal, in the content traveler, which multi stream element to use from the pipeline configuration 2524. When the CPN 2130 receives the content traveler, it can construct a full configuration by parsing out the elements in the selected multiStream element and apply the override parameters to the pipeline configuration. A profile element specified in the example pipeline configuration record 2524 provides information that can be added to the content traveler records 2530 for use in communication to the playback device 124 regarding the nature of the stream (e.g., bit rate, resolution, associated playlist, template rate, and/or other such information). In other embodiments, the ingest application module 2512 may parse out stream elements within a multiStream element and incorporate relevant override parameters to each corresponding content traveler record 2530, where a stream sequence attribute can indicate an order of increasing stream rates. The pipeline configuration record, in some implementations, may additionally or alternatively include data or metadata parameters or elements that can optionally be added to the content traveler document. Further, the dynamic content processing module 2536 can create the dynamic content record 2532, and in some instances a dynamic stream record, for each stream to be generated, which may include or be accompanied by sequence indexing.

The CPSIngest record 2520, which may be implemented as a listing, one or more arrays, one or more tables, or combinations thereof, can be configured to specify one-to-many CPSConfiguration records 2522. This designation of multiple CPSConfiguration records 2522 can support, at least, variants for storage locations and/or public URLs or other access. Similarly, the CPSConfiguration record 2522 can be configured to specify one-to-many pipeline configuration records 2524. Again, this can support variations between streams, such as but not limited to variants for parameter configurations such as aspect ratios. In some embodiments, the CPSIngest record 2520 and/or the CPSConfiguration record 2522 can further define default configurations and/or records that can be utilized, for example, when other records are not specified.

In some implementations that provide the one-to-many streams, the user interface provided to a user 2514 in implementing the ingest 2412 may include additional features. These features may be provided as options in the user interface, one or more drop down menus or other such options. For example, a feature processing configuration may be provided that allows a user to specify and/or map to one or more CPSIngest records 2520. A server configuration option may also be provided that allows a user to specify and/or map to one or more CPSConfiguration record 2522. Further, some embodiments may provide a pipeline configuration option that that allows a user to specify and/or map to one or more pipeline configuration records 2524.

Figure 26:
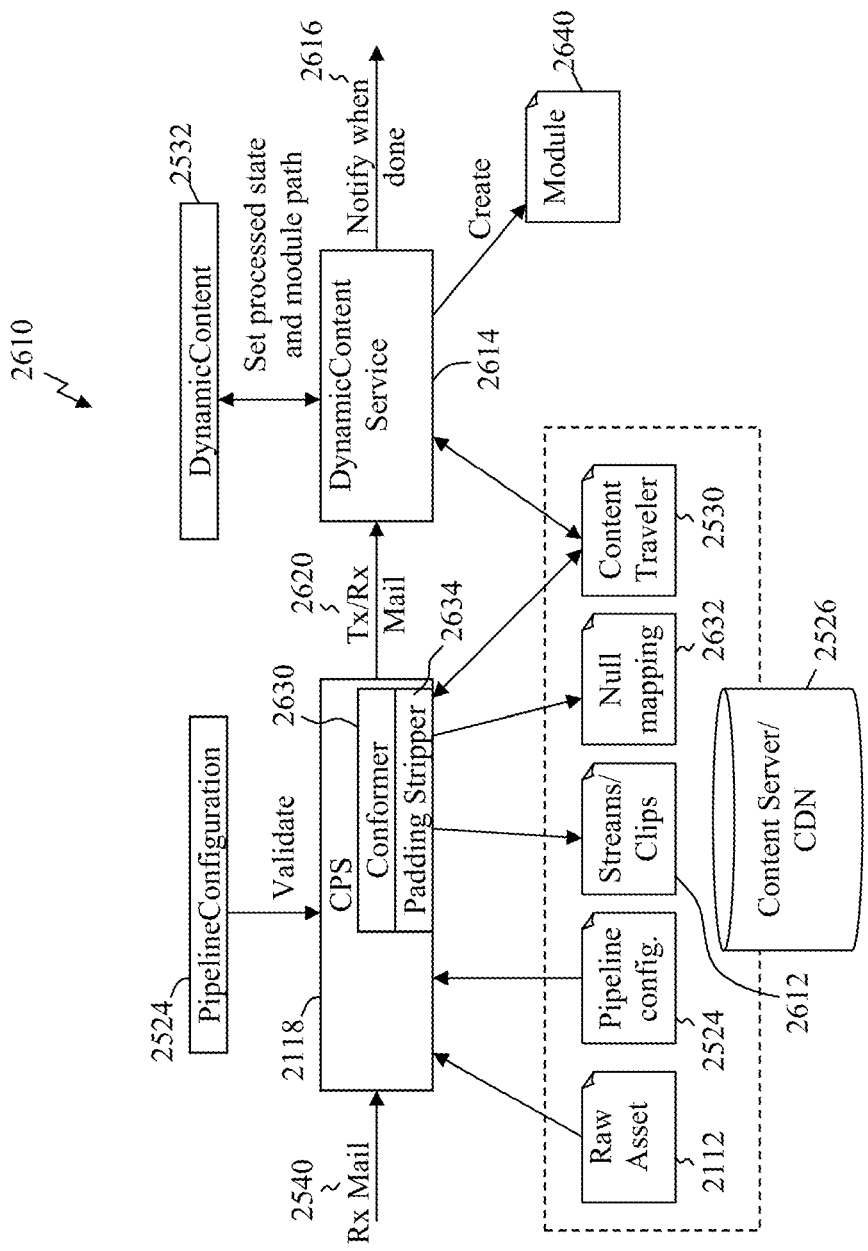
FIG. 26 depicts a simplified block diagram of a processing that can process content according to some embodiments.

FIG. 26 depicts a simplified block diagram of a processing system 2610 that can process content according to some embodiments, which can implement step 2314 and/or step 2414. The processing system 2610 processes raw content 2112 and associates relevant resources utilized in processing the content to produce processed content streams (and in some instances corresponding clip information) 2612. The processing system 2610 utilizes the content processing system (CPS) 2118 and a dynamic content service (DynamicContentService) module 2614.

Processing of the content 2112 (e.g., one or more pre-roll contents) is performed by the content processing system 2118 in response to receiving the notification 2540 (e.g., receipt of a mail message according to the specified pipeline configuration record 2524) and any additional parameters contained in the content traveler record 2530. Again, the content 2112 can be content files and/or continuous content, where the content processing system 2118 utilizes an ingest connection point to acquire and process the continuous content. The content traveler record 2530 is updated by the content processing system 2118 with state information and references to the processed output content 2612, which typically includes one or more content streams and associated clip information (e.g., Blu-ray Disc streams and clip information). In some embodiments, the processed content streams and clip information 2612 are stored in the content server memory 2526 or other relevant memory. The content processing system 2118 may further perform a validation of the pipeline configuration record 2524 and/or may update information within the pipeline configuration record.

Typically, one or more content processing nodes 2130 host a pipeline that performs some or all of the stream level processing. The processing of the content 2112 can include, but is not limited to, one or more of audio/video transcoding, multiplexing, stream conforming, chunking, AACS encrypting, file writing and other such processing. Some formats and/or standards, such as with Blu-ray Disc (BD) specification, provide that the content streams be accompanied by clip information that define navigational information about the transport stream. For example, the BD specification provides that for an MPEG transport stream that contains video and audio there is an associated clip information file. In some implementations, the clip information file contains an index that provides time to byte offsets in the stream (e.g., an entry point (EP) Map). Typically, downloading content to a BD capable playback device uses a progressive streaming or downloading feature of the BD specification. It provides that the clip information file already be on the playback device 124 and mapped into the virtual file system (VFS) before progressive streaming can begin. In many typical circumstances this would mean that before each new stream (or set of streams) can be downloaded and played the playback device 124 would have to go through a VFS update, which typically would introduce significant delays and result in a very poor user experience.

Some embodiments, however, provide content conforming to work around this problem by allowing one set of clip information files to be used for substantially any number of different streams. Content streams 2112 are configured according to the clip information present or predicted to be present at the playback device 124. Some embodiments include a conformer element 2630, such as part of the CPS 2118, that conforms the content according to a template and thus clip information at the playback device 124 as stored on the portable storage medium 122. Conforming allows the generated streams from the pipeline to be conformed to the existing clip information files preloaded in the VFS on the playback device 124. In some implementations, a "template" stream is utilized that matches the clip information files. For each new input stream, content processing node 2130 or the conformer element 2630 adjusts the input stream by, at least in part, inserting null packets so that the resulting conformed stream matches the template stream at least enough to be compliant with the corresponding clip information files.

Figure 27:
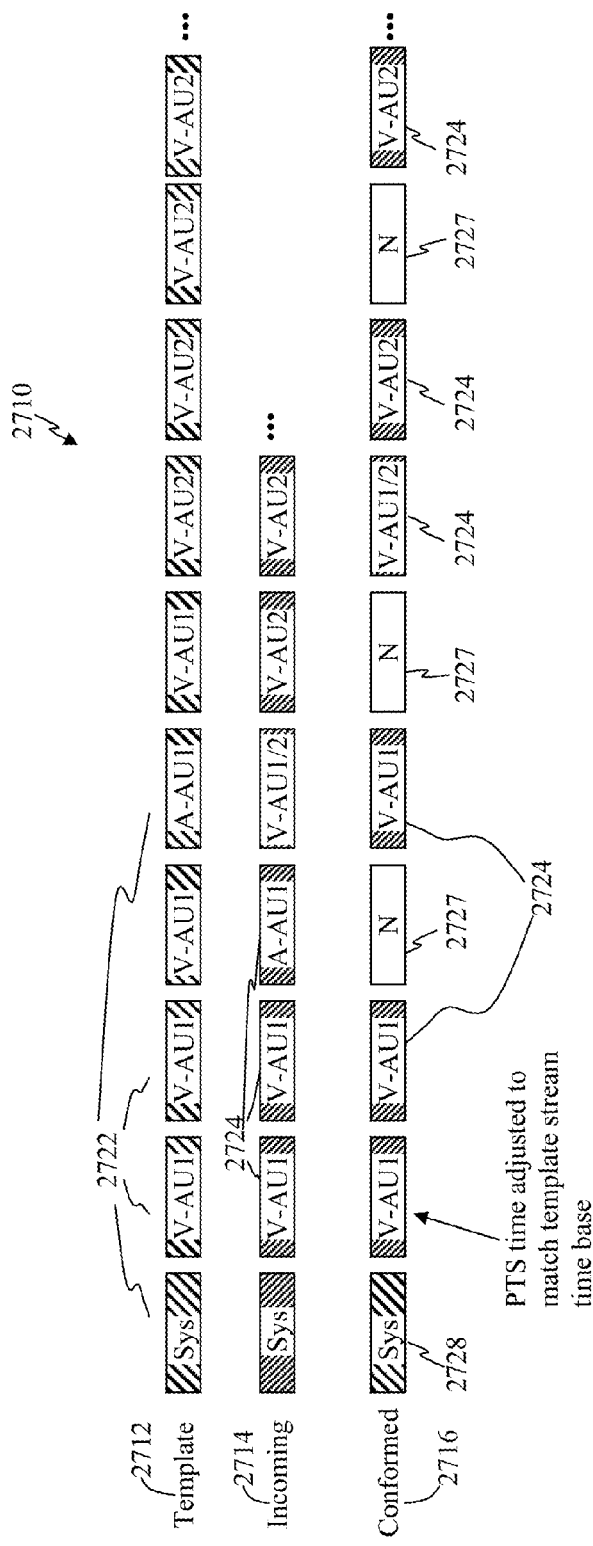
FIG. 27 depicts a simplified graphical representation of a conforming process in accordance with some embodiments.

FIG. 27 depicts a simplified graphical representation of a conforming process 2710 in accordance with some embodiments. Shown are a template stream 2712, a content stream 2714 and a conformed content stream 2716. The template stream 2712 is depicted as a series of packets 2722, and the incoming content stream 2714 is similarly shown as a series of packets 2724. A template stream 2712 is known and formatted in accordance with a known template clip information file or files.

The conformed content stream 2716 is shown as a series of packets 2724, 2727-2728, where the stream is conformed in accordance with the template and the template stream 2722 such that the conformed content stream 2716 includes one or more system packets 2728 and other such overhead packets (which in some instances include or are system packets from the template stream 2712), the content packets 2724 and additional null or padding packets 2727 inserted into the conformed content stream 2716 so that the resulting conformed content stream 2716 conforms to the clip template to be utilized by the playback device 124. The null packets 2727 provide padding bits between packets 2724 of content stream 2714 to, in part, compensate for the differences in the content stream 2714 versus the template stream 2712, to maintain timing, satisfy buffering requirements and/or conform the content stream 2724 with predefined clip information. Further, the use of the template stream 2712 allows multiple streams to be available for transfer to a playback device 124 at different rates for a given set of clip information files.

Referring to FIGS. 26-27, typically the null packets and/or data is ignored by the playback device 124. In some instances, the null data can include a series of zeros, a series of ones, a series of bits in a predefined order or the like so that the null data is detected by the playback device 124. For example, null packets 2727 can have a constant value in accordance with the MPEG2 transport specification. The stream conforming, and thus the stream conformer when present, is optional in the pipeline and can be employed when the player side feature is setup to play conformed content. The use of conformed content can avoid VFS updates beyond an initial start-up update and the delays that would result from a VFS update. Further, in some instances conformed streams do not need to include packaging during the publishing step 2420 because the clip information and playlist resources will be the same or from a constrained set for each video segment and template. A side effect of this is that new updater packages will not need to be created when adding new video segments.

The insertion of null data and/or packets 2727 can add to the overall data size of the content stream. As a result more data may have to be communicated to the playback device 124, which may result in additional delays and increased bandwidth usage. Further, in conforming a content stream 2714 a template stream 2712 is selected so that the content stream will fit the template for the expected input bitrates. The template stream 2712 is therefore typically at a highest expected bit rate and subsequently conformed streams are outputted at this highest bit rate with significant amounts of null data 2727. Again, the added null data results in increased bandwidth usage and can additionally result in increased delays.

Some embodiments address this increased data size and/or the potential increased delays resulting from conformed content streams 2716 by identifying where the null packets and/or data are inserted, generating a mapping 2632 of the null packets and/or data then removing the null packet and/or data from the conformed content stream 2116. The modified conformed content stream, with the null packets removed, can then be forwarded to an appropriately configured playback device 124 along with the null mapping information 2632 to allow the playback device 124 to reinsert the null data before writing the conformed content stream 2716 to local memory 226. As such, the potential delays and/or use of excess bandwidth associated with conformed streams 2716 can be mitigated by removing padding prior to transmission to the playback device 124. The playback device 124 can reinsert padding to reproduce the conformed content stream 2716 before writing the content stream to local storage so that the downloaded stream is compliant with the clip information at the playback device.

Further, some embodiments attempt to group null packets 2727 together where possible, and typically as much as possible within the constraints of a given specification for which the content is prepared (e.g., Blu-ray specification). For example, null packets can be grouped between one EP_fine entry presentation time in the clip information and the next EP_fine entry presentation time in accordance with the BD specification. The grouping of null packets 2727, as described above, can then be removed from the conformed stream 2716 before being communicated to a playback device 124, and signaling can be provided to the playback device (e.g., through a map file or other mapping information 2632) for reinsertion of the null data by the playback device 124. This signaling typically is an agreed upon signaling scheme between the pipeline and the playback device.

Some embodiments include the conformer element 2630 that conforms the content stream 2714 and can further identify and pass null packet byte positions, for example, as metadata along the pipeline, and in some instances provides this information for the null mapping 2632. As introduced above, in some instances the null packets 2727 and/or data can be removed from the conformed content stream 2716. Some embodiments include a padding stripper 2734 that evaluates the conformed stream 2716, identifies the null data and/or packets 2727 and extracts the null packets and/or other null data to provide the modified conformed content stream that can be forwarded to a playback device 124 along with the null mapping 2632. Further in some instances, the padding stripper 2634 may create the null map file 2632 for each chunk of the content stream. The map file 2632 contains instructions for the playback device 124 regarding how to reconstruct the conformed stream 2716 by reinserting null padding.

Processing the content 2112, in some embodiments, can include chucking or breaking up a long content stream into a series of chunks according to a time schedule and one or more matching clip information files. The chunking can be preformed on conformed and non-conformed streams. The chunking can include grouping multiple content packets 2724 and/or null packets 2727. The chunked content stream provides a plurality of chunks of content, and in some embodiments the chunking is based on alignment units.

In many instances the content 2112 is valuable content and as such is protected, for example, through encryption of the content or other such protections applied. As one specific example, an encryptor element can apply an advanced access content system (AACS) encryption in compliance with the BD specification. The encryption applies a 128 bit advanced encryption standard (AES) cipher block chaining (CBC) encryption on groups of packets called aligned units or chunks that correspond with the clip information.

Figure 28:
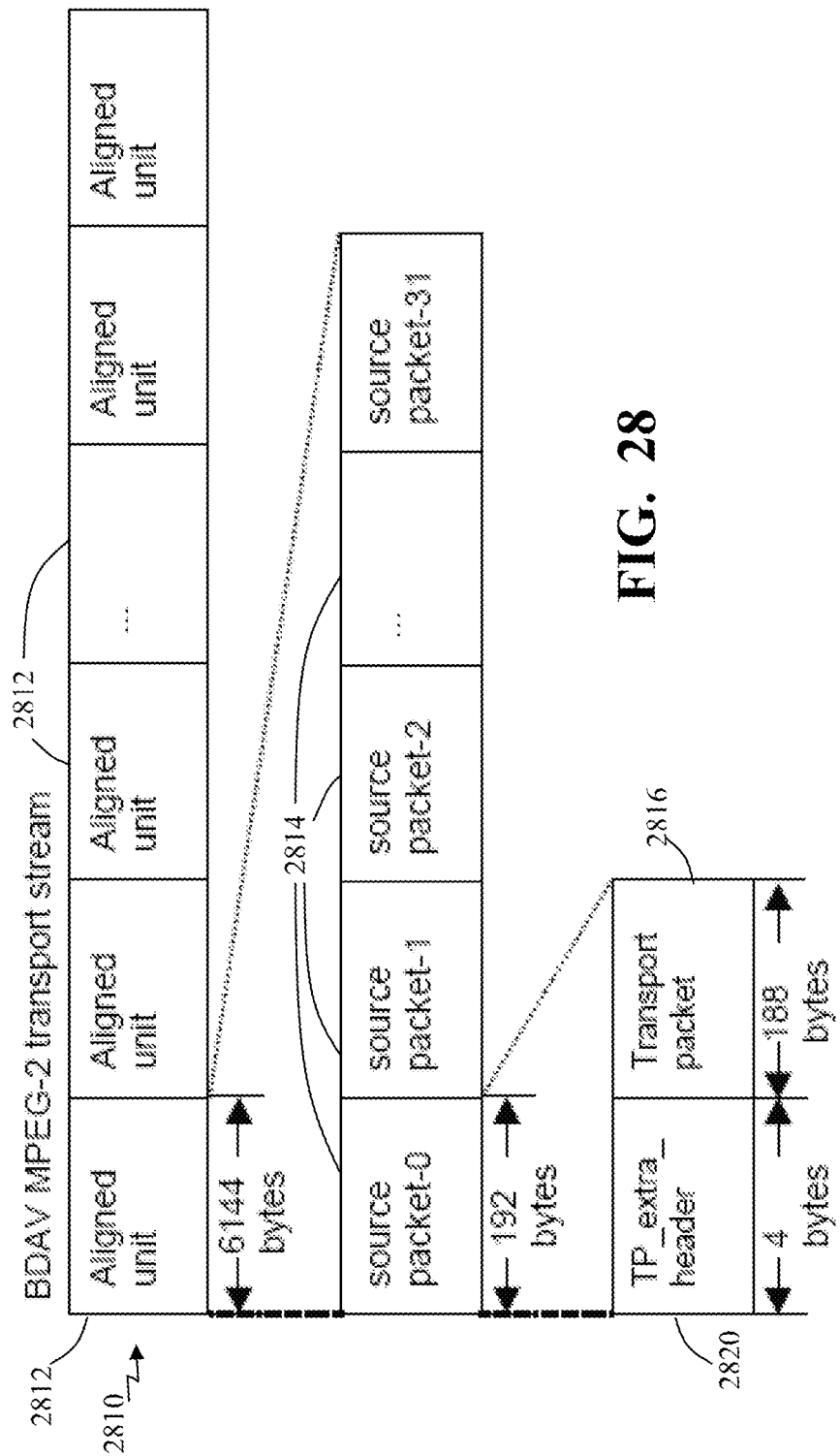
FIG. 28 depicts a simplified block diagram representation of an example content stream or portion of a content stream divided into a plurality of aligned units.

FIG. 28 depicts a simplified block diagram representation of an example content stream 2810 or portion of a content stream divided into a plurality of aligned units 2812. The transport stream 2810 is configured from a series of aligned units 2812. Each aligned unit 2812 comprises a plurality of source packets 2814. Each source packet includes a transport packet 2816, and in some instances a transport packet header 2820.

In this example, the content stream 2810 is compliant with MPEG2 and comprises MPEG2 transport packets 2816 that are 188 bytes. It is noted that the content stream 2810 can be configured for other standards and/or formats. A transport packet header 2820 is typically associated with the transport packet 2816. For example, in accordance with the BD specification the transport packet header 2820 (TP_ExtraHeader) is four (4) bytes that are prefixed to the transport packet 2816 to form a 192 byte source packet 2814. The transport header 2820 typically includes an arrival time clock (ATC) value and copy protection indicator bits (CPI) to indicate that the stream is protected or unprotected. Source packets 2814 are then collected into groups of 32 to form an aligned unit 2812 which is then encrypted when desired.

Figure 29:
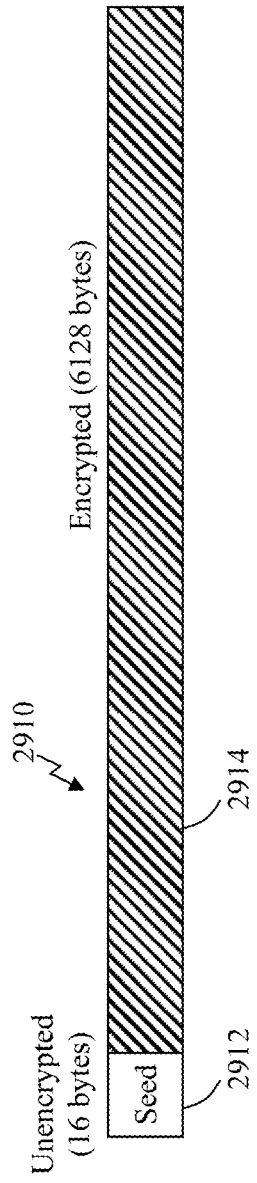
FIG. 29 shows a simplified graphical representation of an encrypted aligned unit according to some embodiments.

FIG. 29 shows a simplified graphical representation of an encrypted aligned unit 2812 according to some embodiments. The encrypted aligned unit can be configured and encrypted to include a seed 2912 of unencrypted content with the remainder 2914 of the aligned unit 2812 encrypted. In this example, the seed 2912 is the first 16 bytes of an aligned unit 2812 that is left unencrypted and used, at least in part, to form the seed for CBC chaining on an aligned unit basis.

Referring back to FIG. 26, a notification 2620 is forwarded to the dynamic content service module 2614 upon completion of the processing of the content 2112, including the generation of the content clips and processed content streams 2612. In some instances, the notification 2620 is a mail message and the dynamic content service module 2614 builds a module file or record 2640 that contains resources that are to be added to a package to allow the generated content to be accessible on a playback device 124. As introduce above, confirmed content steams often do not employ packaging as further discussed below.

Further, the dynamic content service module 2614 updates the state of the dynamic content record 2532, and in those instances where a module record 2640 is generated, fills out the path to the module. Upon completion, the dynamic content service module 2614 generates and sends one or more notifications 2616 (e.g., an SMTP email notification) to interested entities and/or parties that processing is complete and ready for the next stage (e.g., mapping 2416, publishing 2420 or distributing 2422, depending on the content, type of content, source of content and/or intended recipient of the content).

Additionally, some embodiments further process the raw content 2112 to produce multiple streams for a single content. Again, some embodiments provide multiple content streams at different bitrates and/or data quality to be available for a single dynamic content (e.g., single pre-roll content) so that a content stream or file can be selected with the most appropriate bit rate and/or quality for the current connection speed, bandwidth, playback device capabilities, other such factors or combinations of such factors. Further, the generation of the multiple streams can be substantially automatic and is essentially a hidden activity from the user (e.g., an operator 2514 supplying content) based on predefined parameters, while in other instances a user may define one or more stream parameters that can be used or used in cooperation with predefined parameters in generating content streams. The generated multiple streams are, in some instances, differentiated by bit rate and/or by resolution.

Again, the pipeline configuration record 2524 (or multiple pipeline configuration records) includes syntaxes to specify the multiple streams, for example, see Table 1 above. Further, the pipeline configuration record 2524 instructs the ingest system 2510 to initiate processing for each of the relevant number of streams to be generated based from the same source content 2112 with varying pipeline parameters. Additionally, the content traveler record 2530 can provide for a way to override pipeline parameters so that, for example, a new syntax would be an array of override parameters, and/or through a parsing out of each stream element within the multiStream element defined in the pipeline configuration record 2524, as performed for example by the ingest system 2510, and adding the override parameters to each relevant stream content traveler record 2530.

The processing system 2610, in some implementations, further binds or associates the multiple different streams generated from the one raw content 2112 together as part of a single piece of content or an association of content. The data representation for the multi-stream content identify the array of one or more streams, for example the dynamic content record 2532 can represent an array of one or more streams or dynamic stream records. Further, a dynamic stream record can reference a corresponding content traveler record 2530, where there is typically one content traveler record 2530 for each stream, and have an order sequence column to indicate variations between content streams (e.g., higher rate streams versus lower rate streams). This sequence can be defined in the pipeline configuration record's "multiStream" and "stream sequence" attributes. Additionally, the dynamic content service module 2614 ensures that the multiple dynamic streams generated for a given raw content 2112 are processed to completion and updates the dynamic content record 2532. In some instances when the content 2112 is conformed, and thus the resulting one or more processed content streams 2612 are conforming, there are no resources to be inputted into a module record or file 2640. As such, a module record 2640 is not created in some instances and the path in the dynamic content record 2532 is null or kept empty.

Figure 30:
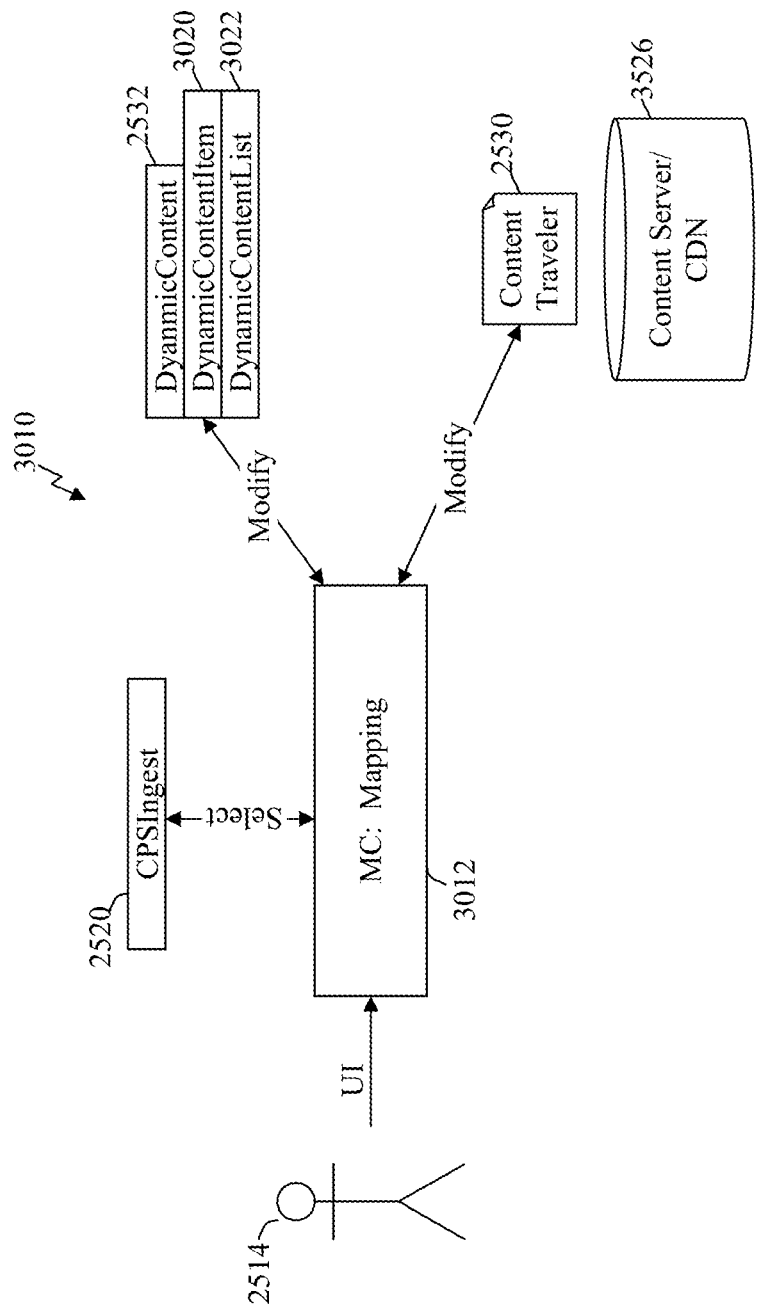
FIG. 30 depicts a simplified block diagram of a mapping system, according to some embodiments, that maps content for use by playback devices.

FIG. 30 depicts a simplified block diagram of a mapping system 3010, according to some embodiments, that maps content. In some implementations, the mapping system 3010 can implement step 2316 of FIG. 23 and/or step 2416 of the process 2410 of FIG. 24. As introduced above, mapping at least in part sub-organizes processed content 2612 in a feed. In some embodiments, the mapping assigns specific processed content items 2612 and/or groups of processed content to a specific feature title recorded to portable storage mediums 122, a set of feature titles, one or more portable storage mediums or other such association. In some instances the mapping can specify content display sequence(es), specify override rules and availability dates, add additional metadata or override existing metadata, and/or assign other such designations.

The mapping module 3012 hosts the mapping components, and in some instances can provide a user interface to allow a user 2514 to have or input some control over mapping. For example, the user 2514 can narrow lists of dynamic content records to be managed by selecting the associated CPSIngest record 2520. Further, a user can, through a user interface, organize the dynamic content records 2532 into content lists represented by one or more dynamic content items (DynamicContentItems) 3020 and dynamic content list (DynamicContentList) tables 3022. Each content list can be associated with one or more feature titles, one or more portable storage mediums or other such association. Metadata can be added and/or overwritten to the content traveler record 2530 relative to the mapping and/or lists. In some instances, the CPSIngest record 2520 and/or CPSConfiguration record 2522 can be configured to allow multiple pipeline configurations to be specified for a given feed (e.g., "4×3 7 s chunks" and "16×9 30 s chunks" CPSConfigurations could both be associated with a CPSIngest record).

Figure 31:
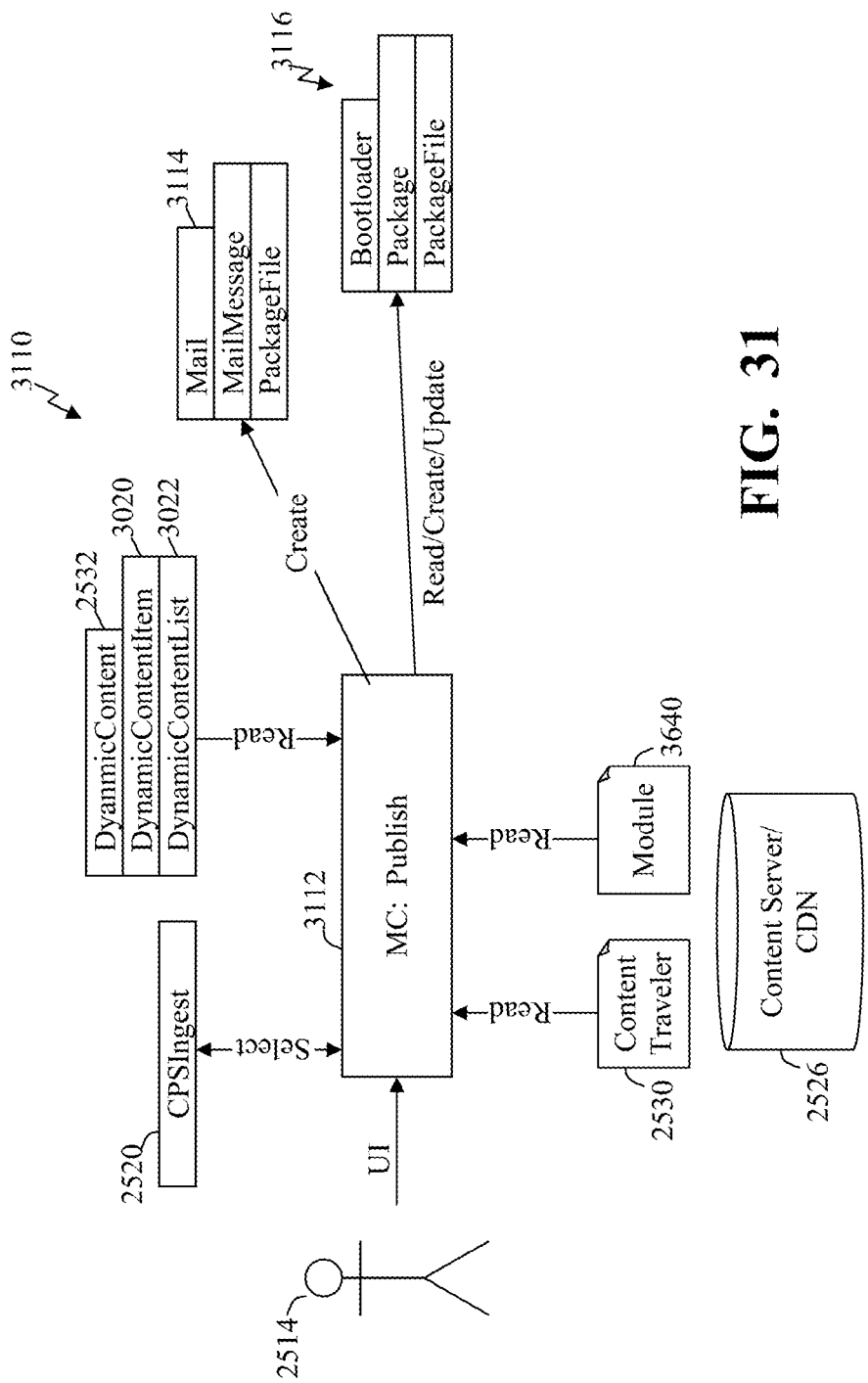
FIG. 31 depicts a simplified block diagram of a publishing system, according to some embodiments, which can implement portions of the processes of FIG. 22 and/or 23.

FIG. 31 depicts a simplified block diagram of a publishing system 3110, according to some embodiments, which can implement step 2320 of FIG. 23 and/or step 2420 of the process 2410 of FIG. 24. Typically, publishing includes the creation of notifications 3114, such as mail messages 3114, representing each piece of dynamic content 2612 according to the rules, metadata and title disc mappings. The mail messages 3114 can be associated with a mail folder (MailFolder). Further, the publishing creates packages 3116 (e.g., bootloader, updater or otherwise) to contain resources associated with the generated dynamic content 2612 relative to the VFS on the playback device 124. In some embodiments, a baseline package is taken as a reference and iterate through the mapped dynamic content records to be associated with the package and merging the resources referenced in the module record 2640 (when present) together into a new package. The process of publishing extracts data from the content traveler record and builds up the mail table or records 2212, package table or records 2216 and package file table or records 2218 to represent the data in the content traveler.

Once publishing is complete the feed state is contained in mail tables and package tables. The data model is split between dynamic content and mail data representations because, even though mail supports player side rules, message queries and attachments (for download and/or streaming), it is not a convenient model, in some instances, for tracking and managing intermediate mapping and organizing of content. Dynamic content tables are employed in some instances and more suited to tracking and managing intermediate mapping and organizing of content. Further, with conformed content a module record 2640 is often not generated and packaging is often not needed. The CPSIngest record 2520 (which in some instances is in table form) can indicate whether packaging is should be performed.

Figure 32:
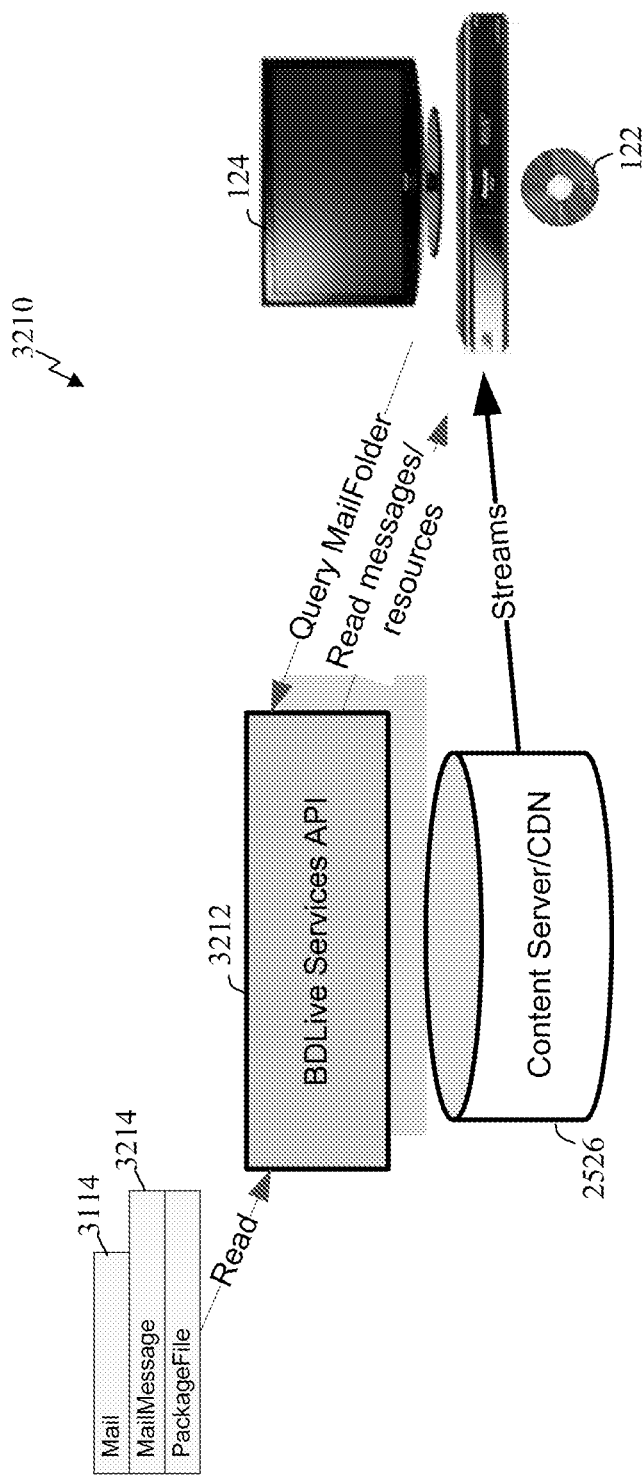
FIG. 32 depicts a simplified block diagram of an example of a content distribution system according to some embodiments that allows a playback device to obtain and play back pre-roll content in association with content recorded on a portable storage medium.

FIG. 32 depicts a simplified block diagram of an example of a content distribution system 3210 according to some embodiments that allows a playback device 124 to obtain and play back pre-roll content in association with content recorded on a portable storage medium 122. The playback device 124 utilizes an application interface 3212 to initiate an identification and transfer of pre-roll content. With the state of the dynamic content record 2532 now in the mail tables (and packages where needed) the playback device 124 can query for content as associated and/or supported by the feature application and/or content on the portable storage medium 122. For example, the playback device 124 can query by MailFolder, MailType, Mail Message and other parameters for content as supported by the feature application. The messages 3214 (e.g., mail messages) contain attachments, links and/or references that the playback device 124 can be use to acquire the pre-roll content, for example pulling down stream data directly from the content server and/or content delivery network as applicable.

Some video content has redundancy at an editing level. For example, FBI warning cards, studio logos and other content are often repeated across content and/or portable storage mediums 122. Some embodiments leverage the multi-use or reusable content to improve a user experience at least from a content download perspective. This reusable content, which can be configured from one or more segments of content, can be cached at the playback device 124 and reused, which reduces a net amount of data that needs to be downloaded when this reusable content is intended to be played back. Similarly, a segment can also refer to content that pre-exists on the portable storage medium 122 or is a static image. Again, this can reduce or minimize start up latency and mask download time. Additionally, smaller video segments provide more opportunities to choose a stream bit rate and/or stream profile to match current connection speed conditions and other relevant factors for the playback device (e.g., memory use, write speed and the like).

As described above, some embodiments represent a pre-roll content or other content by a dynamic content record 2532 (DynamicContent). The use of the small segments, however, allows a single content or pre-roll content to consist of one or more segments. As such, some embodiments provide a segment record or dynamic segment record (DynamicSegment) that represents a segment of content. This DynamicSegment record further allows ingest and mapping at the segment level.

Figure 33:
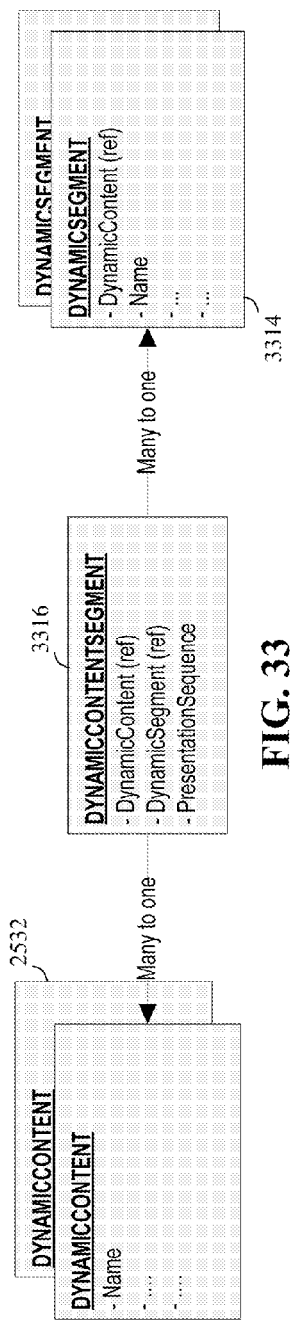
FIG. 33 depicts a simplified block diagram representation of a relationship between a dynamic content record and a DynamicSegment record according to some embodiments.

FIG. 33 depicts a simplified block diagram representation of a relationship between a dynamic content record 2532 and a DynamicSegment record 3314 according to some embodiments. In this embodiment, a table or listing 3316 (e.g., a DynamicContentSegment table) associates or binds DynamicSegment records 3314 in a flexible way to one or more dynamic content records 2532, and similarly associates or binds a dynamic content record 2532 to one or more DynamicSegment records 3314. As such, the DynamicContentSegment table 3316 allows a segment of content, represented by a DynamicSegment record, to be reused across multiple pieces of content, represented by a dynamic content record and/or allow content to be accessed from different sources, including using content from the portable storage medium 122 and not always downloaded content. The DynamicContentSegment table 3316 can, in some embodiments, further define a presentation sequence for a given set of segments in a piece of content.

Figure 34:
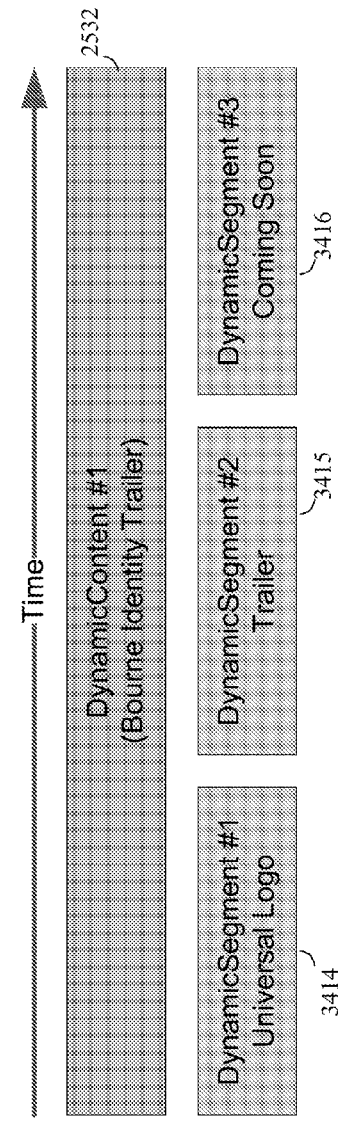
FIG. 34 depicts a simplified block diagram representation of a dynamic content record associated with multiple DynamicSegment records to make up the content corresponding to the dynamic content record.

FIG. 34 depicts a simplified block diagram representation of a dynamic content record 2532 associated with multiple DynamicSegment records 3414-3416 to make up the content corresponding to the dynamic content record. It may be possible, using the conforming model as described above, to join the segments as a seamless connection by aligning the segments to chunk boundaries. In other implementations, however, the connections between segments may be seamed or "seamy."

Some embodiments further incorporate metadata to additionally or alternatively associate content and/or organize content (e.g., organize content by genre, rating and/or other such factors). The organization can be at least partially automated by specifying the genre, rating or other organizational parameters as meta data during ingest or prior to mapping. The meta data can be, for example, stored in the content traveler record. In those embodiments that employ the more complex structure below dynamic content to include the DynamicSegment record, the meta data may alternatively or additionally be specified in the dynamic content record. This may be duplicated in the content traveler record for convenience but content organization can be driven from data maintained in the dynamic content record.

Further, multiple streams with differing characteristics (e.g., different bitrates and/or resolutions) can be generated and made available for substantially any piece of DynamicContent so that the playback device 124 and/or remote source 130 can select a stream profile and/or bit rate profile that is most appropriate for a current connection speed and/or playback device parameters and capabilities.

Again, the pipeline configuration record can be used in generating the multiple streams, for example, with the multiStream element specifying how to override parameters for each element of the pipeline. The ingest mechanism parses out each stream element within the multiStream element and adds the override parameters to corresponding stream content travelers. The ingest mechanism further signals in the content traveler which multiStream element to use from the pipeline configuration record. When the content processing node 2314, 2414 receives the content traveler, it constructs a full configuration by parsing out the elements in the selected multiStream element and applies the override parameters to the main pipeline configuration.

The sequence attribute of the pipeline configuration can indicate the order of increasing stream rate (e.g., zero is the lowest). Each additional stream increments the sequence number where max(sequence)=(streamTotal−1). Further, a meta data or metaDataProfile element can be provided in the pipeline configuration so that information can be added to the content traveler record and for communication to the playback device 124 regarding the nature of the stream (e.g., rate, resolution, an associated playlist on the playback device to use, and other such information). In some embodiments, this information is used in the messaging API (e.g., a media feed API).

As described above, the multiple related streams of a content can further be automatically bound together as part of a single piece of content. Further, some embodiments employ the DynamicSegments providing a finer element of representation that represents content at any particular range on the presentation timeline. With multiple steams a DynamicStream record or representation can further be defined providing an additional dimension to represent a range of streams sharing the same range on the presentation timeline.

The DynamicStream record references the content traveler (where in some instances there is one content traveler for each stream). The DynamicStream record can be constructed on the basis of the multi-stream syntax contained in the pipeline configuration recorded (e.g. XML document), and can be an XML document, one or more tables, text data, or the like. Some embodiments may include one or more designations to distinguish between the streams (e.g., an order sequence element or column to indicate higher rate streams versus lower rate streams; differing resolutions; and/or other such differences).

Figure 35:
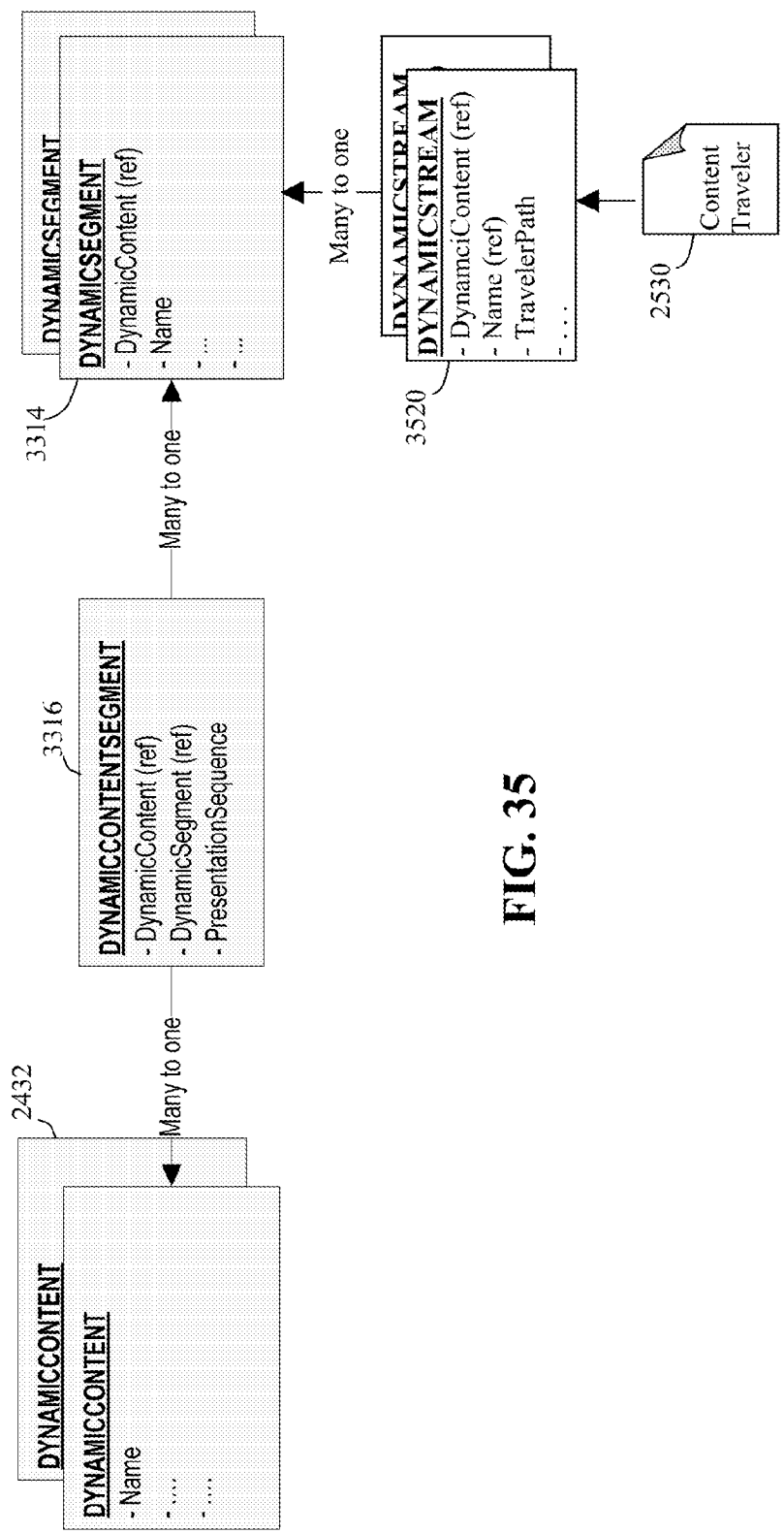
FIG. 35 depicts a simplified block diagram representation of a relationship between a dynamic content record and a DynamicSegment record with one or more DynamicStream representations or tables associated with the DynamicSegment record, according to some embodiments.

FIG. 35 depicts a simplified block diagram representation of a relationship between a dynamic content record 2532 and a DynamicSegment record 3314 with one or more DynamicStream representations or tables 3520 associated with the DynamicSegment record, according to some embodiments. Again, a DynamicContentSegment table 3316 binds DynamicSegment records 3314 in a flexible way to one or more dynamic content records 2532, and similarly binds a dynamic content record 2532 to one or more DynamicSegment records 3314. Further, one or more DynamicStream records or representations 3520 contain one or more records representing each individual stream bound to a single DynamicSegment record 3314. Additionally, the DynamicStream records 3520 correspond with a content traveler 2530. Typically, a stream is limited to belonging to one segment, while a segment can be associated with many streams. As such, multiple DynamicStream records 3520 can be bound to a single DynamicSegment record 3314, which in turn can be associated with one or more dynamic content records 2532 through the DynamicContentSegment table 3316.

Again, support for multiple streams is provided in the design architecture of the CPS node/manager arrangement, which in part allows the association or binding of the multiple streams to a segment and dynamic content. Further, the dynamic content service module 2614 is configured to support the dynamic content, DynamicSegment, DynamicStream database structure so that the streams and DynamicStream records 3520 for a given DynamicSegment record 3314 and dynamic content record 2532 are processed to completion, and in some instances marked as such, before updating and sending out notifications that a piece of dynamic content record indicates processing is complete.

With multiple streams available, a selection of one of the streams is performed prior to playback and some embodiments provide for adaptively switching streams. In some implementations, the switching can occur on a segment by segment level, while other embodiments provide switching points at the chunk level. Still other embodiments implement switching between retrieval of portions of the content (e.g., in response to a get request). Additionally, some limitations on switching may be employed in attempts to provide a consistent and/or enhanced playback experience. For example, switching at the chunk level may be limited to those situations where only the rate of the stream has changed. Similarly, limitations may be applied to prevent switching between resolutions, for example during a single piece of content because changes between resolutions while in play may cause undesirable effects, As described above, however, some embodiments can incorporate a lower definition content within a higher definition container to limit or avoid anomalies associated with transitioning from one definition to another definition (e.g., transitioning from a standard-definition to a high-definition).

The stream selection can be performed by the playback device 124 and/or the remote source 130. In some embodiments the playback device and/or remote source measures and monitors stream download rate, write rate, read rate and/or other metrics and/or parameters. Using the results of measured rate, bandwidth, buffer parameters or other parameters or combinations thereof, the playback device 124 and/or remote source 130 can select the most appropriate stream rate to download at the next available switching point. Some embodiments further store and/or cache the monitored rate and/or other parameters between switch points and/or measurements to improve stream selection at a subsequent playback or switch point. Additionally, because some embodiments conform pre-roll content, playlist identification and clip identification allocation may not be needed. The identification tracking further can be moved down to the DynamicStream level and a switch may be designated in the pipeline configuration table to enable identification allocation, while support for content processing (e.g., trainer processing) where ID allocation is used can be maintained.

As described above, the different streams of a given content are linked (e.g., a first stream of a content may have a first resolution while a second stream of the same content may have a second resolution, with the first and second streams linked). In some embodiments, when two or more DynamicSegment representations are linked together there is further provided a continuity in the stream profiles between one segment and the next so that the download rates can effectively be controlled by the playback device 124 and/or the remote source 130. For example, when a first segment has a 720×480 resolution stream, some embodiments ensure that there is a matching resolution stream in the next segment otherwise the playback device may be forced to do a resolution switch, which may be disruptive to the playback experience. Similarly, some embodiments may also provide some limitations, restrictions or requirement between two dynamic content items linked together in a list to establish a smooth viewing experience. For example, these restrictions can be enforced, in some embodiments, by specifying that all segments in a piece of content and between content (if needed) use the same CPSIngest feature during processing, which can indicate that appropriate multi stream pipeline configurations were used.

Again, the playback of pre-roll content often attempts to minimize the delays in initiating playback as well as between video segments. Delays can be limited by the use of conformed streams that are conformed in accordance with one or more templates known at the playback device or for which a playlist has been configured. Further, null packets can be defined to be incorporated into the content at the playback device 124 to reduce the amount of content that is transferred. For example, null packets can be grouped together where possible between one EP_fine entry presentation time in the clip information and the next EP_fine entry presentation time; removed from the stream; and then location information signaled to the playback device (e.g., via a map file) for reinsertion, such as providing null packet byte positions as meta data along the pipeline. The processing can include a padding remover application or element that remove padding packets and creates a map file for each chunk. The map file contains instructions for the playback device on how to reconstruct the stream by reinserting padding, and the CPN application layer adds the map file to the content traveler output resource list.

In some embodiments, the smallest piece of dynamic content 2612 can be less than a single trailer, advertisement, user identified piece of content or other such content. Again, this is referred to in some implementations as a video segment. For example, an FBI warning card can be a single video segment that can represent as single piece of dynamic content. This allows for optimizations to be made regarding the download of repeated video segments. Specifically, it supports minimizing start up latency and masking download time by increasing the likelihood that previously received and stored content segments (e.g., cached) can be reused at a playback device 124. Additionally, smaller video segments provide more opportunities to choose a stream bit rate to match current connection speed conditions on the playback device 124. Some embodiments have a DynamicSegment construct allowing groups of segments to be bound together. This construct can aid the playback device and the user interface.

As described above, the ingesting of content allows multiple pipeline configurations to be specified for a given feed. For example, "4×3 7 s chunks" and "16×9 30 s chunks" CPSConfigurations could both be associated with a single content (e.g., a trailer). Further relationships can be defined to aid or enhance the ingestion and multiple stream configurations, such as but not limited to: one or more CPSConfiguration records 2522 to a CPSIngest record or table 2520; and one or more pipeline configurations 2524 to a CPSConfiguration record 2522. Additionally in some embodiments, the CPSIngest record 2520 identifies: an association of a ingest feature with a particular portable storage medium or no portable storage medium; an associated identification allocator (e.g., BD ID Allocator) that is common across the ingest feature and possibly across multiple ingest features; a high level content type (e.g., pre-roll, trailer, or the like); an associated content owner (e.g., movie studio); and other relevant information. Further, the CPSConfiguration record 2522 can specify: one or more content server storage paths; a location (e.g., a public URL) to access the output content, which may be region specific; CPM routing information, which can specify how the content gets routed through the CPS; and other such information. In addition, the pipeline configuration record 2524 and associated XML document can specify information such as but not limited to: a set of parameters to be applied in processes the source content (e.g., audio/video codec, bit rate, resolution, aspect ratio, chunking durations, AACS encryption, and/or other such parameter); attributes of the pipeline configuration to manage ingest (e.g., chunking duration, multi-stream specification syntax, and the like); and other such information. As such, the flexible relationships allow adjustments to processing output content server paths, public URLs and exact processing parameters for the same ingest feature, with the CPSIngest record 2520 effectively providing a high level definition of the "feed," with other tables and/or records defining specifics. The DynamicStream record 3520 references a pipeline configuration 2524 record (and hence a CPSIngest record 2520 and CPSConfiguration record 2522), which can allow full reconstruction of the configuration for reprocessing. Some embodiments additionally provide a default bit that can indicate the overall default configuration associated with corresponding CPSIngest, CPSConfiguration and pipeline configuration records.

As part of the ingest process the content is received and stored, and made available to be distributed to playback devices. In some embodiments, the storage locations and/or folders to which received content is stored may be the same as the storage location from which the content is retrieved (e.g., <content server region>/Storage/ContentProcessingSystem/<studio>/<title>/<application>/). For example, both the source and output can be defined by the use of a context global storage variable (CPMBasePath, may be loaded from a web/app.configuration key) and the relative path of the source asset. This global variable, in part, allows content to be relocated by changing the web/app configuration keys.

Other embodiments, however, in providing greater flexibility employ a different folder structure of the content server and CDN servers, where content server folders into which source assets are uploaded are different than to where content are to be downloaded from. For example, the folder structure can define an input (e.g., <content server region>/Storage/ContentProcessingSystem/<studio>/<title>/<application>/), and an output (e.g., <content server region>/<studio>/<static>/<title>/<application>/<streams>). Alternative variables can be utilized to identify these storage locations, which may be defined by fields, for example, in the CPSConfiguration record 2522 (e.g., StoragePath and CPMBasePath). As a further example, a source storage location may be defined as:

<source folder>=CPMBasePath+CPSConfiguration.SourceRelativeBasePath; and an output path may be defined as:

<output folder>=CPMBasePath+CPSConfiguration.OutputRelativeBasePath. The source folder locations are honored by the upload and ingest mechanisms, while the output folder locations are embedded into the content traveler 2530 and propagated to the CPM 2126 and CPN 2130 so that the output folder location can be honored.

In some cases, existing content may need to be reprocessed. This could be due, for example, to configuration selection changes, errors or bugs in the system, pipeline software changes, or other such changes. As a result, some embodiments can reconstruct the configuration that was used to process a given segment or stream of content. For example, when a specific pipeline configuration is changed to improve quality or adjust rate, the DynamicStreams associated with this configuration can be located and resubmitted into the pipeline for reprocessing. The affected DynamicContentLists records could then be republished to push the changes into the field.

In mapping content, the content is often organized. There are potentially several ways and combinations of ways in which content can be organized. For example, content may be organized based on a genre, a rating, a content owner (e.g., studio), an intended audience, associations with other content, demographics, language, location where content is intended to be accessed, portable storage mediums with which content is to be associated, or other such organizations or combinations of such organizations. Similarly, content (e.g., a pre-roll content) can be associated with one or more different organizational schemes. Some embodiments may employ an organization based on the portable storage with which the pre-roll content is to be associated, and/or content may be organized into one or more "buckets" with one or more portable storage mediums 122 being associated with each bucket. A named list can be defined and associated with one or more portable storage mediums. In some instances, these named lists can be created in the context of a CPS Ingest configuration, which can allow enforcement of matching stream profile rules for linked content.

Figure 36:
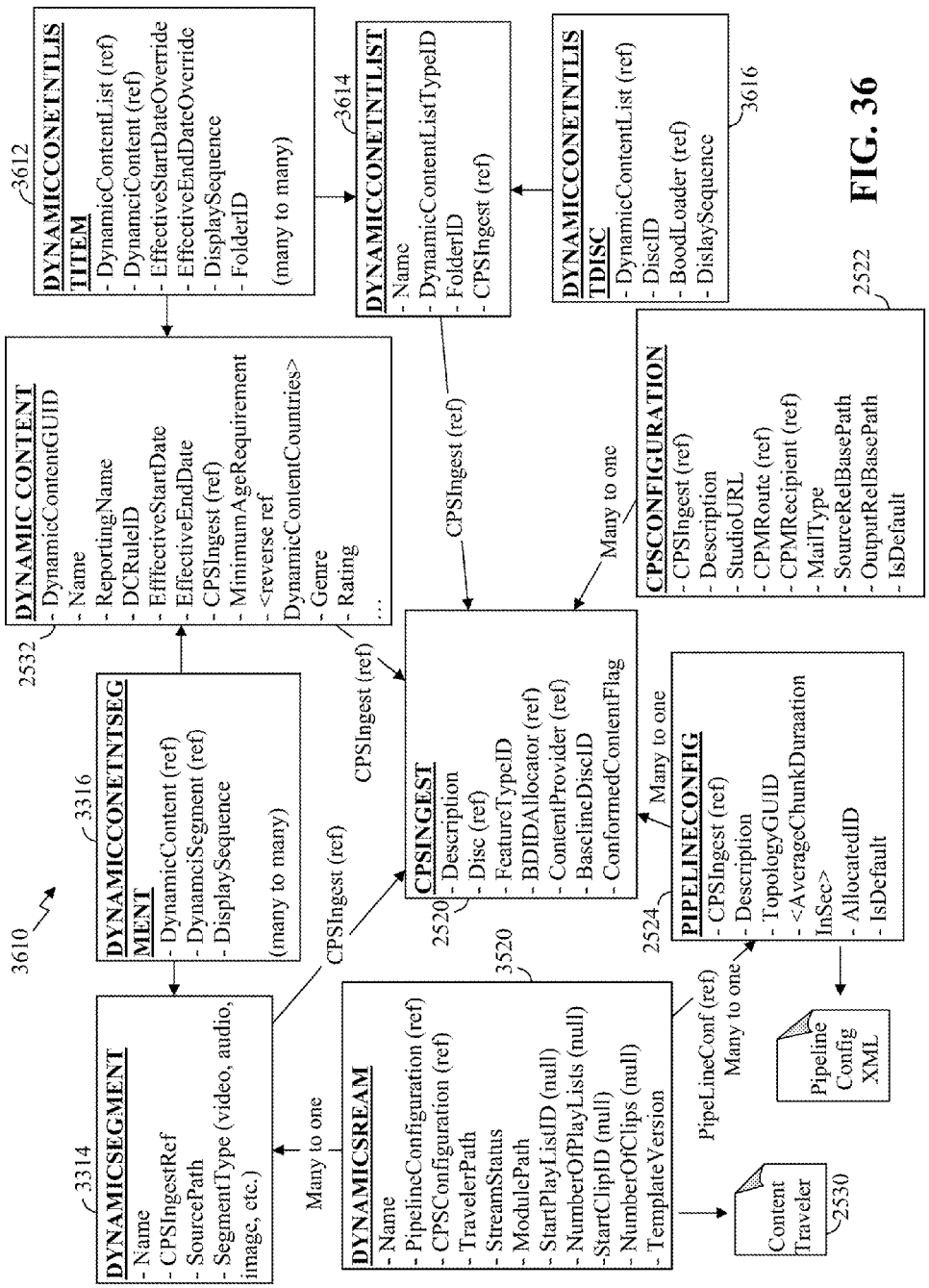
FIG. 36 depicts a simplified block diagram representation of a dynamic content database scheme for use in managing content ingest and mapping.

FIG. 36 depicts a simplified block diagram representation of a dynamic content database scheme 3610 for use in managing content ingest and mapping. As shown in FIG. 35 and described above, a DynamicContentSegment table 3316 associates or binds one or more DynamicSegment records 3314 with one or more dynamic content records 2532, and associates or binds a dynamic content record 2532 to one or more DynamicSegment records 3314. One or more DynamicStream representations 3520 containing one or more records representing each individual stream are further associated with a DynamicSegment record 3314 and a pipeline configuration record 2524. Further, the DynamicStream records correspond with a content traveler 2530. A dynamic content list item 3612 is associated with the dynamic content record 2532 and with a dynamic content list record 3614. A dynamic content list disc record or table 3616 is further associated with and/or references the dynamic content list 3614. Additionally, a CPSIngest record 2520 is referenced by the DynamicSegment reference 3314, the dynamic content record 2532, the dynamic content list record 3614 and one or more pipeline configuration records 2524 and CPSConfiguration records 2522.

The content database scheme 3610, in part, graphically shows the relationships between content, segments and streams, and how content is listed and the associated meta data. The association with the CPSIngest record 2520 as well as the CPSConfiguration record 2522 and pipeline configuration record 2524 are further shown, which provides for refactoring. In some embodiments, an "IsDefault" field is included in the CPSConfiguration record 242 and the pipeline configuration record 2524 to indicate to the user interface application which is the default configuration set to initially display. Further, the CPSConfiguration record 2522 can include fields "SourceRelBasePath" and "OutputRelBasePath," as described above to specific source and output relative directory paths. Additionally, the content database scheme 3610 demonstrates how segments indicate the type of content and where that content is stored.

Some embodiments further provide the dynamic content list disc table 3616 that allows a single dynamic content list 3614 to be shared across multiple portable storage mediums 122. This supports the "bucket" concept allowing multiple different content (e.g., multiple different pre-roll content) to be utilized across multiple different portable storage mediums and/or titles. Again, a named list can be created and assigned to one or more portable storage mediums with which the one or more pre-roll contents can be associated. The pipeline configuration record 2524 includes an additional AllocatedID field that indicates to the ingest process to use the BDIDAllocator to allocate clip and stream identifiers.

The publishing process 2320 published the ingested and mapped content to the distribution application to distribute the content to playback devices 124 (e.g., through download, progressive download, streaming and the like). In some embodiments, the publishing process comprises two steps: records, representations and/or tables conversion publishing; and a content feed flattening. When employing a mail type distribution scheme, for example, the DynamicStream record 3520, the DynamicSegment record 3314, the dynamic content record 2532, the dynamic content list record 3614 and/or other such records may have to be converted into mail records while preserving rules and attributes. The content feed flattening provides a process of optimization to extract mail records 2212 and mail package records 2214 combinations, and then apply rules in generating a flattened set of one or more "feed" tables, one or more "stream" tables or files and a "guide" table or file, where the guide table contains references to stream tables and the stream tables contain stream location references (e.g., stream URL references) to obtain content from the location (e.g., a URL to a remote source). In some mail distribution applications, such as a mail API, there are many interconnected Mail tables and rules to apply (see FIG. 22). As a result, such a messaging or mail API can be slow. The playback of pre-roll content often demands fast access because delays can degrade a user experience, and in some instances download is automatic and not user initiated. Therefore, some embodiments utilize the feed flattening process and resulting flattened set of tables to provide fast access. Further, some embodiments in attempts to improve the response time and reduce delays reduce or minimize the number of foreign key (FK) relationships.

The use of the stream files and guide file simplifies the identification and access to the content. In some embodiments, the stream files and the guide file are static XML files that can be downloaded once by the playback device 124 and cached for future use. This provides a further level of optimization by reducing the amount of data downloaded from the remote source 130 to the playback device. In implementing the pre-roll playback, content is access for download, progressive downloading, streaming or the like using a feed API (sometimes referred to as a MediaFeed API). The MediaFeed API provides access to the flattened tables and references to the stream and guide XML files. Typically, the stream files provide links, addresses and/or otherwise identifies the content that can be accessed and played back. This can include content to be downloaded from a remote source 130, content already locally stored on the playback device 124 and/or content recorded on the portable storage medium being accessed.

Figure 37:
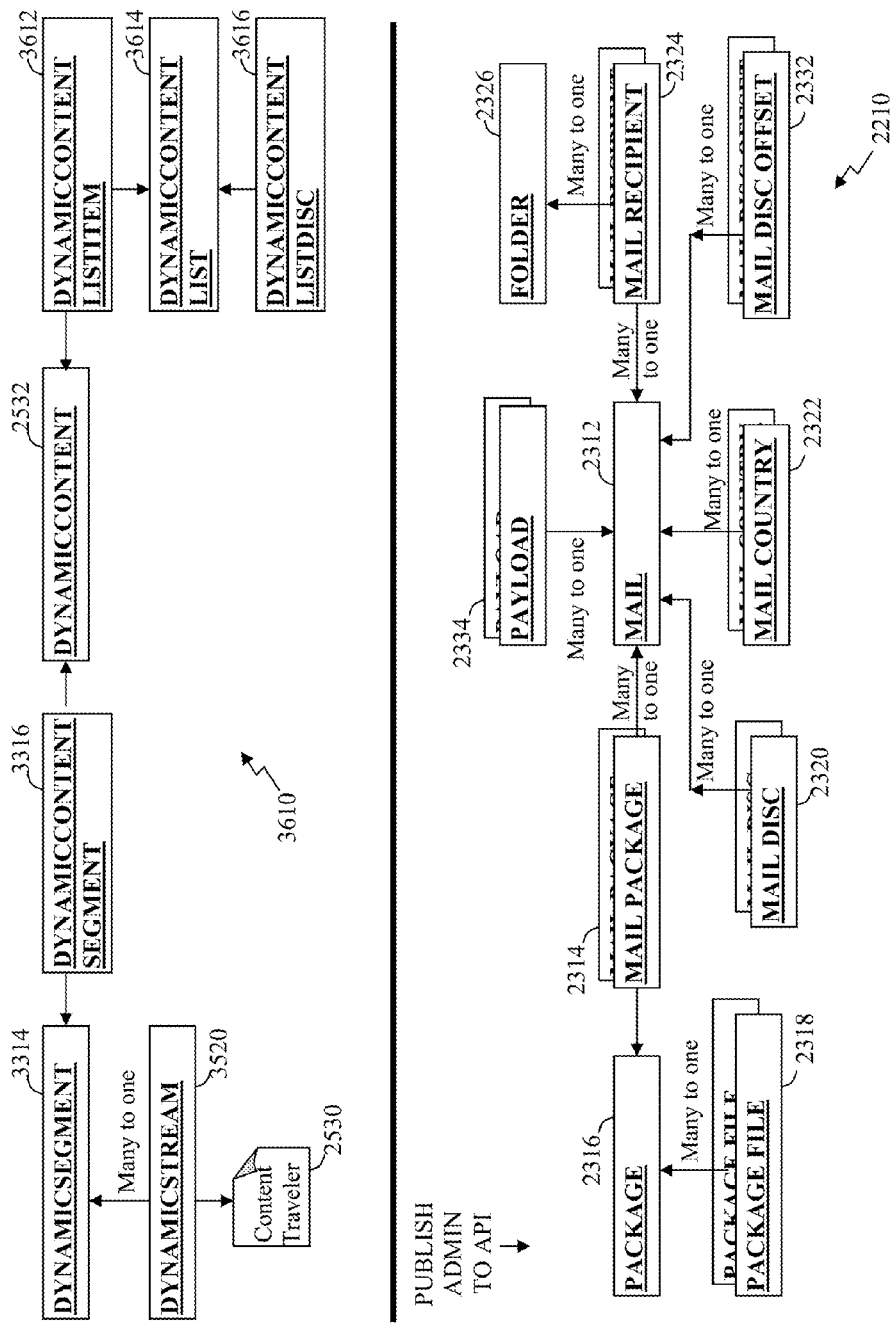
FIG. 37 shows a simplified graphical representation of an association between the content database scheme and the mail messaging database scheme of FIG. 22.

FIG. 37 shows a simplified graphical representation of an association between the content database scheme 3610 and the mail messaging database scheme 2210. Again, the content database scheme includes one or more dynamic content records 2532 associated with one or more DynamicSegment records 3314 through the DynamicContentSegment table 3316, with one or more DynamicStream representations 3520 associated with a DynamicSegment record 3314, and a dynamic content list item record 3612 associated with the dynamic content record 2532 and a dynamic content list record 3614, and with the dynamic content list associated with the dynamic content list disc record 3616. Further, the mail messaging database scheme 2210 includes the mail table 2212, a mail package table 2214, a package table 2216, a package file table 2218, a mail disc table 2220, a mail country table 2222, a mail recipient table 2224, a folder table 2226, a mail disc offset table 2232, a payload table 2234 and other such relevant tables.

In general, the mail table structure 2212 organizes message or mail records, for example, organizes message records by portable storage medium identification or content identification, and by mail folder 2226. For each mail record, "attachments" can be added in the form of Package records 2216. Rules can be assigned to each mail record 2212 to affect the accessibility and/or visibility of the record to requests for content (e.g., "get" or "GetNext" requests).

With the relationship between the content database scheme 3610 and the mail messaging database scheme 2210 some embodiments expand the dynamic content record 2532 set on a content by content (or portable storage medium by portable storage medium) basis and create associated mail records 2212 and packages 2216. This expansion, in some embodiments, initially expands the dynamic segment record 3314/the dynamic content record 3316/dynamic content list record 3614 structure by: identifying each associated dynamic content list record 3614; for each dynamic content list record 3614 identifying each associated portable storage medium identification; for each associated portable storage medium identification identifying each associated dynamic content record 2532; for each dynamic content record 2532 identifying each dynamic segment record 3314; and for each dynamic segment record 3314 creating an internal segment object that contains a list of corresponding content streams. In some embodiments, the created one or more internal segment objects preserve a combined display sequence of the dynamic segment, dynamic content, and dynamic content list; mark segments that begin a presentation sequence for a given dynamic content record 2532, which can preserve a content hierarchy (e.g., when implementing skip back, forward and/ or other such operations); set associated rules inherited from the dynamic content record 2532 relative to the created internal segment; and set a portable storage medium identification associated with the dynamic content list record 3614.

Further, for each internal segment a reference can be defined to a corresponding dynamic stream record 3620, and when not already created, an internal package object can be created from the dynamic stream record 3520 and the content traveler record 2530. For each internal package object corresponding package records 2216 and package file records 2218 are build. Additionally, for each internal segment object: a mail record 2212 and mail recipient record 2224 are created, and the correct package record 2216 is associated with the internal segment object for each stream listed by the internal segment object using the mail package table 2214, while the resolution and rate for each associated mail package 2214 is set relative to the dynamic stream record 3520; rules relative to the internal segment package are set; and a display sequence specified in the mail recipient record 2224 is set according to an internal segment object display sequence.

In some embodiments, the expansion of the dynamic segment record/dynamic content record/dynamic content list record structure can further include converting user playback control options ("UserOps") of the dynamic content list record 3614 and added to the policy configuration tables for the associated portable storage medium as described further below. Table 2 below provides an example representation of the expansion according to some embodiments:

TABLE 2

Expansion of the Segment/Content/List Structure

Expand the Segment/Content/List structure as follows
    For each DynamicContentList
        For each associated portable storage medium
            For each DynamicContent
                For each DynamicSegment
                      Create an internal segment object which contains
                      a list of streams.
                          Preserve the combined display sequence of
                          Segment/Content/List.
                          Mark segments that begin the presentation
                          sequence for any given DynamicContent
                          record (may preserve the content hierarchy
                          for skip back and forward operations)
                          Set associated rules inherited from the
                          DynamicContent record.
                          Set the portable storage medium ID from the
                          DynamicContentList.
    For each internal segment
        Reference DynamicStream
        If not already created, create an internal package object from the
        Stream and Content Traveler.
    For each internal package object
        Build Package/PackageFile records
    For each internal segment object
        Build Mail/MailRecipient record and associate the correct
        Package record with it for each stream listed by the internal
        segment object using the MailPackage table. Set the resolution
        and rate for each associated MailPackage (DynamicStream)
        Set the rules.
        Set the MailRecipient Display Sequence according to the internal
        segment object display sequence.
UserOps in the DynamicContentList record is then converted and added to
the policy configuration tables for the associated portable storage medium
(see later)

As described above, the feed flattening simplifies the identification of a content stream and can reduce delays at the playback device in accessing content streams. with the records or tables of the mail messaging datatable scheme 2210 populated, the playback device can utilize the Mail API to access content in an explicit fashion. In some implementations, a GetMessages (folder) and GetMessage( ) commands can be implemented. The order of the messages can be sequenced according to the display sequence field specified in the mail recipient record 2224. Some embodiments in determining the sequence can further take into account additional factors, such as viewing history, speed of access, potential delays, user profiles and/or other factors. The process of feed flattening can pre-calculate rules that can be determined and can store the results in a separate set of feed tables with minimal FK relationships, with content references being stored in the stream and guide files.

Figure 38:
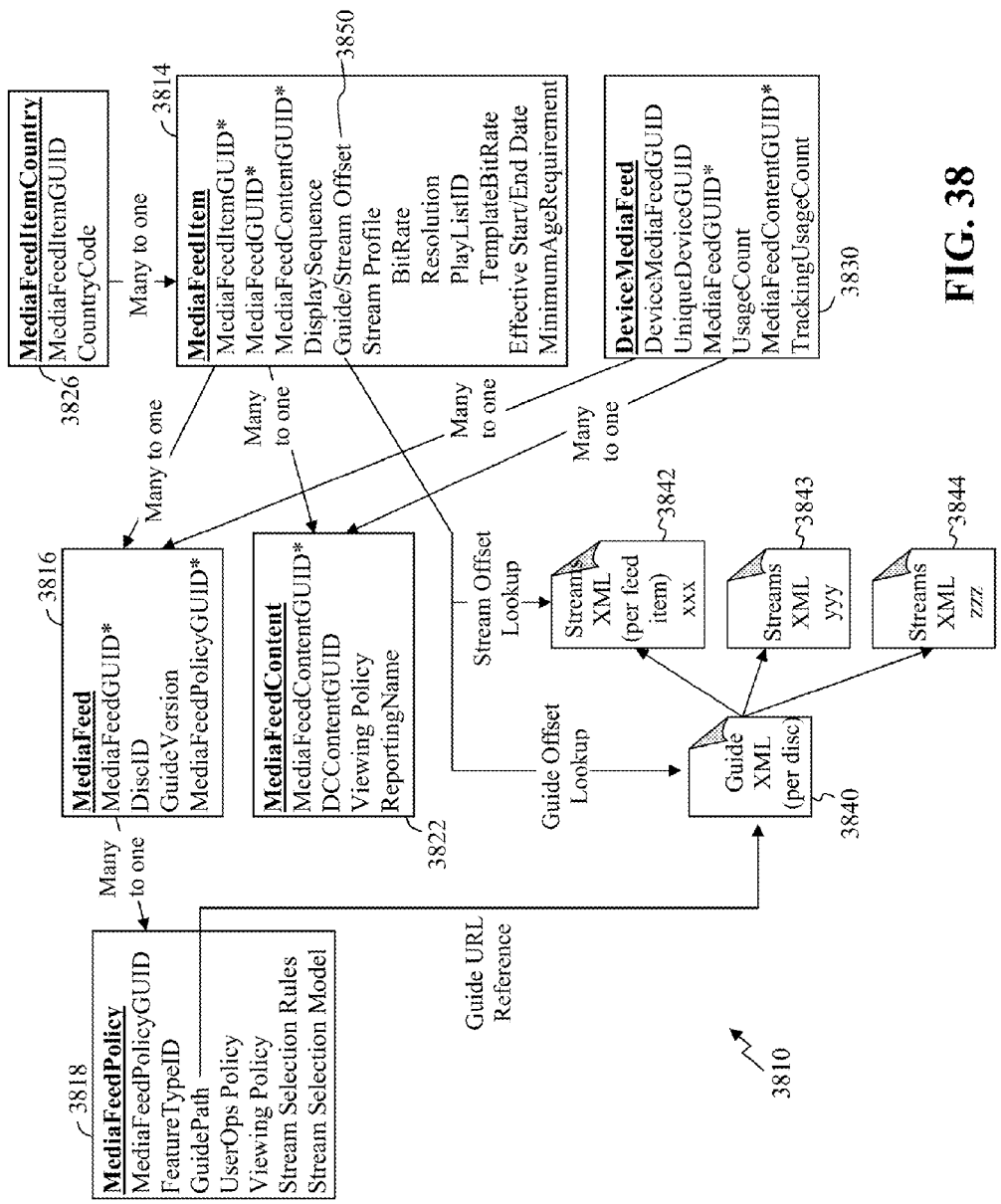
FIG. 38 depicts a simplified block representation of a feed arrangement according to some embodiments.

FIG. 38 depicts a simplified block representation of a feed arrangement 3810 according to some embodiments. The feed arrangement associates each media feed item record 3814 (MediaFeedItem) with a defined content stream, where each stream has a stream profile (e.g., rate, resolution, and other such stream profile parameters) and can be selected on the basis, for example, of presentation order, portable storage medium 122, profile and the like. A MediaFeed table 3816 represents a feed associated with a given portable storage medium 3816 and content (e.g., feature, pre-roll content, trailer, etc.) associated with the portable storage medium. The MediaFeedItem records 3814 associated with a feed have a reference to the feed. A MediaFeedPolicy record 3818 can be associated with one or more of the MediaFeedItem records 3814, with the MediaFeedPolicy record including a UserOps policy, viewing policy, stream selection rules, and other such policies, settings and/or rules. In some instances, a single MediaFeedPolicy record 3818 can be associated with a single entity (e.g., a content owner, a movie studio, a distribution company or other such entity). The userOps, at least in part, define parameters that dictate how a playback device is to react to user commands and/or whether and which user commands can be utilized by users relative to one or more content streams and/or the portable storage medium, such as whether a user can skip content, whether a user can fast-forward, repeat and/or otherwise control playback, and other such controls.

A single content (e.g., a pre-roll content, a trailer or the like), which is represented by a DynamicContent record 2532, can be made of multiple segments. Further, each MediaFeedItem record 3814, in some implementations, represents and/or provides a presentation time of a segment, and as such, there may be more than one MediaFeedItem record for a single content (e.g., a single trailer). To simplify content level (e.g., trailer) tracking, MediaFeedItem records 3814 are grouped by MediaFeedContent records in a MediaFeedContent table 3822. The MediaFeedContent table 3822 also contains viewing policy or policies that can override the MediaFeedPolicy record 3818 if desired on a content by content basis (e.g., trailer by trailer basis).

A given MediaFeedItem record 3814 may be viewable. The viewability of a MediaFeedItem record 3814 may, however, be limited to certain countries or regions. A MediaFeedItemCountry table 3826 associated with a MediaFeedItem record 3814 provides the country or region viewing constraints. Further, a DeviceMediaFeed table 3830 can also be associated with a MediaFeedItem record 3814 to allow the tracking of at least some viewing history of a content stream associated with the MediaFeedItem record 3814. For example, the DeviceMediaFeed table 3830 can count MediaFeedContent views, and in some instance skips, fast-forwards and other such tracking.

The MediaFeedItem record 3814 is associated with at least one guide file 3840, in some instances through the MediaFeedPolicy record 3818, with the guide file 3840 being associated with one or more stream files 3842-3844. Information about the actual stream files are contained in the combination of the guide file 3840 and the referenced one or more streams files 3842-3844. In some embodiments, the information is relatively static in that it does not change in response to rule and/or policy changes or content availability changes. The guide file 3840 acts as an index of streams and each stream file 3842-3844 contains the possible profiles for the stream along with defining access (e.g., a path, link, URL, or the like) to underlying chunk files and associated meta data to enable playback. As described above, in some instances content may already be locally stored at the playback device 124. For example, the content referenced in a stream file may have been pre-fetched. When storing content, such as pre-fetched content, the API and/or playback device may implement a naming convention that allows the playback device to identify that content referenced in a stream file has already been locally stored. For example, when storing content into local storage the content can be named so there is some relationship between the guide and/or stream files entries and the local storage. A unique naming scheme (e.g., hash of a URL) can be used where the name can be stored and used on a look up basis. In other instances, the guide and/or stream files can be used with an initial evaluation of local content to determine whether the content is local before accessing a remote source, which could include a mapping in the local storage for the content (e.g., based on the URL, such as hash of URL for name of folder or document).

Typically, the guide file 3840 is designed to be loaded by the playback device 124 at a start of the pre-roll application and cached for fast access. Below is a simplified example of a guide file 3840 according to some embodiments:

```
<?xml version="1.0" encoding="utf-8"?>
<mfeed id="970a5128-ccf0-4255-8671-e8f03ca185a3" type="Pre-roll">
    <guide version="1015">
        <resourceFile type="ModuleXml"
uri="http://www.studio.com/Path/guid1_stream.xml"
fileSizeInBytes="8503" localStorage="" guideOffset="1">
        </resourceFile>
        <resourceFile type="ModuleXml"
uri="http://www.studio.com/Path/guid2_stream.xml"
fileSizeInBytes="7998" localStorage="" guideOffset="2">
        </resourceFile>
    </guide>
</mfeed>
```

A guide offset, of guide and/or stream offset parameters 3850, defined or stored in the MediaFeedItem record 3814 can be used to look up the guide entry by matching the guideOffset attribute in the guide file 3840. A "guide version" attribute (e.g., "<guide version="1015">" in the example above) is linked to a GuideVersion column in the MediaFeed table 3816 to provide consistency between the MediaFeed tables and the guide files.

The following is a simplified partial example of a streams file according to some embodiments.

```
<?xml version="1.0" encoding="utf-8"?>
<mfeed id="970a5128-ccf0-4255-8671-e8f03ca185a3" type="Pre-roll">
    <guide version="1015" guideOffset="0">
    </guide>
    <disc>00001111-1111-1111-1111-111111111111</disc>
    <streams videoTimeDuration="35.2435416666667">
        <stream offset="1" playList="1928" resolution="Res480i">
            <resourceFile order="0" type="PaddingMap"
uri="http://www.studio.com/Path/Stream1P1/96000.xml" fileSizeInBytes="1378"
localStorage="p/96000.xml" fileSizeInBytesFull="0" />
            <resourceFile order="0" type="AudioVideoProgressive"
startTimeCode="0" videoTimeDuration="0" playPosition="Quadrant0" clipi="96000"
uri="http://www.studio.com/Path/Stream1P1/96000.mts"
fileSizeInBytes="1149312" localStorage="p/96000.mts" fileSizeInBytesFull="2727936" />
            <resourceFile order="1" type="PaddingMap"
uri="http://www.studio.com/Path/Stream1P1/96001.xml" fileSizeInBytes="1287"
localStorage="p/96001.xml" fileSizeInBytesFull="0" />
            <resourceFile order="1" type="AudioVideoProgressive"
startTimeCode="0" videoTimeDuration="0" playPosition="Quadrant0" clipi="96001"
uri="http://www.studio.com/Path/Stream1P1/96001.mts" fileSizeInBytes="1526208"
localStorage="p/96001.mts" fileSizeInBytesFull="2727936" />
            <resourceFile order="2" type="PaddingMap"
uri="http://www.studio.com/Path/Stream1P1/96002.xml" fileSizeInBytes="1495"
localStorage="p/96002.xml" fileSizeInBytesFull="0" />
            <resourceFile order="2" type="AudioVideoProgressive" startTimeCode="0"
videoTimeDuration="0" playPosition="Quadrant0" clipi="96002"
uri="http://www.studio.com/Path/Stream1P1/96002.xml" fileSizeInBytes="1240128"
localStorage="p/96002.mts" fileSizeInBytesFull="2727936" />
            <resourceFile order="3" type="PaddingMap" . . .
            <resourceFile order="3" type="AudioVideoProgressive" . . .
            <resourceFile order="4" type="PaddingMap" . . .
            <resourceFile order="4" type="AudioVideoProgressive" . . .
            <resourceFile order="5" type="PaddingMap" . . .
            <resourceFile order="5" type="AudioVideoProgressive" . . .
        </stream>
        <stream offset="2" playList="1929" resolution="Res720p">
            <resourceFile order="30" type="PaddingMap"
uri="http://www.studio.com/Path/Stream1P2/96030.xml" fileSizeInBytes="1948"
localStorage="p/96030.xml" fileSizeInBytesFull="0" />
            <resourceFile order="30" type="AudioVideoProgressive" startTimeCode="0"
videoTimeDuration="0" playPosition="Quadrant0" clipi="96030"
uri="http://www.studio.com/Path/Stream1P2/96030.mts" fileSizeInBytes="1542528"
localStorage="p/96030.mts" fileSizeInBytesFull="3692544" />
            <resourceFile order="31" type="PaddingMap"
uri="http://www.studio.com/Path/Stream1P2/96031.xml" fileSizeInBytes="1717"
localStorage="p/96031.xml" fileSizeInBytesFull="0" />
```

```
        <resourceFile order="31" type="AudioVideoProgressive" startTimeCode="0"
videoTimeDuration="0" playPosition="Quadrant0" clipi="96031"
uri="http://www.studio.com/Path/Stream1P2/96031.mts" fileSizeInBytes="2068224"
localStorage="p/96031.mts" fileSizeInBytesFull="3692544" />
        <resourceFile order="32" type="PaddingMap" . . .
        <resourceFile order="32" type="AudioVideoProgressive" . . .
        <resourceFile order="33" type="PaddingMap" . . .
        <resourceFile order="33" type="AudioVideoProgressive" . . .
        <resourceFile order="34" type="PaddingMap" . . .
        <resourceFile order="34" type="AudioVideoProgressive" . . .
        <resourceFile order="35" type="PaddingMap" . . .
        <resourceFile order="35" type="AudioVideoProgressive" . . .
    </stream>
  </streams>
</mfeed>
```

Each stream tag within a stream file 3842-3844 contains attributes about a corresponding stream (e.g., resolution (e.g., "resolution="Res720p""), a template playlist ID (e.g., "playList="1928""), duration and/or other such attributes). The stream file further includes a list of one or more resources and when relevant padding files (utilized for playback device side padding as described above), which make up the stream. In some instances, a stream offset 3850 defined in the MediaFeedItem record 3814 can be used to identify or look up a stream entry by matching a streamOffset attribute in a corresponding stream file (e.g., stream file 3842).

As described above, the process of flattening can be a continuous and periodic process. As rule results change a MediaFeedItem record 3814 can be updated, which can include adding or deleting items from the record. Some embodiments utilize a feed flattening application or service (e.g., Feed Flattening Service (FFS)), which can be implemented by, for example, a content owner or production entity. The flattening service can be implemented on an application server that performs the flattening, which can, in some instances, be based on a MailType defined in a mail record or table 2212. The flattening at least in part establishes an association and/or relationship between the messaging or mail database schema 2210 and the feed arrangement 3810.

In some embodiments, the playback device 124 accesses pre-roll content through an API (e.g., MediaFeedAPI). The API minimizes the decision making on the playback device in terms of selecting content to be played back and which stream profile to use. The API can communicate with one or more remote sources 130 to allow the remote sources to determine appropriate parameters, select relevant content based on the parameters and provide information the playback device 124 to allow the playback device to retrieve relevant content, which may already be local or may be obtained from a remote source.

Figure 39:
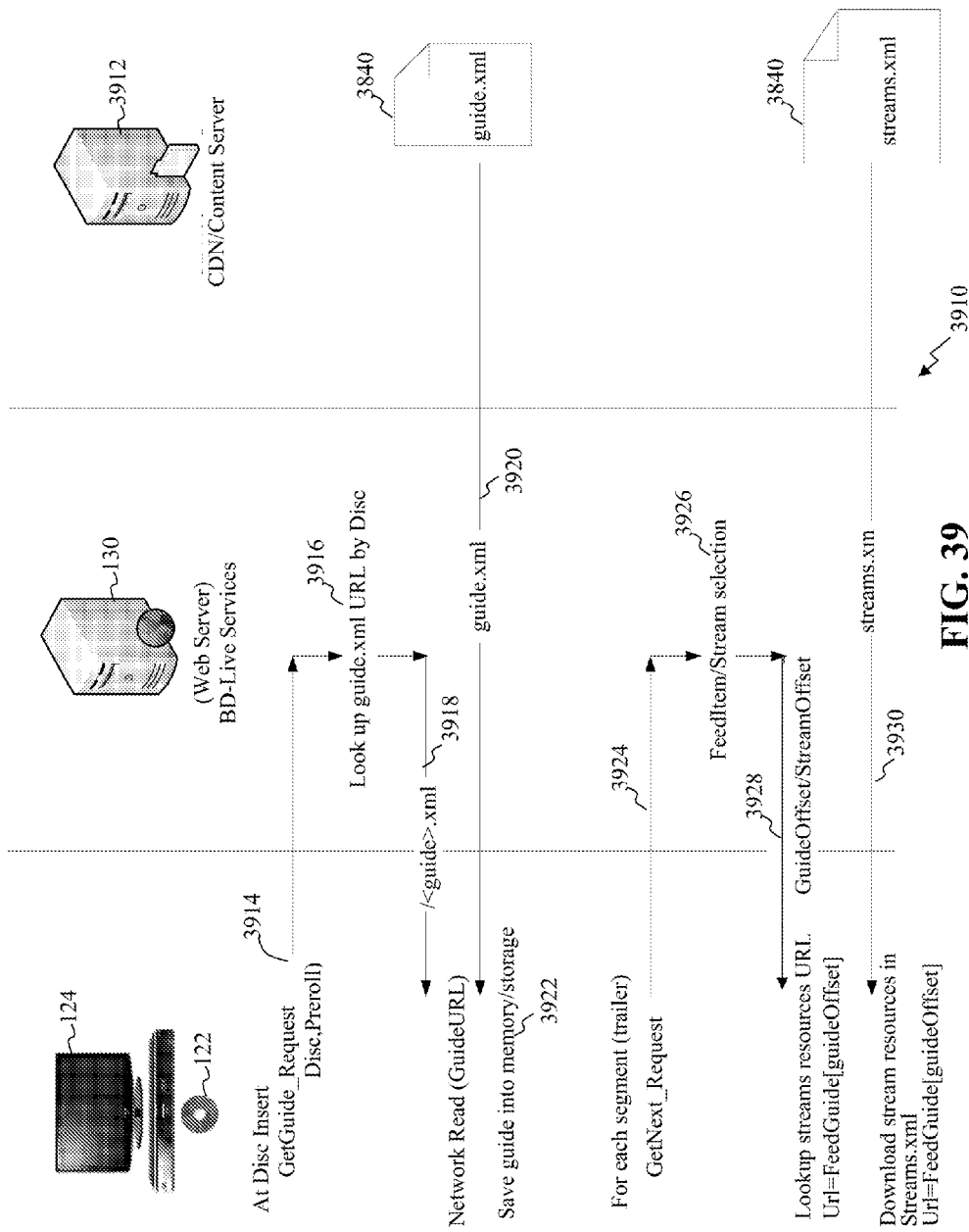
FIG. 39 depicts a simplified exemplary representation of a process of content selection according to some embodiments.

FIG. 39 depicts a simplified exemplary representation of a process 3910 of content selection according to some embodiments. A playback device 124 accessing a portable storage medium 122 or other content can further access one or more remote sources 130, 3912 to identify and retrieve content. Initially, once the pre-roll application is active at the playback device, a request 3914 is communicated to a remote service 130 (e.g., a BD-Live service or other relevant server). This request can include an identification of the portable storage medium 122, in some instances a content type (e.g., pre-roll), and other relevant information (e.g., playback device metrics, playback identification and the like). In some embodiments, request includes a request for the guide file 3840, or a link, path, URL or the like to the guide file 3840 associated with the identified portable storage medium and/or content type (e.g., GetGuide_Request(Disc,Preroll)).

The remote service 130, in response to receiving the request, employs the MediaFeed API and looks up in step 3916 the MediaFeed 3816 corresponding the identified portable storage medium and identifies an appropriate guide file 3840 or a path, link or URL to an appropriate guide file (e.g., as identified in the MediaFeedPolicy record 3818). In step 3918, the guide file, link, path, URL or the like is forwarded to the playback device 124. In step 3920, the playback device retrieves the guide file 3840 from the same service 130 or a secondary source or service 3912, when the guide file is not supplied in response to the request in step 3914. In step 3922, the playback device stores the guide file (e.g., caches the guide file) in local memory 226.

The playback device 124 then issues a request in step 3924 to the remote source or service 130 (or another source) for content based on parameters relevant to obtaining the content and playing back the content. In some embodiments, the playback device implements a MediaFeedAPI "GetNext" forwarding to the remote service network performance information (when known), playback device performance information, and/or other such information. A playback device identification can also be provided in some instances (e.g., a unique ID for the playback device). In step 3926, the remote service 130 determines and selects which content should be provided based on the previously identified guide file, and the relevant parameters. Some embodiments further take into consideration other factors, such as but not limited to what content was already viewed, user preferences, user profile information, account information and other relevant information. For example, some embodiments utilize a listing or "bucket" that identifies the streams of content that are available and may also identify those that have been played back. Further, the listing or bucket may define a playback rotation of content. When a listing or bucket is utilized the selection of the content can be based on the sequencing defined in the bucket and stored in the MediaFeedItem table, a viewing history for the playback device (e.g., based on a unique ID of the playback device stored in the DeviceMediaFeed record or table 3830) and/or an identification of a user (when known).

The stream selection often takes into consideration the stream profiles, e.g., the resolution, bit rate and/or other such metrics and/or statistics. Alternatively or additionally, playback device performance metric can be taken into account in selecting a content stream. An appropriate stream can be selected based on a heuristic model parameterized by information, which can include information stored in the MediaFeedPolicy table 3818. The performance metric can be constructed from a combination of connection speed monitoring to determine network read performance and local storage (e.g., BUDA) write performance and/or other such metrics. The read performance can set an upper bound on a stream bit rate and the write performance can set an upper bound on the template bit rate, which in some instances is an effective rate after null packets are reinserted at the playback device. As described above, some embodiments allow adaptive switching between streams. In many implementations, the finest grained switching point is at a chunk level. For example, switching at chunk levels may be relevant when changes are limited to when the rate of the stream has changed. Other implementations, however, may implement switching decisions at a segment by segment level or other relevant level.

In step 3928, an identification of the content is returned to the playback device 124. In some instances, this identification can be or can include offset information, such as the guide offset and stream offset 3850. In step 3930, the playback device 124 then uses these offsets to locate and acquire the actual stream to be played back. In acquiring content streams, the playback device can implement a stream acquisition API or combinations of APIs that allow the playback device to obtain the guide file 3840 and one or more stream files 3842 and use those files in obtaining the content streams to be played back. As described above, the stream files can direct the playback device 124 to a remote source to acquire the content, can direct the playback device to content already locally stored and/or can direct the playback device to content recorded on the portable storage medium.

Figure 40A:
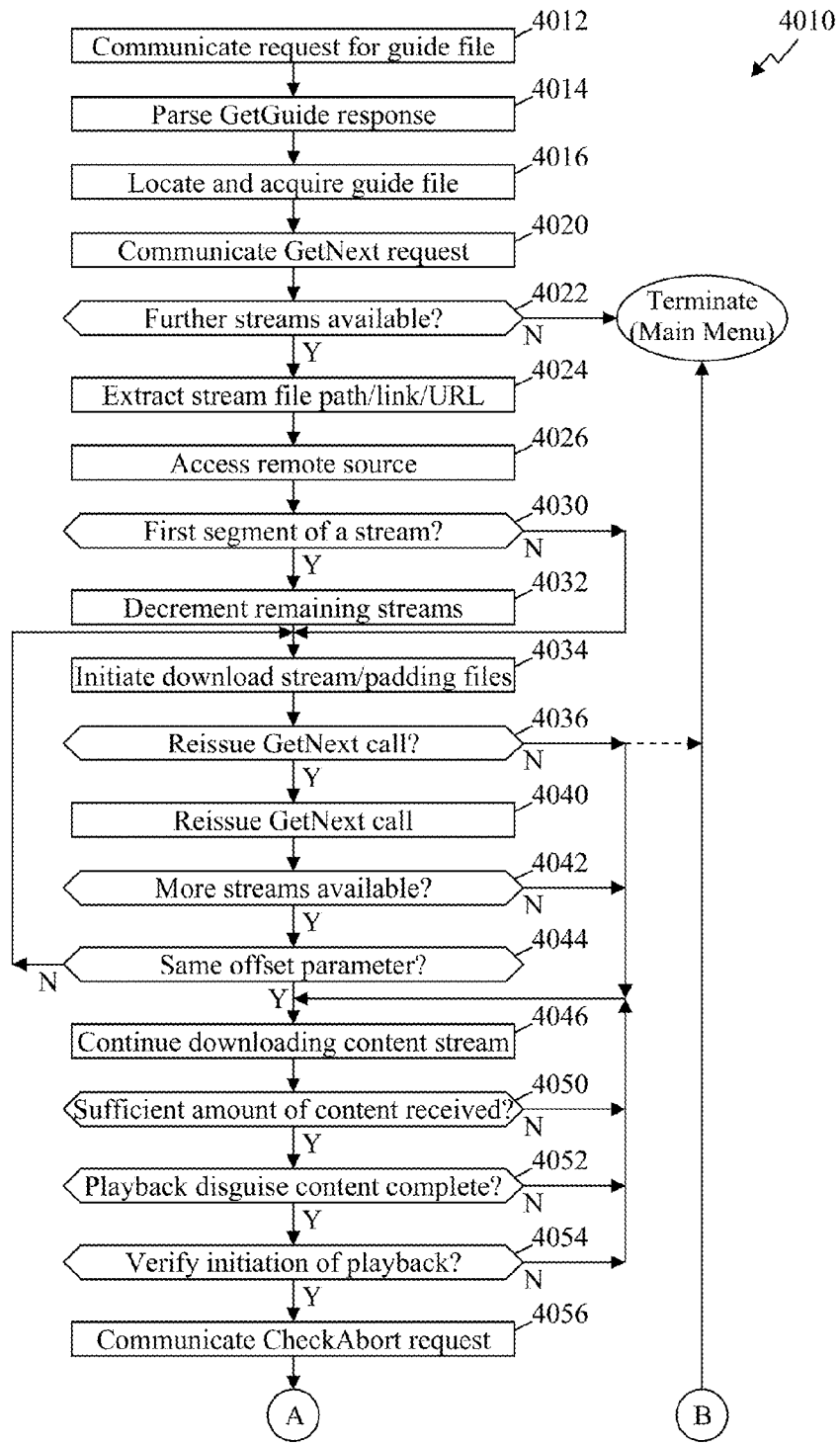
FIGS. 40A-B depict a simplified flow diagram of a process of obtaining content, such as a pre-roll content, in accordance with some embodiments.
Figure 40B:
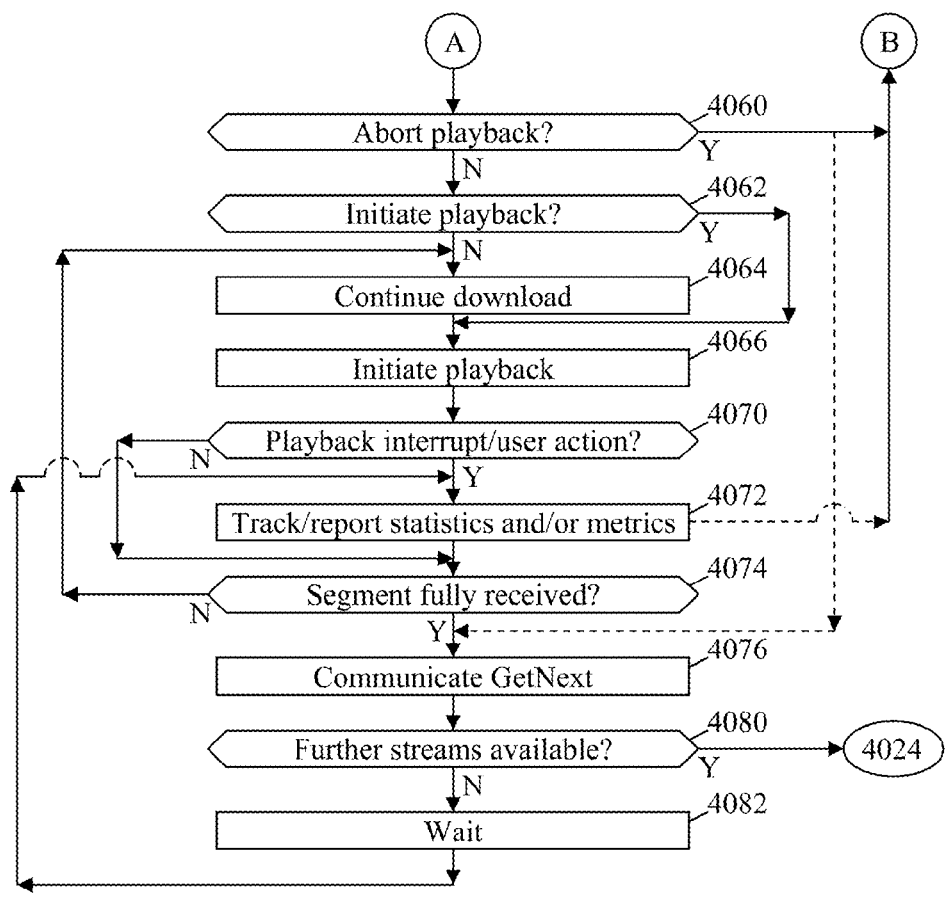

FIGS. 40A-B depict a simplified flow diagram of a process 4010 of obtaining content, such as a pre-roll content, in accordance with some embodiments. Initially, in step 4012, a request is issued to a remote source 130 for a guide file 3840. In some instances, this request is initiated through a "GetGuide" request, which often is activated in response to detecting an initial access to the portable storage medium 122 (e.g., as one of the first calls after disc insertion in a start-up application or other application, such as a pre-roll application, activated following the start-up). The GetGuide request typically identifies a feed type (e.g., feed.type="Pre-roll"). Other information may, in some instances, also be included, such as an identification of the portable storage medium 122, an identification of the playback device and/or other relevant information.

In step 4014, a response to the GetGuide request is received and parsed. The GetGuide response contains the file path of the guide file 3840, and typically includes some additional information and/or values that can be used for subsequent calls (e.g., a feed identification, a guide version and/or other such information). In some instances the GetGuide response can include one or more of: a content view count (contentViewCount or prerollViewCount) that can initialize a number of remaining contents to play back; a maximum number of rebuffering events (maxRebufferEvents) identifying how many rebuffering events are allowed; a maximum rebuffering duration (maxRebufferDuration) identifying how long rebuffering periods should be; user options parameter or policy (userOps) to determine whether the user can skip content; and/or other such information. In step 4016, the guide file is located and acquired (e.g., through downloading from a remote source 130, 3912). For example, the playback device uses a guide.resourceFile.uri defined in the GetGuide response to locate and load the guide file 3840.

In step 4020, a request for the content stream is transmitted to a remote source 130. In some implementations, a GetNext request is issued to the remote source. This GetNext request typically includes identifiers and/or parameters that allow the remote source to identify a relevant content stream. For example, the GetNext request can include one or more of: feed.id=value from GetGuide response; feed.type="Pre-roll"; feed.resolution="480i"; feed.streamReturned="false"; feed.skip="false"; metrics.readRate=network read rate (e.g., in bytes/sec, or 0 if not available); metrics.writeRate=storage write rate (e.g., in bytes/sec, or 0 if not available); guide.version=value from GetGuide response; guide.guideOffset=0; guide.streamOffset=0; guide.resend=false; and/or other such information. In some embodiments, when metric data (such as metrics.readRate, metrics.writeRate or other such metrics) in the GetNext request is not included, is null or is zero, the response typically returns a lowest stream number, a stream with the lowest resolution and/or stream with the smallest data size available. Further, the playback device 124 and/or the remote source 130 may save the metrics information in local storage so that it can be used with subsequent GetNext requests, subsequent requests and other portable storage mediums. For example, a subsequent GetNext request can indentify a previous or current resolution and other such metrics, which can be used by the remote source (e.g., to determine whether to change to a different resolution or other such decisions).

In step 4022, the GetNext response is received from the remote source and parsed to determine whether further streams are available from one or more remote sources for the identified portable storage medium 122, the playback device 124 and/or user. In some instances a guide.guideOffset parameter in the response can designate whether further streams are available (e.g., guide.guideOffset=0, then no relevant streams are available). In those instances where no streams are available the process 4010 terminates, and typically jumps to a main menu or a designated entry in a playlist, such as to the main menu, content on the portable storage medium (e.g., trailer, logo or the like), or other relevant content on the portable storage medium. In those instances where further streams are available, step 4024 is entered to extract a path, link, URL or the like to one or more stream files 3842 (e.g., using guide.guideOffset to get a path of the streams XML file from the guide XML file). In step 4026, a remote source is accessed and one or more appropriate stream files are loaded. The guide.streamOffset can further be used to get resource information for the stream files and padding map files.

In step 4030, it is determined whether a segment to be downloaded is a first segment of a stream. As described above, a content can be made up of multiple segments, where in some embodiments each GetNext call returning information about one segment at a time. The first segment in each content can be marked, for example with feed.startOfContent=true, in the GetNext response. When it is determined in step 4030 that a segment is not a first segment of a content the process advances to 4034. In those instances where the GetNext response indicates that a segment is a first segment of a content (e.g., each time feed.startOfContent=true), step 4032 is entered where the number of remaining content or streams to be retrieved and/or played back is decremented.

In step 4034, downloading of the relevant stream files and padding map files is initiated. Some embodiment provide for a retransmission of a GetNext call when an initial GetNext call was made with no metrics data (or possibly old metrics data) or changes in metrics may have occurred. For example, the playback device may call a GetNext again after downloading a portion of the content or stream (e.g., after downloading a first chunk) As such, in some implementations optional step 4036 determines whether to reissue a GetNext call. In those instances where a reissued GetNext call is not to be implemented the process advances to step 4046. Alternatively, when a reissued GetNext call is to be implemented step 4040 is entered where a reissue GetNext call is communicated. In some implementations the reissue can identify the GetNext call as a repeat or reissue GetNext call, for example, by setting a guide.resend parameter to a true value, which can request that the remote source reevaluate the current segment instead of moving to a subsequent segment. For example, the reissue GetNext request to reevaluate stream offset can specify: feed.id=value from GetGuide response; feed.type="Pre-roll"; feed.resolution=value of stream.resolution from streams XML file; feed.streamReturned="false"; feed.skip="false"; metrics.readRate=updated network read rate (e.g., in bytes/sec); metrics.writeRate=updated storage write rate (e.g., in bytes/sec); guide.version=value from GetGuide response; guide.guideOffset=value from previous GetNext response; guide.streamOffset=value from previous GetNext response; guide.resend=true; and/or other such parameters, variables and the like.

In step 4042, a GetNext response is received in response to the reissued GetNext call and is parsed to determine whether one or more streams are available from one or more remote sources for a current performance level (e.g., resolution, bit rate, etc.). For example, the guide.guideOffset parameter in the response can designate whether streams are available (e.g., guide.guideOffset=0, then no streams are available). In those instances where no streams are available the process 4010 continues with the previously received segment in step 4046, or in some instances may optionally terminate and can jump to a main menu or a designated entry in a playlist. In those instances where further streams or streams that meet alternate metrics are available, step 4044 is entered to determine whether the guide.streamOffset parameter in the response to the reissue GetNext call is same value as the previous GetNext response. In those instances where the value is not the same the process 4010 returns to step 4034 to start the download of files for the new stream specified in the reissue GetNext response. Alternatively, when the value is the same, and thus the content segment is the same, the process continues to step 4046 to continue downloading a current content stream.

In step 4050, it is determined whether sufficient pre-roll content is received to initiate playback. In those instances where further pre-roll content is to be received before playback begins the process returns to step 4046 to continue downloading. In step 4052, to determine whether the playback of disguise content is complete. As described above, the disguise content masks or disguises the acquisition of the pre-roll content. In some instances, however, it may be specified that once a disguise content is initiated it should be played back for a minimum duration, played back to at least a certain point in the disguise content, played back through at least a certain percentage of the disguise content or otherwise at least temporarily prevent interruption of playback. When playback of the disguise content is complete the process continues to step 4054. In those instances where a current disguise content has not completed playback (e.g., a logo is to be displayed for at least a predefined period of time; trailer that is locally stored and being played back as disguise content has not fully played back; or the like), the process returns to 4046 to continue downloading when local storage space is available.

Some embodiments include optional step 4054, where it can be determined whether to verify that playback of the pre-roll content is to begin. For example, just before playback of the first pre-roll segment, the playback device may be instructed to contact a remote source 130 to request a confirmation before initiating playback. The process continues to step 4062 when a confirmation request it not to be communicated. Step 4056 is entered when confirmation is to be requested and a CheckAbort request is issued to the remote source 130 to determine whether playback should start. For example, the CheckAbort can include: feed.id=value from GetGuide response; feed.type="Pre-roll"; metrics.readRate=updated network read rate (e.g., in bytes/sec); metrics.writeRate=updated storage write rate (e.g., in bytes/sec); metrics.bytesRead=the number of bytes read so far; metrics.remainingSecs=the number of seconds remaining before the end of playback (when the called is just before playback begins, this will be the duration of the stream, which may be from the streams XML file); guide.version=value from GetGuide response; guide.guideOffset=value from previous GetNext response; guide.streamOffset=value from previous GetNext response; and/or other such parameters.

In step 4060, a response to the CheckAbort request is received and parsed to determine whether to abort playback of the pre-roll content. In those instances where the response instructs to abort playback of the pre-roll content (e.g., result.abort=true) the process terminates and activates the main menu or advances to another portion of the content (e.g., as defined on a playlist), or optionally may advances to step 4076 to request subsequent content (e.g., a GetNext request) to determine whether further content may alternatively be played back. When an abort command is not received and playback is to be initiates step 4062 is entered to determine whether to continue to download content, or whether to initiate playback. When playback is to be initiated (e.g., result.bufferSecs=0) the process advances to step 4066 to initiate playback. Alternatively, when instructions to further buffer are specified (e.g., results.bufferSec>0), the process continues to step 4064 where the download is continued for the specified time period (e.g., number of seconds and/or fractions of second), amount of content or the like. As described above, some embodiments may prevent the initiation of playback until a predefined amount of content is available for playback to limit or avoid delays due to a data starve condition.

In step 4066, playback of the pre-roll content is initiates. As described above, the downloading of the pre-roll content stream or a subsequent content stream may continue as playback is implemented. In step 4070, it is determined whether playback is interrupted or a user action is received (e.g., through the playback device or a remote device is communication with the playback device) to halt or alter playback. In some instances, when a user attempts to skip to a subsequent pre-roll content or other content, a value of the userOps from the GetGuide response is checked to see whether such a skipping is allowed; or when a user attempts to skip to a menu or other content on the portable storage medium, the value of the userOps from the GetGuide response is checked to see whether the requested skipping; or determine whether another command is allowed. Other conditions may result in a halt of playback. For example, if playback becomes data starved, a check can be performed to determine whether the number of rebuffering events has been exceeded (e.g., maxRebufferEvents value from the GetGuide response), or other conditions. In those instances where the command is received, not allowed, or conditions allow for playback to continue (e.g., rebuffer for the amount of time specified in maxRebufferDuration and then continue playback), playback is continued and the process 4010 advances to step 4074. Further, in some instances, a notification may be displayed indicated that such commands are not available. Alternatively, when such commands are allowed, the process may advance to optional step 4072 to track statistics and in some instances report statistics about playback (e.g., duration of playback, content played back, where halt occurred, command associated with halt and/or other such statistics).

In step 4074, it is determined whether a segment of content is fully received. In those instances where a segment has not been fully received the process returns to step 4064 to continue to retrieve the content. When a segment has been fully received step 4076 is entered to initiate a subsequent GetNext request to identify a subsequent segment, which may be part of the same content stream as the previous segment, or may be a first segment of a different content. Again, some embodiments identify a first segment of a content, such as using the startOfContent parameter. This can further identify that the previous segment is a last segment of a content stream. Typically, the playback device finishes downloading a segment and stream sometime before playback completes. As such, the GetNext request can be used to identify a last segment, identify a subsequent content stream and first segment, and/or identify that no further content streams are available and/or that no further content streams are relevant to the portable storage medium 122, the playback device 124 and/or user. As described above, the GetNext request can include a number of parameters. In subsequent GetNext requests, such as those issued in step 4076, the request can include, for example: feed.id=value from GetGuide response; feed.type="Pre-roll"; feed.resolution=value of stream.resolution from streams XML file; feed.streamReturned="false"; feed.skip="false" (or in some instances may be "true," for example, when a user skipped from previous pre-roll content); metrics.readRate=updated network read rate (e.g., in bytes/sec); metrics.writeRate=updated storage write rate (e.g., in bytes/sec); guide.version=value from GetGuide response; guide.guideOffset=value from GetNext response; guide.streamOffset=value from previous GetNext response; guide.resend=false; and/or other such parameters. These metrics and/or parameters can be used by the one or more remote sources 130 in selecting a content stream. For example, a remote source may determine whether to select a content stream with a different resolution than a previous content stream in some instances. The feed.resolution notifies the remote source 130 of the resolution of the previous segment. The transition between resolutions, however, may be disruptive (e.g., causing a resynchronization, a flash, or other such disruptions). As such, there may be policy restrictions (e.g., content owner or studio defined policies) that limit when resolution changes can be made. This allows the remote source to take into consideration the prior resolution and policy settings in selecting a stream profile.

In step 4080, the GetNext response is received and parsed to determine whether further streams are available. For example, a guide.guideOffset=0 can indicate that no more streams are available and/or are relevant. Similarly, a feed.startOfContent=true can instruct a check to see whether there are further pre-roll content remaining to be played back (e.g., evaluating a contentViewCount parameter in the GetGuide response). When further streams are not available or relevant, the process continues to step 4082 to wait for playback of the currently playing pre-roll content to complete, and advances to step 4072 to record and/or report statistics before terminating and/or jumping to a main menu and/or other relevant content. Alternatively, when further content is available the process returns to step 4024 to identify an appropriate path, link, URL or the like to one or more stream files 3842.

As described above, some embodiments monitor, track, record and/or report statistics regarding content received, played back, partially played back, commands received by users, interruptions, download parameters or other such parameters or combinations of such parameters. For example, when any part of a pre-roll content has been played back, the playback device 124 can report the playback or partial playback, and in some instances activates one or more statistics applications that collect, store and/or report relevant statistics (e.g., a ReportStats command and corresponding application). Similarly, in some instances during normal playback the statistics application can be called at the end of playback of a segment or pre-roll content. Some embodiments do not necessarily collect and/or report statistics regarding the end of every segment. For example, when a pre-roll content comprises several segments (typically retrieved through several GetNext calls) the statistics application is activated after the last segment in the pre-roll content.

Again, the playback device can, in some instances, determine when a new pre-roll content begins by checking a feed.startOfContent parameter in the GetNext response. The statistics may be of particular relevance when a pre-roll content has begun playback but is skipped by the user, or is aborted by the playback device. Other statistics can be collected and the statistics application can be activated in response to other events, criteria or conditions. The statistics that may be reported to a remote source can include, but are not limited to: feed.id=value from GetGuide response; feed.type="Pre-roll"; metrics.readRate=updated network read rate (e.g., in bytes/sec); metrics.writeRate=updated storage write rate (e.g., in bytes/sec); guide.version=value from GetGuide response; guide.guideOffset=value from GetNext response of stream played; guide.streamOffset=value from GetNext response of stream played; guide.percentViewed=percentage of current segment played, where for example a remote source may account for previously played segments in the current pre-roll content; dataStarvedEventCount=number of times playback was data starved; available storage space; and/or other such statistics. In many cases a response is not returned when statistics are communicated to one or more remote sources 130.

Further, in some embodiments, usage statistics per playback device and/or user, and in some instances aggregated statistics across multiple playback devices and/or users can be collected regarding playback behavior. These statistics can be utilized as factors in playback sequencing and/or the selection of pre-roll content to be distributed. The collection of the statistics may, in some embodiments, be implemented at least in part through an online analytical processing (OLAP) style application where, for example, OLAP hyper cubes along with one or more statistics or fact tables can be used as a data model. The data collected and/or used to determine statistics as well as the resulting statistics can be stored and utilized by one or more remote sources 130, 140 and/or third party entities. This storage can align to an OLAP style application and use one or more statistics tables as the data model. For example, a statistics or fact table could include multiple parameters and/or statistics, such as but not limited to: playback device identification (playerID); Guide/Stream offset (e.g., identifies the MediaFeedItem); read rate (e.g., bytes/second); write rate (e.g., bytes/second); percent viewed; data starved event count; error information in the case of an error; DynamicContentGUID; playback duration; date and/or time; portable storage medium identification (e.g., DiscID); user identification (e.g., UserID); and/or other such information. In some embodiments, network service API (e.g., GenerateGUID) can be used to generate a unique playback device identifier, which may be referred to as a player cookie or cookie ID. The playback device 124 calls this API when it does not already have an identification, e.g., does not have a playerID cached in local storage. The identification API creates a GUID in response to a request for a new ID and the playback device can store the ID in local storage, which in some instances can persist across multiple different portable storage media insertions.

These tables could further be used to aggregate statistics by portable storage medium 122, by user, by playback device, by pre-roll content, answers to specific queries about individual user's and/or playback device viewing history, and other such information. Similar statistics and/or tracking can be performed at one or more remote sources 130 or aggregated as one or more remote sources. For example, a DeviceMediaFeed table 3830 can be used to tracking viewing history for the purposes of controlling pre-roll content distribution and/or rotation. In some instances, the MediaFeedContent usage can be tracked, and further may be tracked for a unique playback device 124. The GetNext call may take the usage count into consideration when selecting which pre-roll content (e.g., trailer) to play next. Additionally, the DeviceMediaFeed table 3830 can be updated by the one or more statistics applications (e.g., ReportStats call).

Further as described above, in some embodiments at least some of the statistics and/or metrics can be used in selecting content, streams and/or segments. These statistics and/or metrics can be further subjected to additional considerations and/or adjusted to provide leeway and/or a margin of error. The playback device 124 issues a call or request to the remote source 130, where the request can include one or more of the statistics or metrics. With this information and an identification of the portable storage medium 122 and/or the playback device the remote source can identify a stream profile to be used in selecting a stream of content. The stream selection can occur regardless of whether the remote source identifies the content or the request, or user specifies the content. A stream profile look up is performed in some implementations based at least in part on network read speed, storage write speed, and available memory space (e.g., BUDA free space). For example, the selection of a stream profile can include: calculating an allowable stream bit rate by multiplying a specified or measured network read speed by a usage or margin factor (e.g., a usage factor of 80%) to allow for network bandwidth variability; calculating an allowable template bit rate by multiplying a specified or measured storage write speed by the same or a different usage factor (e.g., a usage factor of 80%); and/or selecting a bit rate profile that meets the following conditions: a stream bit rate that is less than the calculated allowable stream bit rate, a template bit rate is less than the calculated allowable template bit rate, a predefined number of chunks of the content stream can be stored in the available memory (e.g., first three chunks fit in the available memory free space). The one or more usage factors provide a cushion or margin of flexibility to compensate for variations in conditions. This usage factor may be set according to various factors such as expected variations. Further, the usage factor or a range of usage factors may also be set on a content owner by content owner bases, a studio by studio bases, portable storage medium by portable storage medium basis, or the like.

After one or more segments or content are played back, other constraints may come into play as described above. For example, a studio may not allow resolution changes between segments or contents. In this case, subsequent contents and streams are restricted to profiles with the same resolution. When available profiles do not meet the resolution, bit rate and/or size restrictions, no additional content streams are played back or alternative content may be played back, such as content from the portable storage medium, content locally stored or other content. Again, in some embodiments where the playback device 124 does not yet have a valid network or storage performance measurements, the remote source 130 returns a lowest bit rate stream available in attempts to achieve the best playback experience without interruptions with loading prompts or other factors that may adversely affect the playback experience.

Additionally, as described above, the remote source 130 in processing the request for a subsequent segment or stream (e.g., GetNext request) can take into consideration the content that has already been viewed, for example, based on a playback device identification (e.g., a cookie ID). In selecting a stream the remote source 130 implements a selection model that taking into account the metrics and/or statistics that are passed up. Based on the selection model a stream profile is selected. In some embodiments, as described above, the information returned to the playback device is a pointer, identifier or the like to the profile to be used, and typically not the actual profile itself. This pointer is used with the guide and/or stream files to obtain the information about a give stream and how to access the streams resources. In these embodiments the GetNext response from the remote source includes one or a set of pointers or offsets that the playback device 124 can use to look up the information from the guide and/or stream files. As such, some embodiments reduce or attempt to minimize the amount of data transmitted from the remote source to the playback device, and provide the playback device 124 the opportunity to cache information when beneficial.

In other embodiments, however, a remote source may supply some or all of the pre-roll content in response to the GetNext call. This may increase delays and increase the amount of data communicated. The use of the guide and/or stream files can reduce the amount of data sent between the server and the playback device. Again, the guide file is an index of the streams, which can be obtained as a prequalification on playback device launch that can be cached. The offset or other identifier can be used with the guide file to look up the location of the stream information. Separating the stream file, in some embodiments, provides improved response time because it can generally be quicker to pull down a direct file of a direct source from a content delivery source than to pull down the content from a service style API, such as an API that is running algorithmically, because relatively large numbers of cycles are executed to return the content resulting from accessing a database.

Further, the selecting of pre-roll content and/or specifying content playback sequencing can take into account one or more user profiles, playback device profiles, portable storage medium profiles, content profiles, viewing habits, viewing history, other relevant information or combinations thereof. In some embodiments, the pre-roll content playback sequencing can be implemented through an automated process. The playback device accessible pre-roll content can be in MailDB tables and MailAPI. A default sequencing order can be set through a DynamicContentItem table or record 3020 and Mail Message ordering. A sequencing engine can be incorporated into the mapping system 3010, mapping module 3012, a playback device side API or implemented as a separate element, where the sequencing engine can utilize factors to determine final playback order, such as but not limited to playback device viewing history, aggregate statistics, a default playback order or sequence, and other such factors. Further, the sequencing engine may, in some instances, apply a heuristic method identify a next DynamicContent item 2612 (and hence Message) that should be played back. The sequencing engine may be structured so that new heuristic methods can be added as well as new sources of data to drive the algorithm. For example, the sequencing engine may be incorporated as part of a playback device side API (e.g., a MailAPI).

Some embodiments attempt to implement as much of the processing, synchronizing and policy decisions over pre-roll content at the remote source 130, which may reduce the processing at the playback device 124 and/or code updates at the playback device. Examples of policies include allowing user options and setting. An API and set of database tables may be provided to administer, store and access the policy. In some implementations a store would be generic so that new policy items could be easily added. For example the database tables could include Attribute/Value style DB table, such as:

---

Table: PlayerPolicyAttribute
Columns:

DiscID (null value indicates all discs)
Overrideable (indicates that the player can override locally)
Name (string: policy attribute name, e.g., UserOpsAllowed)
Value (string: type interpreted by following column)
Type (int: defined type enum for bool, int, string, float, etc).

---

Similarly, a playback device side API can be provided to allow for Policy queries by the playback device. Further, some embodiments allow extensible policy rules that can be set in accordance with a user profile (e.g., region, age, gender, history, and other such profile information).

As described above, the playback device 124 may provide an API to, in part, allow the pre-roll content to be acquired. In some implementations this API is implemented as part of a Mail API that allows queries for a "next message" based on current statistics, player history and the like. This can return a message for each stream within the segment. The body of three message can indicate a stream sequence number and additional stream metadata (e.g., rate, resolution, associated playlist, and the like). This information can be pulled from the content traveler record 2530 and/or the pipeline configuration record 2524. Further, the MailAPI can use the sequencing engine, when present, to determine the next message set. In some implementations, a MailType may define at least some of the behavior of the MailAPI.

A statistics API is also provided in some embodiments to collect and/or manage statistics and/or behavior habits. The statistics API may be incorporated with a BD-Live Services API in accordance with the Blu-ray specification. The statistics API can include an internal API and external API. The external API allows the playback device 124 to send up statistics (e.g., Played MessageID (DynamicContent ID) for 20 seconds). The statistics are stored in relation to a user identification, playback device identification, portable storage medium identification, content identification and/or other such identifiers or other relevant information. The internal API provides a data source for the sequencing engine, and provides a Management Console API for pulling aggregated statistics. A storage record or database table can implement an OLAP style hyper cube as describe earlier to collect statistics. A user interface can allow queries to be defined and run on the collected statistics and results displayed and/or stored. In some instances, the queries can be established as automated queries that are implemented based on a schedule or periodically, or can be manually activated.

In identifying pre-roll content to be distributed the statistics can be evaluated (e.g., a statistics table), and in some instances along with a default content sequence. This evaluation can include applying a heuristic algorithm to determine a next message, content and/or segment for playback. In some implementations, the heuristic algorithm in the first iteration will follow a default sequence until enough statistics (e.g., playback device, user and/or other such statistics) have been acquired to identify one or more patterns. The sequencing engine can provide the "Next Message" algorithm for the MailAPI.

A policy API may further be included in some embodiments. Similar to the statistics API, the policy API may be incorporated into a BD-Live Services API, and can have an internal and external API. The external policy API allows the playback device 124 to retrieve a policy attribute by name or other identifier and pass it, along with a portable storage medium identification (and in some instances a user identification when known) to the remote source to retrieve a policy attribute value. The internal policy API provides a Management Console API for setting policies, where a database table will implement an attribute/value schema for flexibility as discussed above. A policy user interface provides for the setting of policy attribute names and values either globally or by portable storage medium.

The ingest, processing, mapping and publishing allow the pre-roll content to be distributed to one or more playback devices 124 to be played back in cooperation with the portable storage medium 122. Further, the pre-roll content can be acquired and played back before main or feature titles of the portable storage medium 122 and in some instances before a main menu of the portable storage medium. Furthermore, some embodiments additionally allow pre-roll content to be received and utilized with, in addition to and/or in place of content intended to be played back from the portable storage medium 122. This can include playing back a pre-roll content in place of a portion of a main or feature title or as an addition to the main title. For example, a pre-roll content can be provided with additional content and this additional content pre-roll content can be played back during the main title and as part of the main title. Similarly, a pre-roll content can be provided that provides a different ending, and this different ending pre-roll content can be played back in place of an ending of the feature title recorded on the portable storage medium 122.

Again, the pre-roll content can be streamed, progressive downloaded, downloaded or otherwise delivered to the playback device to be played back in cooperation with a portable storage medium 122. The playback device 124 can initiate playback of the pre-roll content without user interaction to allow playback of the pre-roll content with minimal delay, in many instances, prior to providing a user with access to a main menu, unless a user initiates an override and the override is not prohibited as described above.

Further, the present embodiments attempt to provide relevant and current pre-roll content. Some embodiments further perform an evaluation to determine relevant pre-roll content to forward to a user and/or playback device. This evaluation can include considering and evaluating priorities of the pre-roll content, viewing history, viewing habits, date, time, expirations, demographics, user preferences, user profile, playback device profile, other relevant variables or combinations thereof. Additionally, some embodiments provide server side policy controls over a playback device, such as but not limited to, user options, download, progressive download, streaming and other such policy control. The pre-roll content can be in a long format or a short format, and in many instances the pre-roll content is conformed in accordance with a clip template and clip information recorded on the portable storage medium or already present at a playback device 124 at the time the pre-roll content is forwarded.

In some embodiments, disguise content is displayed and/or played back while pre-roll content is being acquired. Further, delays are reduced by selecting appropriate content files based on bandwidth, bit rates, video quality, resolution, and/or playback device parameters (e.g., buffer levels). As such, some embodiments attempt to minimize user perceived portable storage medium start up time before the pre-roll content playback begins. Multiple different pre-roll content streams can be available at one or more remote sources 130 and an appropriate stream can be selected to provide a desired playback quality relative to potential delays. The selection of the appropriate stream can be performed at a remote source 130, for example, based on input received from the playback device 124, selected by the playback device 124 based on evaluations of the parameters, or a combination of evaluations at the playback device 124 and requests to the remote source relative to the evaluations to maximize video quality and minimize re-buffering events. The measured bandwidth, bit rates, connection speed, playback device parameters and performance history can be maintained at the playback device 124 and/or one or more remote sources 130 to improve subsequent selection of pre-roll content and the playback experience. The stream selection can be further evaluated and/or updated throughout the delivery of the pre-roll content so that revised selections of streams can be made where appropriate and provide adaptive rate control during content delivery.

By employing the disguise content, the pre-roll content can be obtained effectively through a background downloading while masking the download time using content recorded on the portable storage medium 122 and/or at the playback device 124. Some embodiments maintain the obtained pre-roll content at the playback device 124 so that it is available for playback with later access to the same portable storage medium 122 or a different portable storage medium accessed by the playback device 124.

Additionally, some embodiments identify speculative pre-roll content that can be forwarded to the playback device 124 in anticipation that a playback device will access a predicted portable storage medium, a portable storage medium with content associated with a genre, demographic or other such factors, or other such predictions. As such, the speculative pre-roll content is stored at the playback device 124 and in the event that a portable storage medium 122 is accessed that corresponds to the pre-roll content previously received the playback of the previously received pre-roll can be initiated without waiting for a download. For example, it can be detected that one or more portable storage mediums 122 have been accessed that has children appropriate content from a particular movie studio. As such, it can be predicted that further portable storage mediums with children appropriate content from the particular movie studio is likely to be accessed again in the future, and as such a pre-roll content can be background downloaded to the playback device 124 to be stored at the playback device to be played back at a later time. The acquisition of the speculative pre-roll content would not necessarily have to be performed prior to displaying a main menu or the main title content on the portable storage medium. Instead, the pre-roll content could be obtained during the playback of the main title content, after the playback of the main title content or even as a title unbound application.

Some embodiments initiate a title unbound application that provides for the acquisition of pre-roll content after a playback device no longer has access to a particular portable storage medium 122 (e.g., after the portable storage medium has been ejected or otherwise removed from the playback device) or even upon detection of instructions to power down the playback device 124. These title unbound content retrieval applications can be launched in accordance with software on the portable storage medium 122 and implemented by the playback device 124 or software stored on the playback device.

Figure 41:
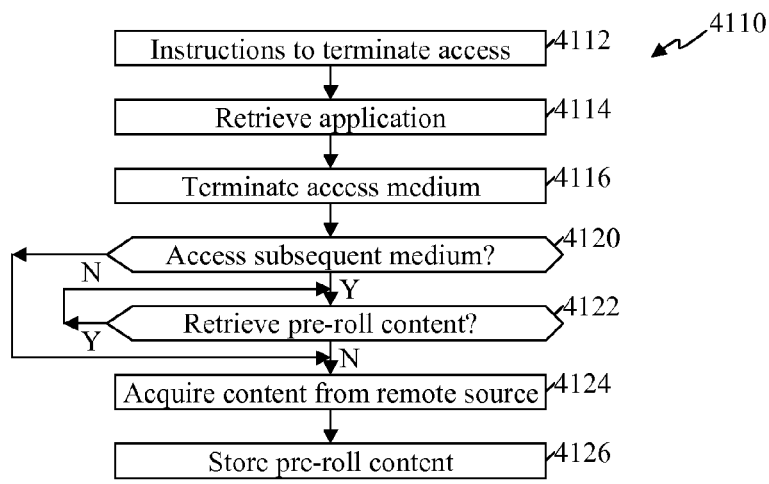
FIG. 41 depicts a simplified flow diagram of a process implemented by the playback device in acquiring pre-roll content when access to the portable storage medium is removed.

FIG. 41 depicts a simplified flow diagram of a process 4110 implemented by the playback device 124 in acquiring pre-roll content. In step 4112 instructions are received to terminate access to a portable storage medium 122 currently being accessed by the playback device 124. As described above, this instruction can be an instruction to power down the playback device, eject a disc or other such instruction. In step 4114 a title unbound application is identified and at least temporarily stored on the playback device 124. This application can be retrieved from the portable storage medium 122, previously stored on the playback device 124 or acquired from a remote source. In step 4116 access to the portable storage medium is terminated (e.g., a disc is ejected, or the playback device is partially powered down such that it appears to a user that the playback device has powered down).

In step 4120 it is determined whether access to a subsequent portable storage medium is accessed in which pre-roll content is to be acquired. In those instances where access to a subsequent portable storage medium is detected the process 4110 continues to step 4122 to determine whether the pre-roll content associated with the subsequently accessed portable storage medium has been acquired. In those instances where further pre-roll content is to be received in association with the subsequently accessed portable storage medium the process loops back to step 4122 to wait. Once the pre-roll content is acquired, the process continues to step 4124 and reactivates the title unbound application when appropriate.

In step 4124, access to a remote source 130 is initiated to acquire the pre-roll content based on the previously accessed portable storage medium, default defined on the playback device or other such designation, and relevant information as described above is provided to the remote source to allow the remote source to determine whether one or more pre-roll content are to be forwarded to the playback device. In step 4126, the received pre-roll content is stored at the playback device. In some embodiments further metadata and/or other information can be stored at the playback device to allow the playback device to identify the received and locally stored pre-roll content upon subsequent access to a portable storage medium associated with the locally stored pre-roll content. The process 4110 allows pre-roll content to be locally stored on the playback device 124 to be utilized the next time the same or a different portable storage medium is accessed. Further, this allows the cross-bridging between different portable storage mediums, and in some instances even between portable storage mediums where content on the different portable storage mediums is owned by different entities when those different entities have a cooperative relationship.

Figure 42:
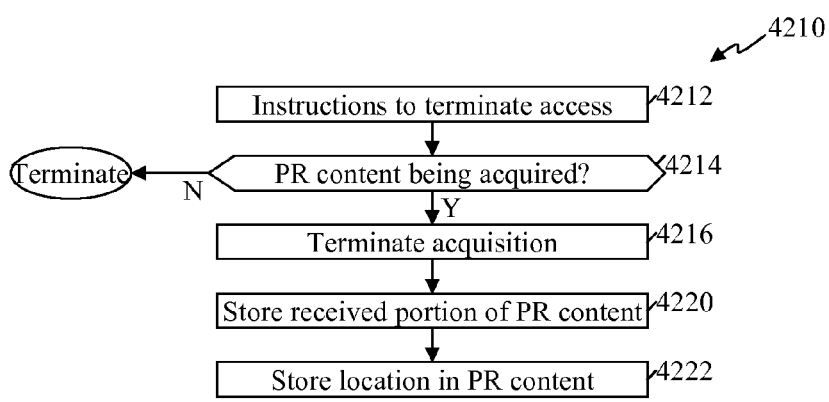
FIG. 42 depicts a simplified flow diagram of a process used in maintaining pre-roll content partially acquired in association with a portable storage medium when access to the portable storage medium is terminated while the pre-roll content is being acquired but not yet fully acquired and the acquisition of the pre-roll content cannot be continued.

FIG. 42 depicts a simplified flow diagram of a process 4210 used in maintaining pre-roll content partially acquired in association with a portable storage medium 122 when access to the portable storage medium is terminated while the pre-roll content is being acquired but not yet fully acquired and the acquisition of the pre-roll content cannot be continued. In step 4212 instructions are received to terminate access to a portable storage medium 122 currently being accessed by the playback device 124. Again, this instruction can be an instruction to power down the playback device, eject a disc or other such instruction. In step 4214 it is determined whether a pre-roll content is currently being acquired and has not yet been fully acquired. In those instances where pre-roll content is not actively being acquired when the instruction to terminate is received the process terminates. Alternatively, step

4216 the acquisition of the pre-roll content is terminated. In step 4220 the portion of the pre-roll content obtained is stored within the playback device 124. In step 4222 an amount of the pre-roll content received is determined and/or a location within the pre-roll content where acquisition was terminated is determined and stored, and in some instances a source of the pre-roll content is stored. As such, the playback device 124 can, in association with access to the same portable storage medium or a different portable storage medium, later playback the portion of the pre-roll content and the remainder of the pre-roll content can be acquired from the stored location where prior acquisition was terminated, for example, while playing back the portion of the pre-roll content received.

Some embodiments further monitor and/or collect usage statistics of pre-roll content that can be used to select future pre-roll content. Further, these statistics can be reported, such as video views, complete and partial playback (and at what point play was stopped), skipping and other such statistics. These results can further be evaluated and/or refined, for example, based on demographic, date, time, portable storage medium, content on the portable storage medium and other such factors. The statistics can further be aggregated and reported individually and/or as an aggregated summary. Based on the statistics popularity of a pre-roll content can be identified and further refined, for example, by portable storage medium, demographic, date, time, content and the like. Interest levels can further measured based, for example, on skip counts, repeated play counts, and other such actions. When multiple pre-roll content are provided, the statistics can further be evaluated in an effort to determine effectiveness of playback sequencing.

The playback of pre-roll content can be utilized with legacy portable storage mediums 122 when accesses by playback devices 124 that have programming to override playback lists and establish virtual file system that allow the playback of pre-roll content as well as content on the portable storage medium. Further, some embodiments provide the pre-roll content in protected form, such as encrypted (e.g., AACS protected content), or other such protection, typically corresponding to protection applied to content on the portable storage medium 122. The protection can include applying protection to content conformed with templates that correspond to the virtual file system on the playback device 124, such as described in previously incorporated U.S. patent application Ser. No. 12/479,474.

Some embodiments allow the remote source 130 with control of which per-roll content is played back and when it is played back. Further, as described above, some embodiments provide an interface, such as an Internet console, that is accessible by content owners, producers and/or distributors that allows for and/or automates the ingestion, preparation, processing, mapping, and controls the distribution of pre-roll content for portable storage mediums and/or content owned and/or controlled by the content owner, producer and/or distributor. The processing can be automated, partially automated or fully controlled by the entity inducing the ingest of the content. Again, the processing can include encoding, multiplexing, chunking, conforming and other such processing of the pre-roll content. Further, the processing 2414, in some instances, can optionally determine whether protection is to be applied to pre-roll content and can support protecting the content, which can include protecting the content in accordance with protection schemes established on portable storage mediums 122 with which the pre-roll content is intended to be associated.

The publishing can configure and format content for distribution. In some instances, the mapping 2416 and/or publishing 2420 provide for an automated creation of downloadable packages of pre-roll content limiting or eliminating a need for an author to manually generate such packaging. The published pre-roll content can be readily distributed to playback devices 124, including delivering multiple pre-roll contents to be sequentially played back prior to main menu (e.g., allowing the playback device 124 to play back one trailer, then immediately play back a second trailer before proceeding to a main menu). Further, the mapping 2416 and/or publishing allows dynamic control over a sequence and/or order of playback of pre-roll content, and to make changes to the sequence based on prioritization, changes in viewing habits, commands received at the playback device and/or other such factors. In generating the sequencing the mapping 2416 can take into consideration one or more factors, such as previous viewing history relative to a particularly playback device 124, user or the like (e.g., identifying that a first pre-roll content was already viewed and selecting a second pre-roll content instead of the first pre-roll content); region and/or geography (e.g., country, region, zip code, etc.); date and/or time (including start date/time, end date/time, expiration date/time, and the like); a portable storage medium 122 being accessed; historical portable storage mediums played by user or playback device; demographic data; or combinations one or more of the above.

Further, in some implementations, pre-roll contents can be defined as part of one or more groups of content, where the groups can define some relationship between content. For example, groups can be defined by genre, promotional items, age appropriateness, ratings, and other such groupings. Feature titles or other titles distributed to playback devices 124 on portable storage mediums or otherwise delivered to playback devices can be assigned to one or more groups such that the pre-roll content received can be obtained from the pre-roll content associated with the group with which the feature title of the portable storage medium 122 being accessed by the playback device 124. This grouping can be defined as metadata of the pre-roll content, defined as separate parameters and/or tables, or other such cooperation.

Table 3 below shows an example of a content traveler document. In this example, parameters are defined for a "MyCommentary" of feature movie.

TABLE 3

Example XML Content Traveler Document

```
<api type="FeatureData" typeId="50" messageType="Request">
  <feature type="Mail" typeId="15" action="Traveler">
    <message type="UGCMail" folder="Inbox">
      <routing>
        <from>
          <user id="9ae503d7-81cf-496b-a3fa-71b84dc1a6b1" screenName="" />
        </from>
        <subject><![CDATA[The MOVIE_1 commentary mail from rob3]]></subject>
```

TABLE 3-continued

Example XML Content Traveler Document

```
        <dateCreated>Tue, 27 Jan 2009 14:28:01 GMT</dateCreated>
        <messageBody><![CDATA[synciddy]]></messageBody>
        <to>
          <user id="4f727b09-d2e2-4585-9782-0e9f6afcdc52" screenName="" />
        </to>
      </routing>
      <disc id="00000000-0000-0000-0032-303038363338">
        <offset index="0" startTimeCode="0" videoTimeDuration="53.6369166666667" playPosition="20" />
      </disc>
      <attachments>
        <resourceFile type="AudioVideo" uri="Studio_1\MOVIE_1\MyCommentary/00e38d27-2fd4-47a6-b3fa-8e5e399b23e3/77777.m2t" fileSizeInBytes="6727680" localStorage="" clipi="77777" discOffset="0">
        </resourceFile>
        <resourceFile type="AudioVideo" uri="Studio_1\MOVIE_1\MyCommentary/00e38d27-2fd4-47a6-b3fa-8e5e399b23e3/77778.m2t" fileSizeInBytes="6739968" localStorage="" clipi="77778" discOffset="0">
        </resourceFile>
      </attachments>
      <typeSpecific>
        <border style="2" />
      </typeSpecific>
      <source>
        <resourceFile type="AudioVideo" uri="Studio_1\MOVIE_1\MyCommentary/1e45ee76-926a-4161-ab6c-1c2235260704.wmv" fileSizeInBytes="0" localStorage="">
        </resourceFile>
      </source>
      <original name="VideoCap_01_26_2009_22_26_59_001.wmv" />
      <supportResources />
      <pipelineParameters configurationID="9bc6c2bb-9a34-42f7-b9d6-8388e4259ba5" />
      <customerParameters>
        <commentary id="AE178320-B21A-CF58-293B-8034058F1997" name="sync test">
          <description>synciddy</description>
        </commentary>
        <pods count="1">
          <pod id="1" />
        </pods>
      </customerParameters>
      <studio id="4" uri="http://www.studio_1hidefclub.com/Content/" />
    </message>
    <status id="0">Normal</status>
    <cpsRoute id="cb289f3f-29d2-4c4f-8bad-9bbccfb1dc01" />
    <jobs>
      <job id="4003e8ab-b80d-4632-ab27-cc56cb9fdb11" pipelineID="19b04999-2a67-49ad-bbc8-fbf63d3b7226">
        <dateStarted>Tue, 27 Jan 2009 06:28:26 GMT</dateStarted>
        <dateEnded>Tue, 27 Jan 2009 06:32:15 GMT</dateEnded>
        <status type="JobComplete" code="Success" />
        <attachments>
          <resourceFile type="AudioVideo" uri="Studio_1\MOVIE_1\MyCommentary/00e38d27-2fd4-47a6-b3fa-8e5e399b23e3/77777.m2t" fileSizeInBytes="6727680" localStorage="" clipi="77777" discOffset="0">
          </resourceFile>
          <resourceFile type="AudioVideo" uri="Studio_1\MOVIE_1\MyCommentary/00e38d27-2fd4-47a6-b3fa-8e5e399b23e3/77778.m2t" fileSizeInBytes="6739968" localStorage="" clipi="77778" discOffset="0">
          </resourceFile>
        </attachments>
        <alerts>
          <alert>
            <element name="BDStreamConformer" />
            <dateCreated>Tue, 27 Jan 2009 06:28:26 GMT</dateCreated>
            <status type="Information" code="0">Err code: 0 - CoreImpl::Start - mapping presentation time 0 to chunk time 11.6507</status>
          </alert>
          <alert>
            <element name="BDStreamConformer" />
            <dateCreated>Tue, 27 Jan 2009 06:28:26 GMT</dateCreated>
            <status type="Information" code="0">Err code: 0 - CoreImpl::Start - seeking template to 0 bytes</status>
          </alert>
          <alert>
            <element name="BDStreamConformer" />
            <dateCreated>Tue, 27 Jan 2009 06:28:34 GMT</dateCreated>
            <status type="Information" code="0">Err code: 0 - CoreImpl::Start - aligning presentation time to the nearest CPI: 11.6452 seconds</status>
```

TABLE 3-continued

Example XML Content Traveler Document

```
    </alert>
    <alert>
     <element name="BDStreamConformer" />
     <dateCreated>Tue, 27 Jan 2009 06:28:34 GMT</dateCreated>
     <status type="Information" code="0">Err code: 0 -
ConformerProcessor::SetPresentationStartTime 11.6452 seconds</status>
    </alert>
    <alert>
     <element name="BDStreamConformer" />
     <dateCreated>Tue, 27 Jan 2009 06:28:34 GMT</dateCreated>
     <status type="Information" code="0">Err code: 0 - ConformerProcessor::AddPID
6912</status>
    </alert>
    <alert>
     <element name="BDStreamConformer" />
     <dateCreated>Tue, 27 Jan 2009 06:28:34 GMT</dateCreated>
     <status type="Information" code="0">Err code: 0 - ConformerProcessor::AddPID
6656</status>
    </alert>
    <alert>
     <element name="BDStreamConformer" />
     <dateCreated>Tue, 27 Jan 2009 06:31:51 GMT</dateCreated>
     <status type="Information" code="0">Err code: 0 -
ConformerProcessor::ProcessTemplateStream - Presentation time of 11.6452 seconds
reached for PID 6912</status>
    </alert>
    <alert>
     <element name="BDStreamConformer" />
     <dateCreated>Tue, 27 Jan 2009 06:31:51 GMT</dateCreated>
     <status type="Information" code="0">Err code: 0 -
ConformerProcessor::ProcessTemplateStream - Presentation time of 11.6452 seconds
reached for PID 6656</status>
    </alert>
    <alert>
     <element name="General" />
     <dateCreated>Tue, 27 Jan 2009 06:32:15 GMT</dateCreated>
     <status type="Information" code="0">Err code: 0 - Updating DiscOffset[0]
VideoTimeDuration from 54.027 to 53.6369166666667 seconds</status>
    </alert>
   </alerts>
  </job>
 </jobs>
 <moderators />
 </feature>
</api>
```

Table 4 below shows an example of a pipeline configuration document. In this example, parameters are defined for a "MyCommentary" pipeline of a feature movie.

TABLE 4

Example XML Pipeline Configuration Document

```
<?xml version="1.0" encoding="utf-8" ?>
<pipelineConfiguration topologyID="fccd2a72-f2ce-4de6-85cd-c6268bb21bc0">
 <pipeElementConfig name ="Transcoder">
  <General SourcePath="unused" WorkingPath="..\Temp" ChunkSize="1048576"
MaxDuration="0" UseTimeOut="true"
  EncodeVideo="true" EncodeAudio="true" RunMuxer="true" UseFrameRateConverter=
"true" ClipType="7" VC1SuperBlackVideoPath="$CONFIGFILEREFBASEPATH$\
Resources\ Studio_1\MOVIE_1\MyCommentary\ConformerTemplates\video_
4x3_template_1pass_cbr_500Kbps.VC1"/>
   <VideoEncoderSettings EncodeWidth="720" EncodeHeight="480" Type="VC1"
FrameRate="23.976">
    <AVC_Encoder>
     <Generic VideoFormat="2" PictureType="0" PullDown="0" H264_Type="8" Profile
="1" Level="32"/>
     <BitrateControl Mode="0" Pass="1" AvgBitrate="500000" MaxBitrate="500000"
CPB_BufferSize="6000000"
  BufferFullnessInitial="6000000" BufferFullnessTarget="3000000"/>
     <Picture UseSampleAspectRatio="true">
      <AspectRatio X="10" Y="11" />
     </Picture>
     <InputInfo />
```

TABLE 4-continued

Example XML Pipeline Configuration Document

```
    <GOP_Structure Max_GOP_Length="22" Max_B_FrameCount="0"
SceneChangeDetection="0"/>
    <AVC_AdvancedSettings IDR_Frequency="1" AdaptiveQuatization="false"
AdaptiveQuatizationStrength="0" NumberOfReferenceFrames="2"
  MotionEstSubpixelDepth="2" MotionEstUseSubblockSearch="true"
EntropyCodingMode="1" MotionEstSearchRange="63"
      UseDeblockingFilter = "true" DeblockingAalphaC0_Offset="-1"
DeblockingBetaOffset="-1"
    FilmGrainOptmStrength="0" BlackNormLevel="0" VideoFullRange="false"
QuantMode="2"
  MotionEstEnableWeightedPredictionMode="true" MotionEstEnableFastMultiRef=
"false" MotionEstEnableFastSubBlock="false"
  RDOptiomization="true" RDOptmFast="false" UseHadamardTransform="true"
EnableFastInterDecisions="false"
    EnableFastIntraDecisions="false"/>
   </AVC_Encoder>
  <VC1_Encoder>
   <Generic Level="2" VC1_Type="8" VideoFormat="2" Profile="2"/>
   <BitrateControl Mode="2" Pass="1" AvgBitrate="500000" MaxBitrate="500000"
BufferSize="12000000" WriteHrdParams="1"
       BufferFullnessInitial="12000000" BufferFullnessTarget="6000000"
TemplatePeakBitrate="1500000"/>
   <Picture PictureType="0" PullDown="0" FieldOrder="0" UseSampleAspectRatio=
"true" AspectRatioIndex="5" />
   <GOP_Structure IntraFramePeriod="22" B_FrameCount="2" SceneChangeDetection=
"0" PadToFullGOP="false"/>
   <VC1_AdvancedSettings AdaptiveQuatization="0" AdaptiveQuatizationStrength="0"
MotionEstMode="2"
       MotionEstSubpixelDepth="2" MotionEstUse4MV="true" MotionEstSearchRange=
"64" MotionEstUseIntensityComp="false"/>
   </VC1_Encoder>
   </VideoEncoderSettings>
   <AudioEncoderSettings Type="DTSHD">
    <DTSHD_Encoder Type="DTSHD"
    LicenseFilePath="..\ContentProcessingNode\DTSEncoder\dtslicense.dat"
    ChannelLayout="2.0"
    ProfilePath="..\ContentProcessingNode\DTSEncoder\Configurations\DDS\BDExp_
20ch_16bit_128.cfg" />
   </AudioEncoderSettings>
   <Multiplexer TemplateConfigXMLPath="..\ContentProcessingNode\corel\BDScript\
CMP_OutOfMux_BDMV_DDS.xml"
    MuxerPath="..\ContentProcessingNode\corel\ULHDAdvMuxerCmdLine.exe"/>
  </pipeElementConfig>
  <pipeElementConfig name ="BDStreamConformer" applyPTS="true">
   <templateStreamPath path ="$CONFIGFILEREFBASEPATH$\Resources\Studio_1\
MOVIE_1\MyCommentary\ConformerTemplates\77777_template.m2ts"/>
   <templateClipInfoPath path ="$CONFIGFILEREFBASEPATH$\Resources\
Studio_1\MOVIE_1\MyCommentary\ConformerTemplates\77777_template.clpi"/>
   <templateChunkMapPath path="$CONFIGFILEREFBASEPATH$\Resources\
Studio_1\MOVIE_1\MyCommentary\ConformerTemplates\77777_chunkmap.xml" />
   <conform pid="1B00" />
   <conform pid="1A00" />
  </pipeElementConfig>
  <pipeElementConfig name ="BinaryChunker" applyPTS="true" fileSink=
"FileSink" chunkMapPath="$CONFIGFILEREFBASEPATH$\Resources\
Studio_1\MOVIE_1\MyCommentary\ConformerTemplates\77777_chunkmap.xml">
  </pipeElementConfig>
  <pipeElementConfig name ="AACSProcessor" mode="2">
   <encryptedKey key ="" />
  </pipeElementConfig>
  <pipeElementConfig name ="FileSink">
   <outputPath path ="transoutput.m2t" mode="OpenCreate" intExt="sink"/>
  </pipeElementConfig>
</pipelineConfiguration>
```

Some embodiments provide methods of playing back multimedia content relative to a portable storage medium. These methods comprise: detecting, at a playback device, an initial access to a portable storage medium; requesting, from a remote source, pre-roll content corresponding to content recorded on the portable storage medium; and disguising the requesting of the pre-roll content and receiving of the pre-roll content such that a user of the playback device does not experience a delay in playback of content while the pre-roll content is being received from the remote source, wherein the disguising comprises: playing back disguise content, locally accessible by the playback device, while requesting and receiving the pre-roll content at the playback device; and transitioning playback from the disguise content to playing back the pre-roll content received from the remote source such that the user of the playback device does not perceive a delay associated with obtaining the pre-roll content from the remote source. Additionally or alternatively, some embodiments halt playback of the disguise content and initiating playback of the pre-roll content received from the remote source such that the user of the playback device does not perceive a delay associated with obtaining the pre-roll content from the remote source. In some instances, the initiating playback of pre-roll content comprises initiating playback of the pre-roll content prior to playback of a main menu and a main title recorded on the portable storage medium.

The playing back of the disguise content can comprise: determining whether there is previously obtained locally stored pre-roll content stored locally at the playback device; and initiating playback of the locally stored pre-roll content previously received and locally stored at the playback device when there is previously obtained pre-roll content stored locally at the playback device. In some implementations, the playing back the disguise content comprises: determining, in response to determining that there is previously obtained pre-roll content stored locally at the playback device, whether the locally stored pre-roll content has expired; and preventing the initiating the playback of the locally stored pre-roll content when the locally stored pre-roll content has expired. The methods, in some embodiments further comprise: identifying a first disguise content recorded on the portable storage medium; and initiating playback, at the playback device and in response to detecting that the locally stored pre-roll content has completed playback, the first disguise content recorded on the portable storage medium. Additionally, some embodiments further comprise: identifying, in response to determining that the locally stored pre-roll content has expired, a first disguise content recorded on the portable storage medium; and accessing and initiating playback, at the playback device, the first disguise content recorded on the portable storage medium.

Further, in some implementations, the methods can further comprise: identifying, in response to determining there is not previously obtained pre-roll content stored locally at the playback device, a first disguise content recorded on the portable storage medium; and accessing and initiating playback, at the playback device, the first disguise content recorded on the portable storage medium. The requesting the pre-roll content can in some instances comprise: determining an available bandwidth over a communication link between the playback device and the remote source over which the pre-roll content is being received; determining whether a delay in excess of a delay threshold is predicted to receive the pre-roll content; and requesting a different content stream of the pre-roll content, where the different content stream comprises less data to be communicated. Additionally or alternatively, the requesting the different content stream can comprise requesting the different content stream such that the received pre-roll content of the different content stream has a lower resolution. In other embodiments, the requesting the pre-roll content can comprise: determining an available bandwidth over a communication link between the playback device and the remote source over which the pre-roll content is being received; determining whether a delay in excess of a delay threshold is predicted to receive the pre-roll content; and determining not to playback the pre-roll content in response to determining the delay is in excess of the delay threshold. Additionally, in some instances a communication can be issued requesting the communication of the pre-roll content be terminated. Further, the requesting the pre-roll content, in some embodiments, comprises: determining that there is an excess of available bandwidth over a communication link between the playback device and the remote source and over which the pre-roll content is being received; and requesting a different content stream of the pre-roll content, where the different content stream comprises a higher playback quality version of the pre-roll content.

Some embodiments additionally or alternatively provide methods of presenting multimedia content in association with a portable storage medium. These method can comprise: detecting, at a playback device, an initial access by the playback device to a portable storage medium; prior to providing the playback device with access to multimedia content recorded on the portable storage medium: accessing a remote source over a distributed network; and requesting, from the remote source, pre-roll content associated with the portable storage medium; receiving, from the remote source, at least a portion of a pre-roll content associated with the portable storage medium, where the portion of the pre-roll content is sufficient to initiate playback at the playback device of the pre-roll content; disguising the retrieving of the pre-roll content while accessing the remote source, requesting the pre-roll content and receiving the at least the portion of the pre-roll content, where the disguising comprises: identifying one or more disguise contents; initiating playback of one of the one or more disguise contents; and continuing the playback of the one or more disguise contents until the at least the portion of the pre-roll content associated with the portable storage medium is received; and transitioning to playback the pre-roll content. Some embodiments halt the playback of the one or more disguise contents; and initiate playback of the pre-roll content prior to playing back a main menu recorded on the portable storage medium, where the main menu is not disguise content. The detecting the initial access can comprise detecting the portable storage medium upon power up of the playback device. In some instances the detecting the initial access comprises detecting an insertion of the portable storage medium into the playback device.

In some embodiments, the transitioning to playback the pre-roll content and/or the halting of the playback of the one or more disguise contents can comprise immediately interrupting the playback of a currently played back disguise content of the one or more disguise contents. Additionally or alternatively, the transitioning to playback the pre-roll content and/or the halting of the playback of the one or more disguise contents can comprise completing the playback of a currently played back disguise contents of the one or more disguise contents prior to the initiating the playback of the pre-roll content. The accessing the remote source over the distributed network can comprise accessing the remote source over the distributed network when user authorization is provided to implement the accessing the remote source over the distributed network. Some embodiments further comprise: displaying, prior to initiating the access to the remote source, a user interface requesting authorization to access the remote source to acquire the pre-roll content; and implementing the accessing the remote source to acquire the pre-roll content in response to receiving an authorization to access the remote source to acquire the pre-roll content. In some instances, the methods can further comprise: determining, while playing back the pre-roll content, whether the pre-roll content can be received in a higher quality; requesting, from the remote source, a higher quality stream of the pre-roll content; receiving a portion of the higher quality stream of the pre-roll content; and playing back the portion of the higher quality stream of the pre-roll content following the playback of at least the portion of the pre-roll content such that the playback appears continuous and without repeating playback of content and skipping content. The determining whether the pre-roll content can be received in the higher quality can comprise: determining a buffer level at the playback device; determining whether the buffer level has a predefined relationship with a first buffer level threshold; and implementing the requesting the higher quality of pre-roll content when the buffer level has the predefined relationship with the first buffer level threshold.

The determining whether the pre-roll content can be received in a higher quality can, in some implementations, comprise: determining a communication bandwidth over a communication connect with the remote source over the distributed network; determining whether the communication bandwidth has a predefined relationship with a first communication bandwidth threshold; and implementing the requesting the higher quality of pre-roll content when the communication bandwidth has the predefined relationship with the first communication bandwidth threshold. Further, the identifying the one or more disguise contents can comprise identifying at least a first disguise content of the one or more disguise contents on the portable storage medium. Additionally or alternatively, the identifying the one or more disguise contents, in some implementations, can comprise identifying a locally stored pre-roll content stored locally at the playback device prior to the detecting the initial access to the portable storage medium. Some embodiments further comprise: detecting a request to remove access to the portable storage medium from the playback device; activating and implementing, on the playback device, an unbound retrieval application corresponding to the portable storage medium; continuing to implement the unbound retrieval application even after the access to the portable storage medium is removed, where the continuing to implement the unbound retrieval application comprises: accessing, over the distributed network, a subsequent remote source; requesting, from the subsequent remote source, subsequent pre-roll content associated with the portable storage medium; and receiving and storing at the playback device the subsequent pre-roll content. The initiating the playback of the pre-roll content can comprise initiating the playback of the pre-roll content prior to playing back a main title recorded on the portable storage medium, where the main title is not disguise content.

Still further, some embodiments include methods of providing access to pre-roll content, the methods comprise: playing back, through a playback device directly accessing a first portable storage medium, content recorded on and retrieved by the playback device from the portable storage medium; detecting a request to remove access to the first portable storage medium from the playback device; initiating access, over a distributed network, to a remote source to request pre-roll content from the remote source; terminating access to the first portable storage medium; and continuing to access the remote source, while access to the first portable storage medium is removed, and acquiring pre-roll content associated with the first portable storage medium. The acquiring the pre-roll content can comprise: requesting, from the remote source, the pre-roll content associated with the first portable storage medium; and receiving and storing at the playback device the first pre-roll content associated with the portable storage medium. Some embodiments further comprise: accessing a second portable storage medium after access to the first portable storage medium has been removed; initiating playback, after accessing the second portable storage medium and prior to providing access to a main menu recorded on the second portable storage medium, of the first pre-roll content in association with providing direct access to the second portable storage medium.

In some implementations, the initiating the playback of the first pre-roll content can comprise: determining whether the second portable storage medium is associated with the first pre-roll content; and implementing the playback of the first pre-roll content when the second portable storage medium is associated with the first pre-roll content. One or more methods can further comprise: determining that the second portable storage medium is not associated with a second pre-roll content locally stored; and preventing the playback of the second pre-roll content in association with the second portable storage medium when the second portable storage medium is not associated with the second pre-roll content. In some instances, the detecting the request to remove access to the first portable storage medium from the playback device comprises detecting instructions to power down the playback device; and continuing to implement a content retrieval application while powering down the playback device such that the playback device appears to a user to have powered down; and completing the power down of the playback device upon receiving and locally storing the first pre-roll content.

Some of the methods further comprise: accessing a subsequent remote source while accessing the second portable storage medium and playing back first pre-roll content in association with the second portable storage medium; and acquiring a second pre-roll content from the subsequent remote source such that the first pre-roll content disguises the acquisition of the second pre-roll content; and initiating playback of the second pre-roll content after the playback of the first pre-roll content has completed and before displaying the main menu recorded on the second portable storage medium. The initiating playback of the first pre-roll content can comprises: determining, in response to detecting an initial access to the second portable storage medium and prior to providing access to the main menu recorded on the second portable storage medium, whether one or more pre-roll contents are locally stored, including the first pre-roll content; determining, in response to determining that one or more pre-roll contents are locally stored, whether the second portable storage medium is associated with the first pre-roll content; and implementing the playback of the first pre-roll content when the second portable storage medium is associated with the first pre-roll content.

Further, some embodiments provide methods of playing back multimedia content. These methods can include: receiving, at a playback device and from over a distributed network, a first stream of a first pre-roll content associated with a portable storage medium being directly accessed by the playback device at the time of requesting the first pre-roll content from a remote source and while playing back disguise content that disguises the acquisition of the first pre-roll content; determining whether a bandwidth of a communication link over the distributed network provides for a change to a second stream of the first pre-roll content; requesting the second stream of the first pre-roll content when the communication link over the distributed network provides for the change to the second stream of the first pre-roll content; and playing back the first pre-roll content comprises switching from playing back the first stream of the first pre-roll content to playing back the second stream of the first pre-roll content. The playing back the first pre-roll content can comprise: transitioning from the disguise content to playing back the first pre-roll content. Additionally or alternatively, the playing back the first pre-roll content can comprise: halting the playback of the disguise content; and initiating the playback of the first pre-roll content prior to displaying a main menu recorded on the portable storage medium. In some instances, the receiving the first stream of the first pre-roll content comprises receiving the first stream of the first pre-roll content that conforms to clip information recorded on the portable storage medium; and receiving the second stream of the first pre-roll content where the second stream of the first pre-roll content conforms to the same clip information recorded on the portable storage medium.

Additionally or alternatively, the determining that the bandwidth of the communication link provides for the change to the second stream of the first pre-roll content can comprise determining, at the playback device, that the playback device cannot sustain continuous playback of the first stream of the first pre-roll content received at the first bit rate without interrupting the playback of the first pre-roll content. Further, the requesting the second stream of the first pre-roll content can comprise requesting, from the remote source, the first pre-roll content at a different bit rate. In some implementations the determining that the playback device cannot sustain continuous playback of the first stream of the first pre-roll content can comprise determining that a buffer level of the playback device exceeds a first buffer level threshold. further, the determining that the bandwidth of the communication link provides for the change to the second stream of the first pre-roll content can in, some embodiments, comprise determining that a first bit rate of the first stream of the first pre-roll content is less than the playback device can receive and playback without delays in playing back the first pre-roll content; and the requesting the second stream of the first pre-roll content comprises requesting the second stream at a higher playback quality.

Additionally, some embodiments include methods of providing pre-roll content to be played back in association with content recorded on a portable storage medium. These method can comprise: receiving, from a remote playback device, a request for pre-roll content; identifying a portable storage medium being directly accessed by the playback device and associated with the request for the pre-roll content; identifying one or more pre-roll content associated with the identified portable storage medium; identifying initial conditions; selecting a first stream of a first pre-roll content from the identified one or more pre-roll contents; initiating communication of the first stream of the first pre-roll content; determining a connection bandwidth over a communication link with the remote playback device; determining whether the bandwidth provides for the selection of a second stream of the first pre-roll content; selecting, in response to determining that the bandwidth provides for the selection of the second stream of the first pre-roll content, the second stream of the first pre-roll; and transitioning to communicating the second stream of the first pre-roll content. In some instances the transitioning to communicating the second stream can comprise halting, in response to the selection of the second stream of the first pre-roll content, the communication of the first stream of the first pre-roll content; and initiating, in response to halting the communication of the first stream of the first pre-roll content, the communication of the second stream of the first pre-roll content. Some embodiments further comprise: identifying a playback device from which the request for the pre-roll content is received. Further, some embodiments comprise: identifying a user initiating the request for the pre-roll content.

The identifying the one or more pre-roll content can include identifying one or more sequences associated with the portable storage medium, where each sequence identifies one or more pre-roll content and an order in which the one or more pre-roll content are to be played back at the playback device. In some instances the identifying the one or more pre-roll content comprises evaluating a viewing history of a user requesting the pre-roll content. Additionally or alternatively, the identifying the initial conditions comprises determining an available bandwidth over the communication connection with the remote playback device. Further, in some instances, the identifying the initial conditions can comprise determining a previous bandwidth available when previous pre-roll content was previously forwarded to the playback device. The identifying the initial conditions can, in some implementations, comprise identifying a requested data quality.

Additionally, in some implementations the identifying the initial conditions comprises identifying a requested resolution. Further, the selecting the first pre-roll content can comprise identifying a priority associated one or more pre-roll content corresponding with the portable storage medium. The identifying the priority can further include evaluating a user's prior viewing habits and prioritizing the one or more pre-roll contents according to the user's prior viewing habits. In some embodiments, the selecting the first pre-roll content can comprises identifying previous pre-roll content previously provided to the playback device and disregarding the previously provided pre-roll content from the identified one or more pre-roll content. The determining whether the bandwidth provides for the selection of the second stream of the first pre-roll content can additionally include determining whether the bandwidth supports a higher quality pre-roll content. In some embodiments, the determining whether the bandwidth provides for the selection of the second stream of the first pre-roll content comprises determining whether the bandwidth supports a higher bit rate.

The determining whether the bandwidth provides for the selection of the second stream of the first pre-roll content, in some embodiments, comprises determining whether the bandwidth dictates that a lower quality second stream of the first pre-roll content should be forwarded to the playback device where the second stream of the first pre-roll content has a lower quality playback than the first stream of the first pre-roll content. The determining whether the bandwidth provides for the selection of the second stream of the first pre-roll content can additionally include determining whether the bandwidth dictates that a lower quality second stream of the first pre-roll content should be forwarded to the playback device where the lower quality second stream of the first pre-roll content has a lower bit rate than the first stream of the first pre-roll content. Further, the transitioning to the second stream and/or the halting of the communication of the first stream of the first pre-roll content can comprise identifying a transition point within the first stream of the first pre-roll content and halting the communication of the first stream of the first pre-roll content at the first transition point; and wherein the initiating the communication of the second stream of the first pre-roll content comprises identifying a transition point in the second stream of the first pre-roll content that corresponds with the transition point in the first stream of the first pre-roll content, and initiating the transition of the second stream of the first pre-roll content from the transition point in the second stream of the first pre-roll content.

Some embodiments additionally or alternatively include methods of providing pre-roll content to be played back in association with content recorded on a portable storage medium, the methods comprise: receiving, from a remote playback device, a request for pre-roll content; identifying a portable storage medium being directly accessed by the playback device and associated with the request for the pre-roll content identifying a sequence specifying an order of playback of a first set of two or more pre-roll contents associated with the identified portable storage medium; initiating a communication of a first pre-roll content in accordance with the sequence; determining a connection bandwidth over a communication link with the remote playback device determining whether the bandwidth provides for the altering of the sequence; altering the sequence, when the bandwidth provides for the altering of the sequence, to produce an altered sequence where the altered sequence specifies an alternate order of playback of a second set of two ore more pre-roll content where the second set is different than the first set; and altering the communication of the first pre-roll content in accordance with the altered sequence.

Similarly, some embodiments include methods of providing pre-roll content to be played back in association with content recorded on a portable storage medium, the methods comprise: receiving, over a distributed network from a playback device, a request for pre-roll content associated with a portable storage medium being directly accessed by the playback device; identifying a first pre-roll content that is associated with the portable storage medium; selecting a first stream of the first pre-roll content, where the first stream is communicated at a first data rate to achieve a first playback quality at the playback device; identifying a connection bandwidth over the distributed network to the playback device; determining whether the connection bandwidth supports the communication of the first version of the first pre-roll content at the first data rate; and selecting a second version of the first pre-roll content when it is determined that the connection bandwidth cannot support the communication of the first version of the first pre-roll content at the first data rate, where the second version of the first pre-roll content is communicated at a second data rate that is less than the first data rate and to that achieves a second playback quality at the playback device that is less than the first playback quality.

In some embodiments, methods of playing back content in association with a portable storage medium are provided. These methods can comprise: detecting direct access, by a playback device, to a portable storage medium; reading content from the portable storage medium; identifying instructions to initiate access to a remote source to request pre-roll content not recorded on the portable storage medium; initiating communication with the remote source requesting the pre-roll content; initiating playback, while requesting the pre-roll content and while waiting to receive the pre-roll content, of one or more disguise content such that a delay of retrieving the pre-roll content is disguised to a viewer; determining whether a sufficient amount of the pre-roll content has been received to initiate playback of the pre-roll content; and transitioning to playing back the pre-roll content when it is determined that the sufficient amount of the pre-roll content has been received. In some instances, the transitioning to play back the pre-roll content comprises allowing the currently playing back disguise content to complete playback and then initiating the playback of the pre-roll content. Typically, the initiation of playback of the pre-roll content occurs such that the user does not perceive a delay associated with obtaining the pre-roll content. In other embodiments, the transitioning to playback the pre-roll content may comprise halting the playback of the one or more disguise content when it is determined that the sufficient amount of the pre-roll content has been received to initiate playback of the pre-roll content; and initiating playback of the pre-roll content when it is determined that the sufficient amount of the pre-roll content has been received to initiate playback of the pre-roll content.

In some instances, the methods can further comprise: identifying a communication bandwidth over a communication link between the playback device and the remote source; predicting an amount of time needed to receive the sufficient amount of the pre-roll content to initiate playback of the pre-roll content; and selecting one or more disguise content from a plurality of content to be played back while disguising the retrieval of the pre-roll content.

The selecting the one or more disguise content can comprise identifying a priority as defined on the portable storage medium, and selecting each of the one or more disguise content in sequence in accordance with the identified priority defined on the portable storage medium. In some implementations, the selecting the one or more disguise content comprises identifying previously received pre-roll content locally stored at the playback device and received in association with the playback device directly accessing a separate portable storage medium; and selecting the previously received pre-roll content to be played back while disguising the retrieval of the pre-roll content. Additionally or alternatively, the selecting the one or more disguise content can comprise selecting a first advertisement content over a second advertisement content.

While the invention herein disclosed has been described by means of specific embodiments and applications thereof, numerous modifications and variations could be made thereto by those skilled in the art without departing from the scope of the invention set forth in the claims.

What is claimed is:

1. A method of playing back multimedia content relative to a portable storage medium, the method comprising:
    detecting, at a playback device, access to a portable storage medium, wherein the playback device is configured to playback multimedia content stored on portable storage mediums;
    accessing, by the playback device, pre-roll content corresponding to content stored on the portable storage medium;
    disguising, at the playback device, the accessing the pre-roll content and initiating playing back of the pre-roll content such that a user of the playback device does not perceive a delay in playback of content corresponding with the portable storage medium while the pre-roll content is being accessed, wherein the disguising the delay further comprises playing back disguise content, by the playback device, while the playback device is accessing the pre-roll content; and
    transitioning playback from the disguise content to playing back the pre-roll content such that the user of the playback device does not perceive the delay associated with accessing the pre-roll content.

2. The method of claim 1, wherein the accessing the pre-roll content comprises requesting, over a distributed network from a remote source, the pre-roll content corresponding to the content stored on the portable storage medium, wherein the disguising the delay further comprises implementing the playing back of the disguise content while at least the playback device is requesting and receiving the pre-roll content from the remote source.

3. The method of claim 1, wherein the initiating playback of the pre-roll content comprises initiating playback of the pre-roll content through the playback device prior to playback of a main menu or a main title stored on the portable storage medium, where the main menu and the main title are not disguise content.

4. The method of claim 1, wherein the playing back the disguise content comprises:
    determining whether there is previously obtained locally stored pre-roll content stored locally at the playback device; and
    initiating playback of the previously obtained pre-roll content, as at least part of the disguise content, when there is previously obtained pre-roll content stored locally at the playback device.

5. The method of claim 4, wherein the playing back the disguise content comprises:
- determining, in response to determining that there is previously obtained pre-roll content stored locally at the playback device, whether the previously obtained pre-roll content has expired;
- preventing the initiating the playback of the previously obtained pre-roll content when the previously obtained pre-roll content has expired; and
- implementing the initiating the playback, as at least part of the disguise content, of the previously obtained pre-roll content when there is previously obtained pre-roll content stored locally at the playback device and the previously obtained pre-roll content has not expired.

6. The method of claim 1, further comprising:
detecting a request to remove the playback device's access to the portable storage medium;
implementing, on the playback device, an unbound retrieval application corresponding to the portable storage medium;
continuing to implement the unbound retrieval application even after the playback device's access to the portable storage medium is removed, where the continuing to implement the unbound retrieval application comprises:
- accessing, by the playback device, subsequent pre-roll content associated with the portable storage medium; and
- storing at the playback device the subsequent pre-roll content.

7. The method of claim 1, wherein the transitioning playback from the disguise content to playing back the pre-roll content comprises:
- determining whether a sufficient amount of the pre-roll content has been received to initiate playback of the pre-roll content;
- halting the playback of the disguise content when it is determined that the sufficient amount of the pre-roll content has been received to initiate playback of the pre-roll content; and
- initiating playback of the pre-roll content when it is determined that the sufficient amount of the pre-roll content has been received to initiate playback of the pre-roll content.

8. The method of claim 1, further comprising:
- determining, while playing back the pre-roll content, whether the pre-roll content can be received in a higher quality;
- requesting, from the remote source, a higher quality stream of the pre-roll content;
- receiving a portion of the higher quality stream of the pre-roll content; and
- playing back the portion of the higher quality stream of the pre-roll content following the playback of at least the portion of the pre-roll content such that the playback appears continuous without repeating playback of content and without skipping content.

9. The method of claim 8, wherein the determining whether the pre-roll content can be received in the higher quality comprises:
- determining a buffer level at the playback device;
- determining whether the buffer level has a predefined relationship with a first buffer level threshold; and
- implementing the requesting the higher quality of pre-roll content when the buffer level has the predefined relationship with the first buffer level threshold.

10. The method of claim 1, wherein the accessing the pre-roll content comprises accessing the pre-roll content that comprises interactive content configured to allow the user of the playback device playing back the pre-roll content to interact with the content.

11. The method of claim 10, further comprising detecting a selection of an option presented to the user of the playback device through the pre-roll content, and initiating access to additional information corresponding to the selected option.

12. A system for use in playing back multimedia content, the system comprising:
- a processor configured to implement playback of content accessible from at least a portable storage medium; and
- memory accessible by the process and configured to store code to be accessed and implemented by the processor such that the processor, when implementing the code, is configured to:
- detect, local at the system, access to a portable storage medium;
- access pre-roll content corresponding to content stored on the portable storage medium; and
- disguise the access to and initiating playback of the pre-roll content such that a user of the system does not perceive a delay in playback of content relative to the portable storage medium while the pre-roll content is being accessed, wherein the processor, in disguising the access to and the initiating playback of the pre-roll content, is configured to play back disguise content while accessing the pre-roll content; and
- transition playback from the disguise content to playing back the pre roll content such that the user does not perceive the delay associated with accessing and initiating playback of the pre-roll content.

13. The system of claim 12, wherein the processor in initiating the playback of the pre-roll content is further configured to initiate playback of the pre-roll content prior to playback of a main menu or a main title stored on the portable storage medium.

14. The system of claim 12, wherein the processor in implementing the code to play back the disguise content is further configured to:
- determine whether there is previously obtained pre-roll content that is locally stored; and
- initiate playback of the previously obtained pre-roll content, as at least part of the disguise content, when there is previously obtained pre-roll content stored locally.

15. The system of claim 14, wherein the processor, in playing back the disguise content, is further configured to:
- determine, in response to determining that there is previously obtained pre-roll content stored locally, whether the previously obtained pre-roll content has expired;
- prevent the initiation of the playback of the previously obtained pre-roll content when the previously obtained pre-roll content has expired; and
- implement the initiating the playback, as at least part of the disguise content, of the previously obtained pre-roll content when there is previously obtained pre-roll content stored locally at the playback device and the previously obtained pre-roll content has not expired.

16. The system of claim 15, wherein the processor in implementing the code in transitioning the playback from the disguise content to playing back the pre-roll content is further configured to:
- determine whether a sufficient amount of the pre-roll content has been received from a remote source to initiate playback of the pre-roll content;

halt the playback of the disguise content when it is determined that the sufficient amount of the pre-roll content has been received to initiate playback of the pre-roll content; and initiate playback of the pre-roll content when it is determined that the sufficient amount of the pre-roll content has been received to initiate playback of the pre-roll content.

17. A method of providing pre-roll content to be played back in association with content stored on a portable storage medium, the method comprising:

receiving, from over a distributed network and at a server, a request from a remote playback device for pre-roll content in response to an initial access at the playback device to a portable storage medium, wherein the remote playback device is locally and directly accessing the portable storage medium upon which is stored multimedia playback content configured to be playback back by the playback device;

identifying, at the server, the multimedia content stored on the portable storage medium being directly accessed by the playback device and associated with the request for the pre-roll content;

identifying one or more pre-roll content associated with the identified portable storage medium;

identifying initial conditions;

selecting a first stream of a first pre-roll content from the identified one or more pre-roll contents;

initiating communication of the first stream of the first pre-roll content while the playback device is disguising a delay associated with requesting and receiving the pre-roll content from the server, such that a user of the playback device does not perceive the delay in playing back of content corresponding with the portable storage medium while the pre-roll content is being accessed, by playing back disguise content, by the playback device, while the playback device is requesting and receiving the pre-roll content and before transitioning playback from the disguise content to playing back the pre-roll content;

determining a connection bandwidth over a communication link with the remote playback device;

determining whether the bandwidth provides for the selection of a second stream of the first pre-roll content;

selecting, in response to determining that the bandwidth provides for the selection of the second stream of the first pre-roll content, the second stream of the first pre-roll; and transitioning to communicating the second stream of the first pre-roll content.

18. The method of claim 17, wherein the identifying the one or more pre-roll content comprises identifying one or more sequences associated with the portable storage medium, where each sequence identifies one or more pre-roll content and an order in which the one or more pre-roll content are to be played back at the playback device.

19. The method of claim 18, wherein the identifying the initial conditions comprises determining an available bandwidth over the communication connection with the remote playback device.

20. The method of claim 17, the selecting the first pre-roll content comprises identifying a priority associated one or more pre-roll content corresponding with the portable storage medium.

\* \* \* \* \*